(12) United States Patent
Rogers et al.

(10) Patent No.: US 11,993,282 B2
(45) Date of Patent: May 28, 2024

(54) APPARATUS AND METHOD FOR CALIBRATING AND ALIGNING AUTOMOTIVE SENSORS

(71) Applicant: Snap-On Incorporated, Kenosha, WI (US)

(72) Inventors: Steven W. Rogers, Conway, AR (US); David A. Jackson, Point Roberts, WA (US); Eric R. Sellers, Conway, AR (US); Ronald D. Swayne, Sherwood, AR (US); James Rodney Harrell, Greenbrier, AR (US); Chance Robinson, North Little Rock, AR (US); Robert J. D'Agostino, Conway, AR (US)

(73) Assignee: Snap-On Incorporated, Kenosha, WI (US)

( * ) Notice: Subject to any disclaimer, the term of this patent is extended or adjusted under 35 U.S.C. 154(b) by 439 days.

(21) Appl. No.: 17/347,896

(22) Filed: Jun. 15, 2021

(65) Prior Publication Data

US 2021/0387637 A1    Dec. 16, 2021

Related U.S. Application Data

(60) Provisional application No. 63/039,143, filed on Jun. 15, 2020.

(51) Int. Cl.
*B60W 60/00* (2020.01)
*G06T 7/80* (2017.01)
(Continued)

(52) U.S. Cl.
CPC ............. *B60W 60/001* (2020.02); *G06T 7/85* (2017.01); *H04W 4/48* (2018.02);
(Continued)

(58) Field of Classification Search
CPC ......... B60W 2420/42; B60W 2520/28; B60W 60/001; G01S 7/497; G01S 7/4972;
(Continued)

(56) References Cited

U.S. PATENT DOCUMENTS 5,535,522 A    7/1996  Jackson
5,724,743 A    3/1998  Jackson
(Continued)

FOREIGN PATENT DOCUMENTS

CN    1427945 A    7/2003
CN    1447903 A    10/2003
(Continued)

OTHER PUBLICATIONS

The extended European search report issued by the European Patent Office on Aug. 19, 2022, which corresponds to European Patent Application No. 19860163.5-1001 and is related to U.S. Appl. No. 17/347,896.
(Continued)

*Primary Examiner* — Timothy A Brainard
(74) *Attorney, Agent, or Firm* — Studebaker & Brackett PC

(57) ABSTRACT

Systems and methods are disclosed for calibrating and aligning automotive sensors, such as advanced driver assistance system (ADAS) sensors. Embodiments include a system having an image sensor mounted on a fixture in a known pose relative to the fixture. The image sensor is for viewing a target disposed on a vehicle and having a known pose relative to the vehicle, and for capturing image data of the target. A data processor is provided for performing the steps of calculating, using the image data, a pose of the target; calculating a pose of the image sensor relative to the vehicle using the calculated pose of the target; and generating instructions for positioning the fixture at a predeter-
(Continued)

mined pose relative to the vehicle using the calculated pose of the image sensor relative to the vehicle.

16 Claims, 39 Drawing Sheets

(51) Int. Cl.
    *H04W 4/48*         (2018.01)
    *G01S 7/497*      (2006.01)

(52) U.S. Cl.
    CPC ... *B60W 2420/403* (2013.01); *B60W 2520/28* (2013.01); *G01S 7/497* (2013.01); *G01S 7/4972* (2013.01)

(58) Field of Classification Search
    CPC ........ G06T 7/85; H04W 4/026; H04W 4/027; H04W 4/029; H04W 4/38; H04W 4/40; H04W 4/48
    See application file for complete search history.

(56) References Cited

U.S. PATENT DOCUMENTS

| | | | |
|---|---|---|---|
| 5,969,246 A | 10/1999 | Jackson et al. | |
| 6,237,234 B1 | 5/2001 | Jackson et al. | |
| 6,658,751 B2 | 12/2003 | Jackson et al. | |
| 6,823,601 B2 | 11/2004 | Murray | |
| 6,931,340 B2 | 8/2005 | Jackson et al. | |
| 6,959,253 B2 * | 10/2005 | Jackson | G01C 25/00 356/138 |
| 6,968,282 B1 | 11/2005 | Jackson et al. | |
| 7,040,029 B1 | 5/2006 | Hillman et al. | |
| 7,062,861 B2 | 6/2006 | O'Mahony et al. | |
| 7,069,660 B2 | 7/2006 | Robb et al. | |
| 7,121,011 B2 | 10/2006 | Murray et al. | |
| 7,164,472 B2 | 1/2007 | Dorrance et al. | |
| 7,313,869 B1 | 1/2008 | Rogers | |
| 7,424,387 B1 | 9/2008 | Gill et al. | |
| 8,522,609 B2 | 9/2013 | Nobis et al. | |
| 8,836,764 B2 | 9/2014 | Gruetzmann et al. | |
| 9,982,998 B2 | 5/2018 | D'Agostino et al. | |
| 10,072,926 B2 | 9/2018 | Rogers et al. | |
| 11,830,221 B2 | 11/2023 | Corghi | |
| 2002/0027651 A1 | 3/2002 | Jackson et al. | |
| 2002/0080343 A1 | 6/2002 | Bux et al. | |
| 2003/0051356 A1 | 3/2003 | Jackson et al. | |
| 2005/0027473 A1 | 2/2005 | Davidson et al. | |
| 2005/0096807 A1 | 5/2005 | Murray et al. | |
| 2006/0164295 A1 | 7/2006 | Focke et al. | |
| 2009/0031782 A1 | 2/2009 | Jackson et al. | |
| 2010/0238291 A1 | 9/2010 | Pavlov et al. | |
| 2011/0077800 A1 | 3/2011 | Palmer et al. | |
| 2011/0100107 A1 | 5/2011 | Nobis et al. | |
| 2014/0219509 A1 | 8/2014 | Buzzi et al. | |
| 2015/0049188 A1 * | 2/2015 | Harrell | F16M 11/046 348/139 |
| 2016/0195388 A1 | 7/2016 | D'Agostino et al. | |
| 2017/0097229 A1 * | 4/2017 | Rogers | B60S 5/00 |
| 2018/0154709 A1 * | 6/2018 | Singh | B60C 23/0488 |
| 2019/0325290 A1 * | 10/2019 | Tong | B62D 15/021 |
| 2019/0331482 A1 * | 10/2019 | Lawrence | G01B 11/2755 |
| 2020/0088515 A1 * | 3/2020 | Rogers | H04N 23/54 |

FOREIGN PATENT DOCUMENTS

| | | |
|---|---|---|
| CN | 1464970 A | 12/2003 |
| CN | 1826508 A | 8/2006 |
| CN | 1908612 A | 2/2007 |
| CN | 101568798 A | 10/2009 |
| CN | 101707890 A | 5/2010 |
| CN | 104380038 A | 2/2015 |
| DE | 44 19 584 A1 | 12/1995 |
| EP | 0971205 B1 | 2/2007 |
| EP | 2329220 B1 | 12/2012 |
| EP | 1953520 B1 | 3/2016 |
| EP | 3655796 B1 | 10/2021 |
| WO | 2013/163643 A1 | 10/2013 |

OTHER PUBLICATIONS

International Preliminary Report On Patentability issued in PCT/US2021/037347; issued Dec. 13, 2022.

International Search Report and Written Opinion issued in PCT/US2021/037347; mailed Sep. 17, 2021.

Bosch Sensortec; "BNO055; data sheet; Intelligent 9-axis absolute orientation sensor"; Document Revision 1.6; Feb. 2020; total 8 pages; https://datasheetspdf.com/pdf-file/848780/Bosch/BNO055/1.

International Search Report and Written Opinion issued in PCT/US22/14939; mailed May 5, 2022.

An Office Action issued by the Chinese National Intellectual Property Administration on Nov. 2, 2022, which corresponds to Chinese Patent Application No. 202110494343.8 and is related to U.S. Appl. No. 17/347,896.

An Office Action issued by the European Patent Office on Mar. 21, 2023, which corresponds to European Patent Application No. 16854347.8 and is related to U.S. Appl. No. 17/347,896.

The partial supplementary European search report (R. 164 EPC) issued by the European Patent Office on May 3, 2022, which corresponds to European Patent Application No. 19860163.5-1001 and is related to U.S. Appl. No. 17/347,896.

\* cited by examiner

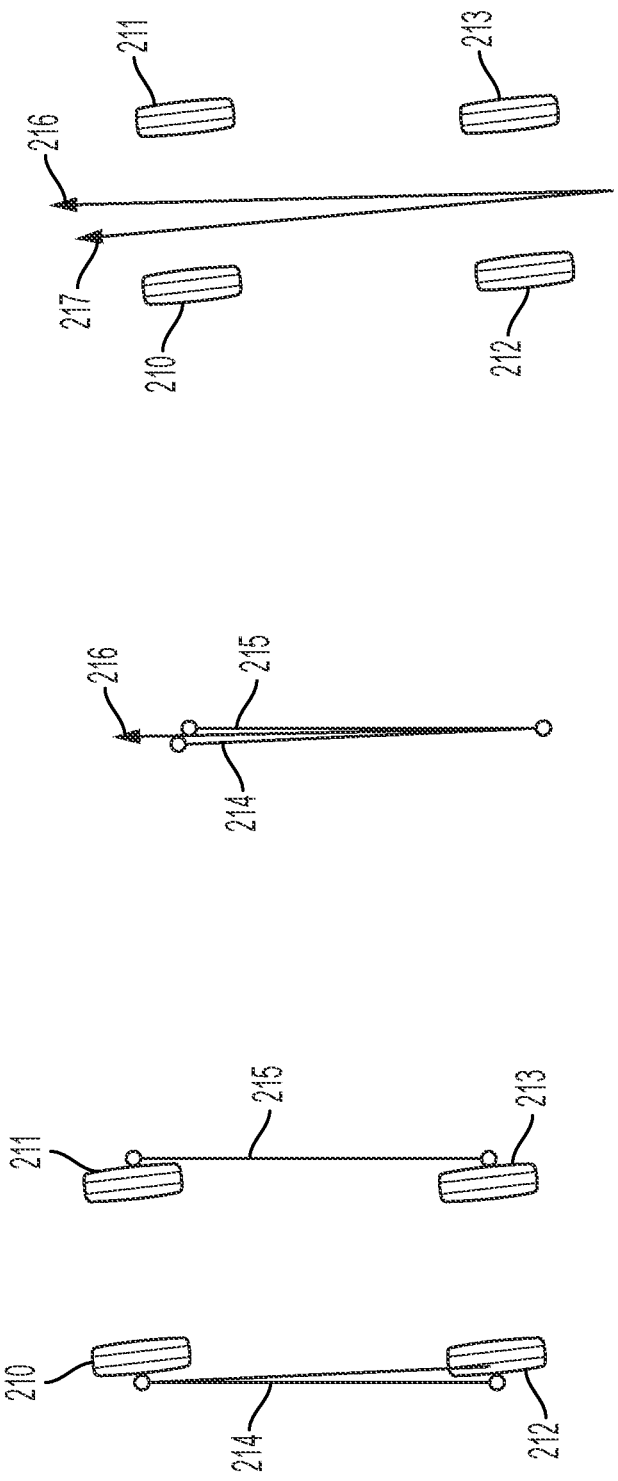

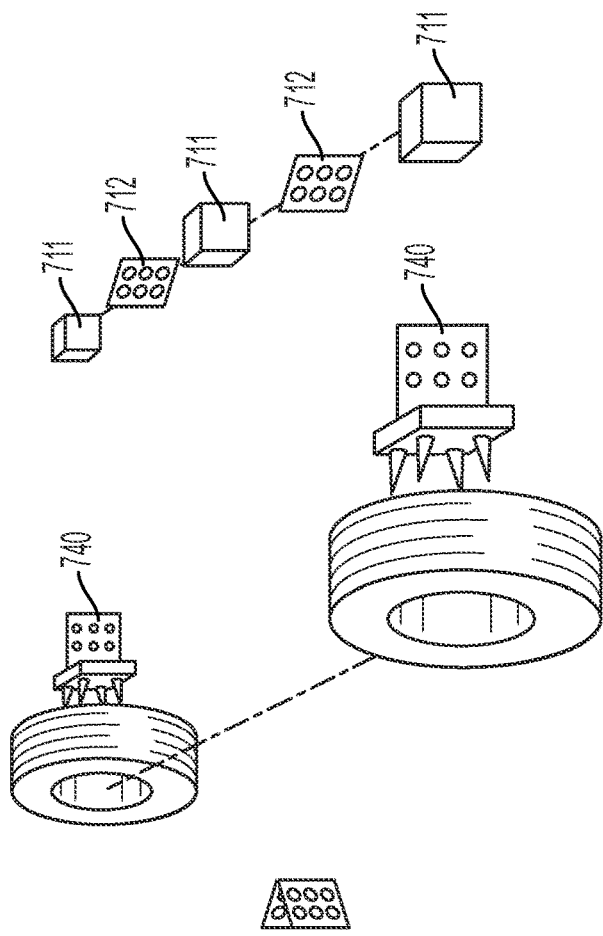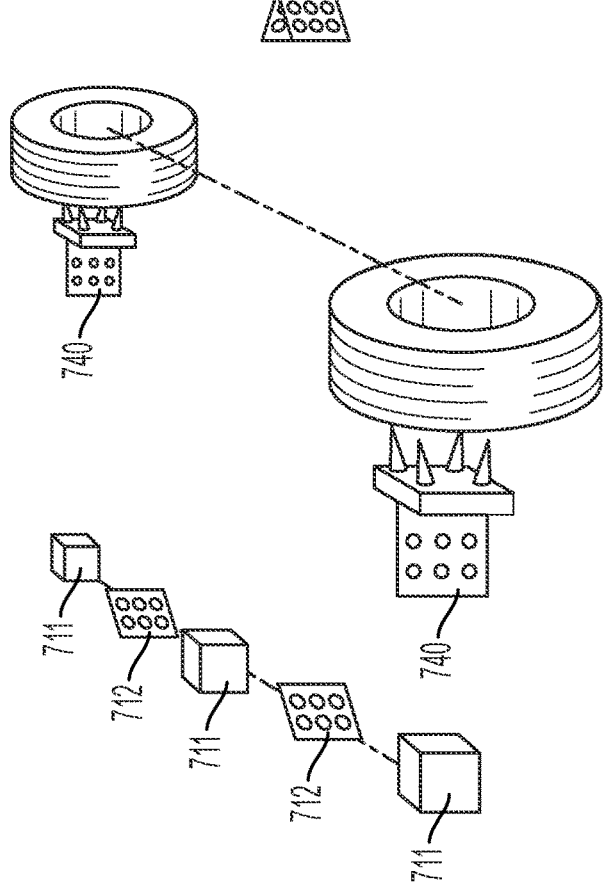
FIG. 7B

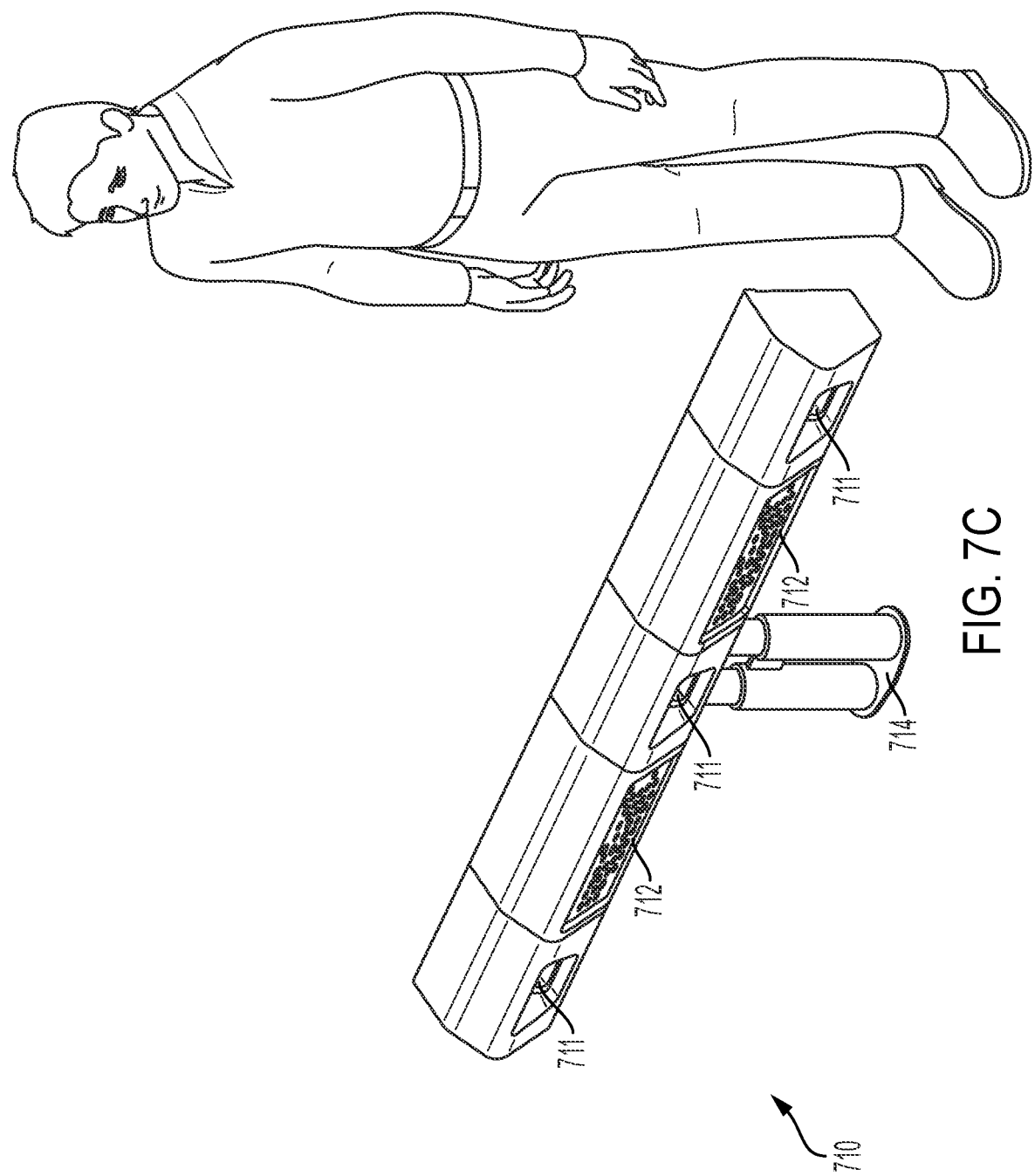

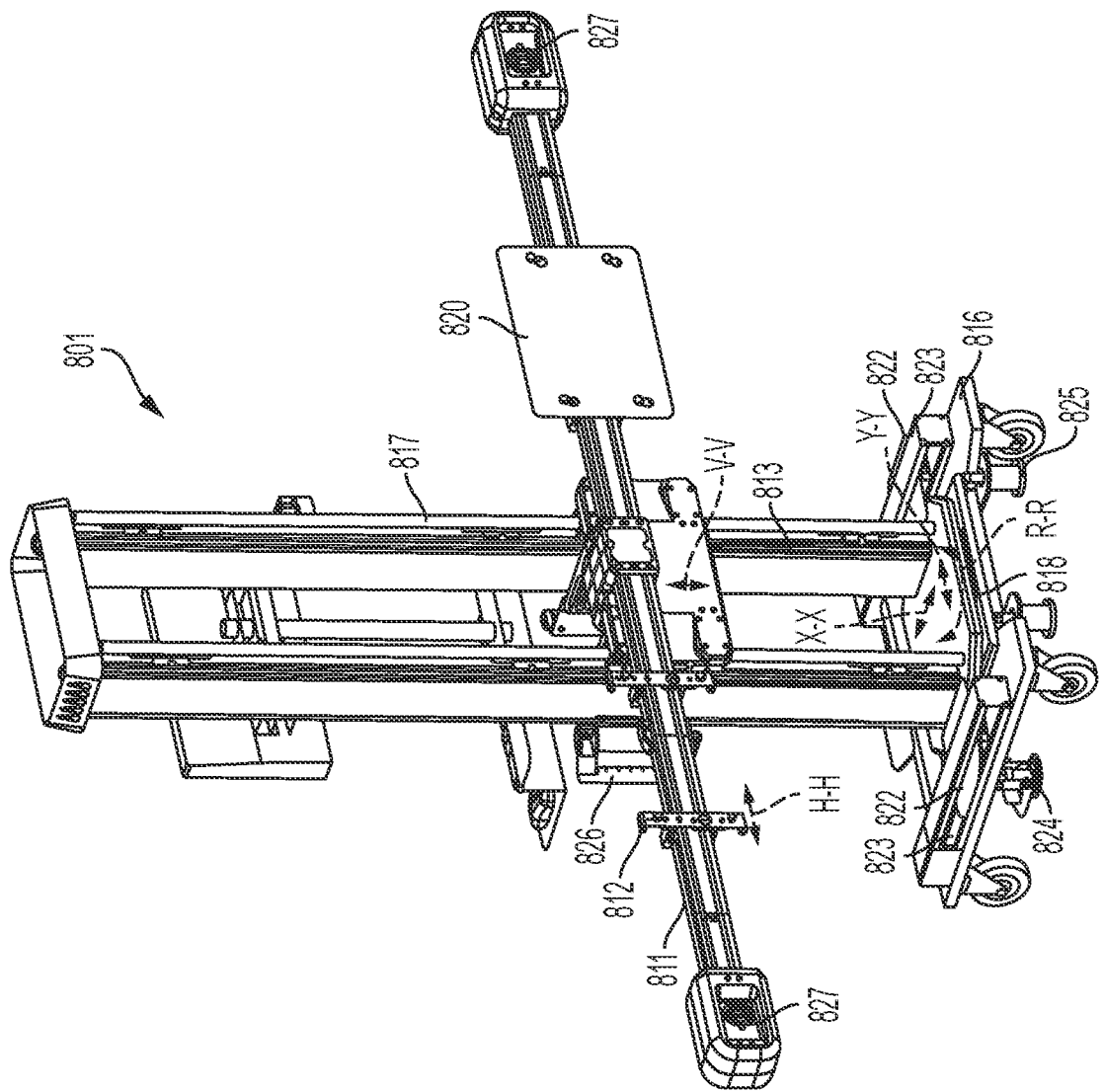

APPARATUS AND METHOD FOR CALIBRATING AND ALIGNING AUTOMOTIVE SENSORS

RELATED APPLICATIONS

The present application claims priority from U.S. Provisional Application 63/039,143, filed Jun. 15, 2020, entitled "Automotive Aligner With Improved Accuracy and No-Stop Positioning Using a Drive Direction Calculation," and U.S. application Ser. No. 16/570,583, filed Sep. 13, 2019, which claims priority from U.S. Provisional Application No. 62/730,727, filed Sep. 13, 2018, all of which are hereby incorporated by reference in their entirety.

FIELD

The present subject matter relates to devices and methods using machine vision for calibrating and aligning automotive sensors. The present disclosure has particular applicability to aligners for calibrating various vehicle-mounted sensors for advanced driver assistance systems on cars and trucks.

BACKGROUND

Machine vision vehicle alignment systems using movable cameras and targets attached to vehicle wheels, also known as "image aligners," are well known. The targets are viewed by the cameras such that image data obtained for a prescribed alignment process can be used to calculate vehicle alignment angles for display through a user interface, usually a computer monitor. Early system implementations included rigid beams that connected the cameras so that their position and orientation with respect to each other could be determined and be relied upon as unchanging. Later system implementations were introduced comprising the use of cameras not rigidly connected to each other, but using a separate camera/target system to continuously calibrate the position of one target viewing camera to another. This type of system is described in U.S. Pat. Nos. 5,535,522; 6,931,340; 6,959,253; and 6,968,282, all of which are hereby incorporated by reference herein in their entirety. An example of a vehicle wheel aligner using such image processing is the Visualiner 3D or "V3D", commercially available from John Bean Company, Conway, Ark., a division of Snap-on Incorporated.

There is a need for an aligner to incorporate cameras that can take measurements fast enough and continuously to measure, detect, and correct or warn of a problem with the alignment measurement. Further, there is a need for an aligner that measures, detects or corrects all possible issues that might make the alignment readings incorrect. Moreover, current camera based aligners require a positioning or runout procedure to measure the wheel axis (also referred to as "wheel spindle" or "axis of rotation"), and a steering swing procedure to measure the caster and steering axis inclination (SAI). This procedure is time consuming and frequently requires the technician to hold the vehicle steady at certain points of the positioning and caster swing. There is a need for a faster positioning procedure and a faster caster swing procedure, where the technician can perform the procedure without stops or delays.

A camera based system that addresses these needs is disclosed in U.S. Pat. No. 10,072,926, which is hereby incorporated by reference herein in its entirety. In this system, described in the '926 patent at col. 9, line 38 et seq., image data of the target is captured as the wheel and target are continuously rotated a number of degrees of rotation without a pause. The image data is used to calculate at least one pose of the target for every five degrees of rotation as the wheel and target are continuously rotated. As used herein, pose refers to "three dimensional position and orientation," as commonly understood by those of skill in the art. At least one of the cameras comprises a data processor for performing the steps of preprocessing the image data, and calculating an alignment parameter for the vehicle based on the preprocessed image data. Thus, alignment related measurements are taken quickly and continuously.

These conventional camera based aligners require the left and the right side cameras to be rigidly mounted to a beam and their relative location needs to be known. Other types of conventional camera based aligners use an additional camera to look between the measurement cameras (i.e., across the vehicle) at a target to relate the relative positions of the measurement cameras. All of these aligners require either expensive components, or have structures that can get in the way, or both. Thus, there is a desire for an aligner that does not require extra hardware to calibrate the relative camera to camera positions, and/or one that does not require a rigid beam between the two cameras to free up space for the shop and the technician.

The systems of the '926 patent provide great improvements in speed, convenience, accuracy, and functionality over conventional machine vision aligners. However, these systems may be less than ideal for aligning the wheels of certain vehicles such as large trucks and other heavy equipment, due to the size of the vehicles and the consequent geometry between the system's wheel-mounted targets, the system's cameras, and the amount of wheel rotation needed. There is a need for an aligner to quickly and easily measure a large vehicle, ideally as it is driven through a small space.

Advanced driver assistance systems (ADAS) in vehicles aid the driver and provide an additional level of vehicle safety. This includes systems like adaptive cruise control, lane departure warning, collision avoidance, and rear collision warning. These systems use a combination of sensors like cameras, sonar, and radar that may require calibration to operate correctly. Calibration is performed by placing elements such as reflectors, mirrors, targets, etc. in a known relationship to the vehicle. Conventional systems exist that perform vehicle/carrier stand orientation using simple but time consuming manual measurement by drawing a grid on the floor or lining up elements using a laser line. Many of these systems require work to be done in difficult positions, such as on the floor, while trying to position components of the system to a high degree of accuracy. Systems also exist that use a computerized wheel alignment system with elements placed on the carrier stands to orient and position the calibration elements in relation to the vehicle. Using a wheel alignment system has many advantages. Nevertheless, it is desirable to create a lower-cost, simpler system that does not require a full wheel alignment system, while still providing a quick and easy guided operation to the user to direct the location and orientation of the carrier stand and measure and document the location of the calibration elements.

SUMMARY OF THE DISCLOSURE

The present disclosure provides a vehicle alignment system comprising a fixture; a first image sensor mounted on the fixture in a known pose relative to the fixture, the first image sensor being for viewing a first target disposed on a vehicle and having a known pose relative to the vehicle, and for capturing image data of the first target; and a data processor. The data processor is for performing the steps of calculating, using the image data, a pose of the first target; calculating a pose of the first image sensor relative to the vehicle using the calculated pose of the first target; and generating instructions for positioning the fixture at a predetermined pose relative to the vehicle using the calculated pose of the first image sensor relative to the vehicle.

According to an aspect of the disclosure, the system further comprises a second image sensor mounted on the fixture in a known or calculated pose relative to the first image sensor, the second image sensor being for viewing a second target disposed on the vehicle and having a known pose relative to the vehicle, and for capturing image data of the second target. The first image sensor is for viewing a first side of the vehicle and the second image sensor is for viewing a second side of the vehicle opposite the first side of the vehicle. The system also comprises a floor target for placing on a floor surface. When the floor target is placed sequentially at a plurality of locations on the floor surface, including locations on the first and second sides of the vehicle, such that the first image sensor views the floor target and the first target, and the second image sensor views the floor target and the second target to respectively capture image data of the floor target and the first and second targets, the data processor is for performing the steps of calculating a pose of the floor target relative to the respective first or second image sensor, using the image data, at each of the plurality of locations on the floor surface; calculating a pose of each of the locations on the floor surface relative to the vehicle using the calculated poses of the floor target and first and second targets, and calculating a floor plane on which the vehicle is supported using the calculated pose of each of the locations on the floor surface.

According a further aspect of the disclosure, the processor is for generating the instructions for guiding a user using a user interface.

Objects and advantages of embodiments of the disclosed subject matter will become apparent from the following description when considered in conjunction with the accompanying drawings. Additionally the different configurations discussed in the sections below may be performed in a different order or simultaneously with each other.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

FIGS. 2A-C illustrate vectors relevant to drive direction principles of operation according to the present disclosure.

FIG. 7B is a schematic perspective view of the alignment system of FIG. 7A.

FIG. 7C is a perspective view illustrating an exemplary camera beam according to various embodiments of the present disclosure.

FIG. 8D is a front perspective view of an ADAS calibration element fixture according to an embodiment of the present disclosure.

DETAILED DESCRIPTION

It should be understood that the principles described herein are not limited in application to the details of construction or the arrangement of components set forth in the following description or illustrated in the following drawings. The principles can be embodied in other embodiments and can be practiced or carried out in various ways. Also, it is to be understood that the phraseology and terminology used herein is for the purpose of description and should not be regarded as limiting.

Drive Direction Principles of Operation

The disclosed alignment systems and methods operate based on a calculation of a parameter called "drive direction," which is the direction in which a vehicle is moving. Since a vehicle can be assumed to be a rigid body, each wheel (and each axle) has the same drive direction. Consequently, an alignment parameter of one wheel or one axle can be compared to the same parameter of another wheel or axle by equating their drive direction. For example, each axle's toe can be compared to each other axle's toe by equating each axle's drive direction. Therefore, the relative toe of two axles can be measured (i.e., the axle scrub), without all the cameras of a typical visual aligner seeing both axles at the same time, or without wheel position or orientation information from one side of the vehicle to the other.

A basic concept of drive direction alignment is to measure geometric properties of interest for wheel alignment without directly measuring lateral (i.e., "left to right") position or orientation information about system components. Rather, the disclosed aligners indirectly measure information that couples measurements from left and right sides, allowing measurements from one side of the vehicle to be transformed into a common coordinate system with measurements from the other side of the vehicle. This can be accomplished by measuring two or more directions in common from both sides of the vehicle.

This basic principle will be explained with reference to FIGS. 1A-B. In the illustrated embodiment, the two common directions measured on both the left and right sides of the vehicle 30 are the drive direction and the gravity direction. Drive direction DDL, DDR is measured from a calibrated camera 10L, 10R on each side of the vehicle 30, and gravity direction GDL, GDR is measured from a calibrated inclinometer 102L, 102R rigidly coupled to each camera 10L, 10R. Alternatively, the inclinometers 102L, 102R could be coupled to any stationary target. The transformation of each inclinometer measurement to its coupled camera is known from a prior calibration, which is described herein below.

Measurement of Gravity Direction

Figure 1A:
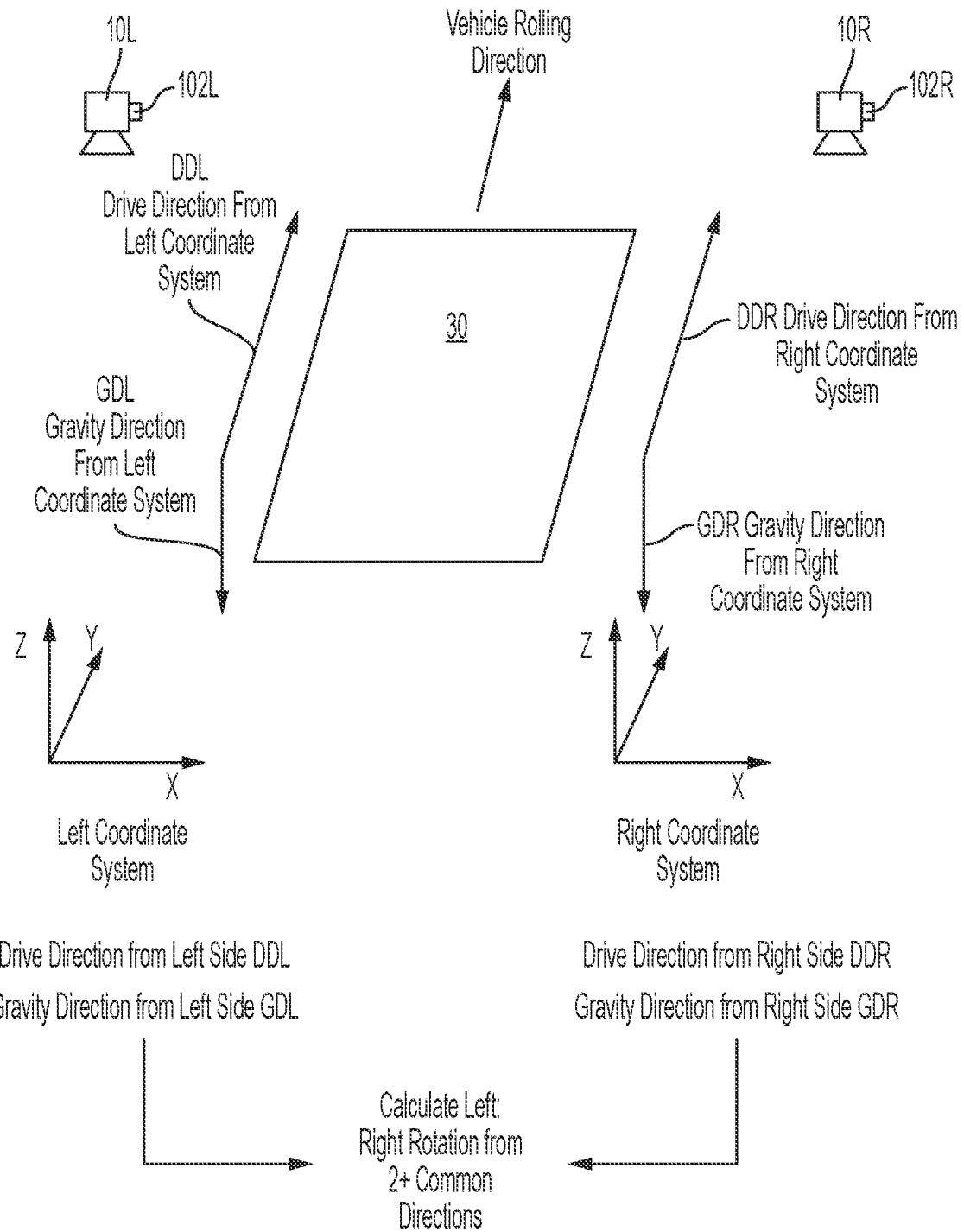
FIG. 1A is a diagram showing drive direction principles of operation according to the present disclosure.
Figure 1B:
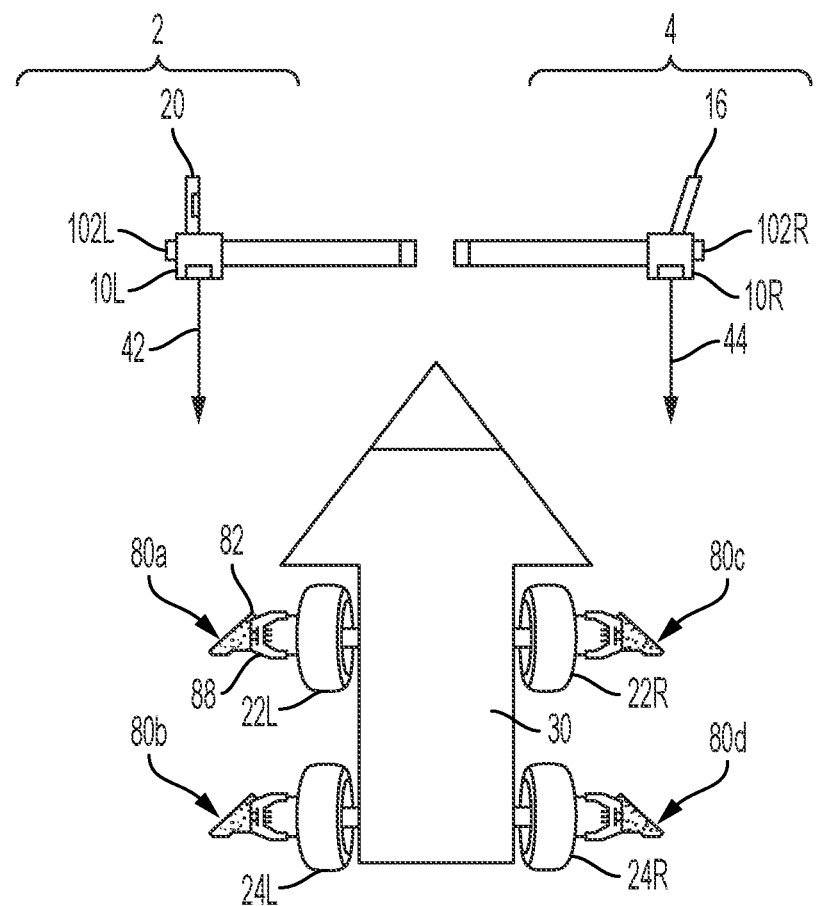
FIG. 1B is a schematic plan view of a vehicle wheel aligner according to an embodiment of the present disclosure.

In the embodiment depicted in FIG. 1A-B, gravity is measured by each inclinometer 102L, 102R in the left and right sides of the vehicle 30. Depending on the type of inclinometer used, those of skill in the art will understand that the measured output may be in the format of a 3D vector expressing the direction of gravity in the inclinometer coordinate system, or it may be expressed as a set of ($\theta X$, $\theta Y$) rotation angles that describe the inclination about the (X, Y) axes of the inclinometer. If the output is a 3D vector describing the gravity vector in the inclinometer coordinate system, it can be directly used in the processing chain.

If the output format is a set of ($\theta X$, $\theta Y$) inclination angles, these angles must be converted to a 3D gravity vector to be used in the processing chain described above. This can be accomplished in a variety of ways. In one embodiment, an initial vector denoting the orientation of gravity in the inclinometer coordinate system is encoded as a 3D vector X=0, Y=0, Z=1. This 3D vector is then made to rotate about the inclinometer X axis by the rotation angle $\theta X$. The rotated 3D vector is then rotated about the inclinometer Y axis by the rotation angle $\theta Y$. This rotated 3D vector now describes the orientation of gravity in the inclinometer coordinate system, given that the inclinometer sits at an inclination of ($\theta X$, $\theta Y$), and can be used in the described processing chain.

The above discussion assumes that a three dimensional wheel alignment procedure is performed. The novelty of the present disclosure is not, however, restricted to purely 3D alignments. It may be desirable to perform 2D alignment measurements. In such a scenario, gravity is measured not as a 3D vector or as a set of 2D angles, but as an elevation angle from a single axis sensor. Under such a configuration, it is assumed that all tilt between cameras is in the vehicle camber direction. The measured inclination angles on both sides of the vehicle are then used to adjust the relative left to right tilt angles of cameras on both sides of the vehicle. This relative tilt angle between the sides of the vehicle is then used as an offset to measure camber angles on both sides of the vehicle to a common reference. Deviations of drive direction measurements from both cameras in the camber direction are ignored.

Transformation of Gravity Directions from Inclinometer to Camera Coordinate System On both sides of the vehicle 30 we must express gravity direction and drive direction in a common coordinate system. This means that geometric quantities measured in one coordinate system must be transformed to the same coordinate basis so that they can be used in downstream calculations. In the system depicted in FIGS. 1A-B, this is accomplished by transforming the measured gravity direction GDL, GDR from each inclinometer coordinate system to its rigidly coupled camera coordinate system. This well-known transformation requires a calibration which quantifies how measurements from the inclinometer coordinate system are transformed to the camera coordinate system. The calibration describes how to rotate from the inclinometer coordinate system to the camera coordinate system. At run-time, the measured 3D gravity vector in each inclinometer coordinate system is multiplied by the inclinometer to camera coordinate system rotation matrix. The net effect is that the gravity, measured in the inclinometer coordinate system, is now expressed in the camera coordinate system on each side of the vehicle.

Measurement of Vehicle Drive Direction

In the embodiment depicted in FIGS. 1A-B, drive direction DDL, DDR is measured on each side of the vehicle with respective camera 10L, 10R. Cameras can be used in a variety of ways to measure drive direction, but in the system depicted in FIGS. 1A-B a set of targets are attached to the vehicle wheels. This is shown, for example, in FIG. 1B, illustrating targets 80a-d attached to vehicle wheels 22L, 22R, 24L, 24R. The conventional targets consist of a set of fiducials of known geometry. The fiducials are identified and localized in a series of camera images as the vehicle rolls through a minimum distance. At each image where the target is visible, the 3D position of the target is calculated in each camera coordinate system in a process well-known to those skilled in the art as monocular pose estimation. Accordingly, as used herein, the term "pose" refers to three dimensional position and orientation, as commonly understood by those of skill in the art.

Upon completion of the rolling motion, the measured 3D locations of the targets at all positions are used to calculate the optimal drive direction. To calculate drive direction, target position must be measured in at least two distinct vehicle rolling positions. Depending on where the target is placed on the rolling vehicle, it may be necessary to perform some orthogonalizations of the measured target coordinates. If targets are imaged while attached to the frame or body of the vehicle or the center of the wheel, they should travel in a straight line. But if, for example, the targets are positioned on vehicle wheels, they will in general trace out a cycloidal trajectory. For this scenario, the direction of best-fit lines through the target centers will depend on the phase angle of the target on the wheel at the various data acquisition positions. In other words, the target will oscillate with some translation component in directions that are orthogonal to the true vehicle drive direction.

These deviations from the true vehicle drive direction can be subtracted from the measured target locations by reference to external measurements that are approximately orthogonal to vehicle direction. For example, by using the gravity plane or the plane along which the vehicle rolls, the normal of the gravity plane or the rolling plane can be used as a direction to remove the orthogonal component of the target oscillations. This reduces the uncontrolled variability in the measurement of vehicle drive direction, enabling a more accurate and repeatable drive direction measurement.

Once target positions have been orthogonalized as described above (if needed), the array of 3D center locations are then used as input to a well-known least squares calculation algorithm. The optimal drive direction is computed using least squares methods to determine the primary direction of target motion on each side of the vehicle. The net result of this calculation, carried out independently for the left and right sides, is vehicle drive directions DDL, DDR measured in each of the left camera 10L and right camera 10R coordinate systems.

It must also be noted that for vehicles with front wheel steer (either because front wheels are turned, or because individual front toe angles are badly out of spec), targets imaged while attached to the front wheels will experience slightly different trajectories. This problem will compound when rolling distances are larger, and the vehicle is made to turn through a larger semi-circle. For shorter rolling distances, the effect of steer angle should however be quite limited.

In the event that vehicle steer is not negligible, the effects of steer can be detected and compensated for in various ways. One method is to calculate the axis of rotation of the wheel mounted targets between successive positions in the rolling motion, and to use the deviation of the wheel axes with wheel roll angle to determine the steer axis and steer angle. With the steer axis and angle, the nonlinear target trajectories can then be corrected for independently on each side of the vehicle, resulting in steer-adjusted drive directions.

Calculation of Left to Right Side Rotation from Measurement of Common Directions The problem of determining the optimal rotation between left and right camera coordinate systems is an instance of what is known to those in the art as Wahba's Problem. The basic question of this method is: given two or more directions measured in an initial coordinate system, and those same directions measured in a second coordinate system, what is the optimal rotation between the two coordinate systems? This problem can be solved in various ways. If the number of common directions measured in two coordinate systems is exactly two, the so-called Triad method can be used to solve for the optimal rotation between the two coordinate systems. For two or more measurements in common in both coordinate systems, more general solution methods such as the Kabsch algorithm, Davenport's Q-method, and other computational algorithms, are used to determine the optimal rotation between coordinate systems. The details of the methods vary, but the essence of all such methods is to solve for the rotation that minimizes the least-squares error when rotating from one coordinate system to the other. Most methods incorporate a singular value decomposition of the 3D covariance matrix of the pairs of corresponding 3D vectors.

As depicted in FIG. 1A, the two common directions on the left side of the vehicle 30 are the vehicle drive direction DDL in the left camera 10L coordinate system, and the gravity direction GDL in the left camera 10L coordinate system (originally measured in the left inclinometer coordinate system, but transformed to the left camera coordinate system using the previously described inclinometer to camera calibration). The vehicle drive direction and gravity direction are similarly measured in the right camera 10R coordinate system. These pairs of vectors DDL, GDL and DDR, GDR on each side of the vehicle 30 are then input to the least squares rotation estimation algorithm, and the 3D rotation that optimally rotates vectors from the left side of the vehicle to the right side (or vice versa) is the output. The 3D rotation can be expressed as a 3×3 rotation matrix, a 3 element vector of Euler angles, a 4 element unit quaternion, or other representation of rotation. The specific format is not material, and the various representations are interchangeable.

The Need for at Least Two Unique Directions

It must be emphasized that two or more unique common directions are required to calculate a unique 3D rotation between the two coordinate systems. With no common directions between the two coordinate systems, we have no information at all to constrain the rotation between. With only one common direction between both coordinate systems, we do not have enough information to determine a unique rotation between coordinate systems.

It must also be emphasized that the two or more common directions used to determine the optimal rotation between coordinate systems must be unique directions. If the two directions were parallel, they would actually point in the same direction. The more unique the directions, the better. Ideally, the common directions are orthogonal or nearly so. The more orthogonal the directions are to each other, the greater the amount of unique information that is incorporated into the calculation of the optimal left to right rotation solution.

Alternative Embodiments

The embodiment described above uses cameras 10L, 10R and inclinometers 102L, 102R to measure vehicle drive direction and gravity direction, respectively. However, the basic principle of correlating two coordinate systems based on measurement of two or more common directions can be extended in various ways.

Principle of Operation not Restricted to Vehicle Drive Direction and Gravity Direction The disclosed "drive direction" aligner uses vehicle drive direction and gravity direction as the common directions to measure on both sides of the vehicle. The core concept of determining the relative left and right sides of the vehicle, however, does not require these two directions. Any two or more common directions can be used to perform alignment measurements in the manner described. One could employ, for example, a magnetometer to use the measured direction to the magnetic north pole as a common direction that will be (for all practical purposes) the same on both sides of the vehicle. Another sensor which could be employed is a gyroscope, where the left side and right side gyroscopes are configured so as to measure a common direction. These are just some examples of other ways in which common directions can be measured on both sides of the vehicle.

Use of More than Two Common Directions

In the measurement system described, two corresponding directions are measured on both sides of the vehicle to determine the left side to right side transformation. The number of corresponding directions need not be restricted to two, however. Arbitrarily many corresponding directions can be used to determine the left to right orientation. The calculation algorithms employed are not restricted to two common directions, so long as the additional directions in common are not parallel and thus provide complementary information to restrict the optimal solution.

Use of Only One Common Direction in a Reduced Functionality System

As described, at least two 3D common directions are required to determine a unique 3D rotation between left and right sides of the vehicle. However, it is possible to retain some of the functionality of the system described if only one corresponding direction is measured on left and right sides of the vehicle. For example, it is possible to determine 2D rotations from just one common measured direction. This may be useful, for example, in a scenario wherein wheel alignment measurements are desired in a strictly 2D mode of operation.

Use of Alternative Gravity Measurement Sensors and Methodologies

As described, measurement of the gravity direction on both sides of the vehicle is performed with a conventional inclinometer. There are various other ways, however, in which gravity direction can be measured without using an inclinometer. Accelerometers could be used in lieu of inclinometers to measure gravity direction. Plumb lines or similar free-hanging masses could also be used to provide a measure of gravity direction. If the cameras themselves can be secured such that they do not rotate with respect to the vehicle rolling surface plane, one can perform a prior calibration step to determine the normal of the rolling surface in each of the left and right camera coordinate systems. This normal direction can then be used to provide a common reference direction for both sides of the vehicle.

Use of Preexisting Vehicle Feature Points in Lieu of or in Addition to Targets

In the embodiments described herein, targets of a predetermined geometry are fixed to a vehicle and measured with cameras to determine vehicle drive direction. Targets are not required, however, as there are various ways in which 3D drive direction can be determined without reference to them. One example is to use stereo vision techniques. For example, if stereo cameras are used on each side of the vehicle, textured feature points can be matched in all cameras of each stereo camera array so as to provide 3D position measurements. These feature points can then be tracked as the vehicle rolls and used in an analogous manner to a target with a predetermined geometry.

It is possible to use additional techniques other than stereo vision to measure vehicle drive direction without employing a target with a predetermined geometry. One could use structured light projection techniques to determine the 3D position of feature points throughout the vehicle rolling motion, and then used in an analogous manner to a target with a predetermined geometry.

One could also use "structure from motion" techniques to determine the 3D geometry of textured vehicle feature points from a single camera, provided some additional constraints about camera motion. With such techniques, a single camera effectively becomes a stereo camera array.

Use of "Live" Inclinometer to Camera Calibration

In the embodiment of FIGS. 1A-B, the relative transformations between the two sensors of interest (cameras 10L, 10R and inclinometers 102L, 102R) are known at the start of the alignment due to a prior calibration process (or processes). The assumption is that the relative pose of the sensors does not change between the relative sensor orientation calibration process and the time at the start of the alignment measurement process. For certain scenarios, however, it may be advantageous to not rigidly couple the camera and inclinometer, at which point the relative sensor orientation must be determined through the course of the alignment process. This distinction (relative sensor orientation performed before or during the alignment process) is not germane to the core novelty of the disclosure.

Calculation of Alignment Angles

Given the above measurements, calibrations, and intermediate transformations, how does one calculate wheel alignment angles of interest from such a measurement system? Once key equivalences are established, the basic geometric quantities of interest are much the same as in traditional wheel alignment measurement systems that directly measure right side to left side transformations.

Measurement of Runout Compensation

Runout compensation of the wheel mounted targets is performed in the same manner as prescribed in traditional wheel alignment systems. The concept and calculation of runout is discussed, for example, in U.S. Pat. No. 5,535,522. The core concept is to observe the orientation change of a coordinate system that is rigidly mounted to a vehicle wheel. The orientation change of this coordinate system as the wheel rolls allows for a calculation of the optimal wheel axis of rotation. The only addition to this concept in a "drive direction" aligner is a downstream step in the processing chain where all wheel axes are transformed into a common coordinate system (i.e., from the right side of the vehicle to the left side) using the optimal right side to left side rotation.

Establishing a Vehicle Coordinate System (VCS)

The notion of a Vehicle coordinate system (VCS) is a commonly used concept in wheel alignment. See, for example, U.S. Patent Application Publication 2017/0097229. The VCS serves as a frame of reference in which alignment angles can be expressed. In the prior art, camber angles are commonly defined with respect to the VCS (X, Y) plane, and individual toe angles are commonly defined with respect to the GCL (Geometric Center Line) or the thrust line of the vehicle.

Calculation of the GCL in a "Drive Direction" Aligner

In the prior art, the geometric center line (GCL) is calculated as the direction from the middle of the rear wheels to the middle of the front wheels. This is depicted in FIGS. 2a-c. In a measurement system which lacks a direct measurement of left to right sides of the vehicle, it may seem impossible to measure GCL. A deeper examination of vehicle geometry shows, however, that it is possible to measure a mathematically equivalent GCL with some additional information about vehicle geometry.

A typical GCL measurement process when direct measurements are made between left and right sides is depicted in FIGS. 2a-c. With direct left to right measurements of wheel centers, one can directly calculate the middle of the rear axle and the middle of the front axle. The middle of the rear axle is calculated by averaging the 3D positions of the left rear wheel 212 and the right rear wheel 213 using conventional visual techniques. The middle of the front axle is calculated by averaging the 3D positions of the left front wheel 210 and the right front wheel 211. The vector from the mid-rear axle to mid-front axle is demonstrated in 216, which is the GCL.

In a drive direction aligner described herein, a mathematically equivalent GCL direction can be measured despite not directly measuring the left to right side transformation. The vector from the center of the left rear wheel 212 to the left front wheel 210 is denoted by 214. The vector from the center of the right rear wheel 213 to the right front wheel 211 is denoted by 215. When rear to front wheel vectors 214 and 215 are averaged, the vector is mathematically equivalent to the previously described GCL vector 216.

The thrust direction 217 is calculated based on the rear toe angles with respect to the GCL 216. The front toe angles are calculated with respect to the thrust direction 217.

Calibration of Vehicle Rolling Surface with Respect to Gravity

To measure camber in a way that is independent of the tilt of the rolling surface with respect to gravity, we must measure the tilt of the rolling surface (e.g., an alignment lift) with respect to gravity. After we have performed this calibration, we can characterize the orientation of the plane of the alignment lift in the inclinometer coordinate system, and from there (using other calibrations and live measurements) transform the normal of the alignment lift to other coordinate systems.

Figure 3:
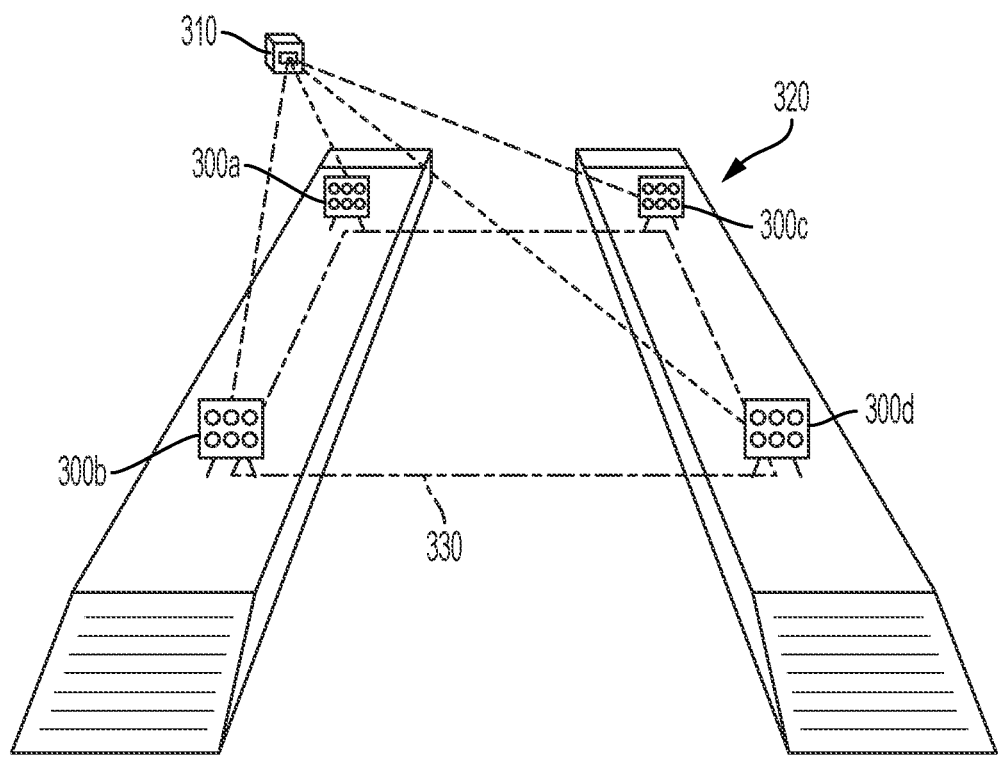
FIG. 3 illustrates a method of orienting an alignment lift with respect to gravity.

There are various methods by which this lift orientation with respect to gravity can be performed. One method is depicted in FIG. 3. The essence of this method is to view targets of known geometry 300a-d from a static camera/inclinometer assembly 310, where the calibration between the inclinometer and camera is known from a previously described calibration. The targets 300a-d are positioned on the alignment lift 320 at approximately the locations of the vehicle tires. The positions of the targets 300a-d in the camera coordinate system at all four wheel locations is measured. A best fit plane 330 is calculated from these four points, and the normal of this best fit plane 330 is calculated in the camera coordinate system. Using the known calibration between the camera and the inclinometer, the orientation of the best fit plane normal in the inclinometer coordinate system can be determined. The tilt angle between the alignment lift best fit normal direction and the gravity direction can then be determined using standard trigonometric functions and stored for later use.

Defining the Basis Vectors of the VCS

The three mutually orthonormal 3D Cartesian basis vectors that define the orientation of the VCS are defined from the geometric quantities defined above. The Y axis of the VCS, corresponding to the longitudinal axis of the vehicle, is defined as the GCL. The Z axis of the VCS corresponds to the vertical dimension of the vehicle, and is approximately aligned with the direction of gravity. We use the previously performed calibration of the alignment lift with respect to gravity to determine the transformation from the measured gravity vector to the orientation of the alignment lift normal in the inclinometer coordinate system. The alignment lift normal is transformed from the inclinometer coordinate system to the left camera coordinate system— this transformed vector constitutes the Z axis of the VCS. The alignment lift normal is further orthogonalized to remove the component that is parallel to the measured vehicle drive direction. The VCS X axis is then defined as the cross product of the VCS Y axis and the VCS Z axis.

Calculation of Basic Alignment Angles

Once the VCS has been determined and all wheel axes have been measured and transformed into the VCS, the alignment angles can then be determined in a well-known manner. The wheel axes are projected onto various 2D planes of the Vehicle coordinate system. Camber angle is defined from the elevation angle of the wheel axes with respect to the VCS (X, Y) plane. The previously described tilt angle of the alignment lift with respect to gravity must also be incorporated and subtracted from the calculated camber angles. Rear toe angles are calculated with respect to the Geometric Center Line 216 as described above. Front wheel toe angles are defined with respect to the vehicle thrust line 217 as described above.

Aligner Architecture

FIG. 1B is a schematic top plan view of certain elements of a conventional computer-aided, 3D motor vehicle wheel alignment system ("aligner"). The aligner of FIG. 1B is an example of an aligner that can be used to implement the disclosed techniques, as will be discussed in detail herein below. In particular, the aligner of FIG. 1B comprises a left camera pod 2 and a right camera pod 4 that are used to align wheels of a motor vehicle. The terms "left" and "right" are used for convenience, and are not intended to require a particular element to be located in a particular location or relationship with respect to another element.

Arrow 30 of FIG. 1B schematically represents a motor vehicle undergoing alignment. The vehicle includes left and right front wheels 22L, 22R and left and right rear wheels 24L, 24R. An alignment target 80a, 80b, 80c, 80d is secured to each of the wheels 22L, 24L, 22R, 24R, respectively. Each alignment target generally comprises a plate 82 on which target information is imprinted and a clamping mechanism 88 for securing the target to a wheel. A left camera pod 2 comprises left alignment camera 10L. Left alignment camera 10L faces the vehicle and views the left side targets 80a, 80b along axis 42. Right camera pod 4 comprises a right camera 10R that faces the vehicle and views the right side targets 80c, 80d along axis 44. Left camera pod 2 also includes a calibration camera 20 mounted perpendicularly to camera 10L. Calibration camera 20 views a calibration target 16 attached to right camera pod 4, to determine the positions of alignment cameras 10L, 10R relative to each other. However, as discussed herein above in the "Drive Direction Principles of Operation" section, a calibration camera and target are not needed when drive direction is calculated and used, as long as a second common direction is determined, as by using inclinometers 102L, 102R attached to the cameras 10L, 10R.

The disclosed aligner further comprises a data processor (not shown), such as a conventional personal computer (PC), having software with instructions to cause the data processor to perform the calculations described herein electronically.

Fast Measurement Process

A technology usable to enable the disclosed aligners and the functionality described herein is a very fast measurement process. This known process is described in U.S. Pat. No. 10,072,926. The core measurements of interest are the poses (positions and orientations) of targets that are rigidly mounted to the vehicle wheels. Performing a fast measurement process thus equates to performing measurements of target pose very rapidly. In imaging aligners, computing pose rapidly involves performing optimized image processing and applying optimized iterative algorithms to estimate the position and orientation of the reference targets. The high speed measurement process provides for many updates and checks to be performed during the course of a wheel turning processes which may only take several seconds. To measure the pose of wheel mounted targets from individual cameras, such as cameras 10L and 10R of FIG. 1B, it is essential to have calibrated cameras. Calibrated cameras are ones which have had their internal geometry (focal length, camera center point, lens distortion) characterized by a camera calibration process.

Examples of well-known camera calibration processes are the Heikkila method; Zhang's method; the Faugeras—Luong method; the Hartley—Zisserman method; and the Triggs method. To compute the 3D pose of a target from a single 2D camera it is further required to have knowledge of the geometry of the target that is being observed. With knowledge of the target geometry and knowledge of the internal camera geometry, it is possible to compute the 3D pose of that target based on a single 2D image. An example of a commercially available "fast" camera usable to implement the disclosed aligners is the VC Z series camera available from Vision Components GMBH of Ettlingen, Germany.

The process of computing target pose is conventional, and starts with acquiring an image of the wheel mounted target. This image is then processed to identify image feature points that correspond to reference fiducials in the target. These reference image points are then associated with reference fiducial points in the target. Finally, an iterative pose estimation process is performed. Pose estimation answers the question, "Where does a target need to be located, and how must it be oriented, to produce the pattern of image feature points that I measured?"

In certain embodiments of the disclosed aligners, the entire measurement process (image acquisition, image processing, image feature point to target fiducial point correspondence, and pose estimation) is performed repeatedly in a loop for all targets used until target pose information is no longer needed for the alignment process. To acquire measurements very rapidly (for example, greater than 20 poses per second) it is necessary to perform all four steps rapidly. The data processing steps must be implemented with highly efficient algorithms and they must also be implemented on processors with architectures that are optimized for the image processing and numerical linear algebra steps used in the data processing algorithms. Examples of well-known processors with architectures optimized for image processing and numerical linear algebra include DSPs (Digital Signal Processors); GPUs (Graphics Processing Units); FPGAs (Field Programmable Gate Arrays); and ASICs (Application Specific Integrated Circuits). Examples of highly efficient data processing algorithms include Gaussian filtering; gradient descent optimization; Sobel edge detection; Canny edge detection; SURF feature point detection; and optical flow point tracking. An example of a commercially available processor with architecture optimized for the application of this disclosure is Model TDA2x ADAS DSP/ARM System-on-Chip processor, available from Texas Instruments of Dallas, TX.

In certain embodiments, the data collection procedures and advanced analytics described herein below are performed using "intelligent cameras" that are fast and perform all the data processing for the aligner, including serving the user interface, preprocessing image data, and calculating alignment parameters. More particularly, the intelligent cameras (e.g., the cameras 10L, 10R shown in FIG. 1B) acquire images and preprocess the image data. Preprocessing generally includes manipulating image data to prepare it for use in calculating alignment parameters, such as alignment angles. Examples of well-known preprocessing operations include background subtraction, gradient calculation, derivation of positional data, and data compression for reduced bandwidth. Preprocessing of image data is described in detail, for example, in U.S. Pat. No. 7,069,660. Preprocessed image data from both cameras is used; for example, to calculate alignment angles, which are served to a display device. In other embodiments, only one of the two cameras performs the processing and calculating of alignment parameters.

Figure 4A:
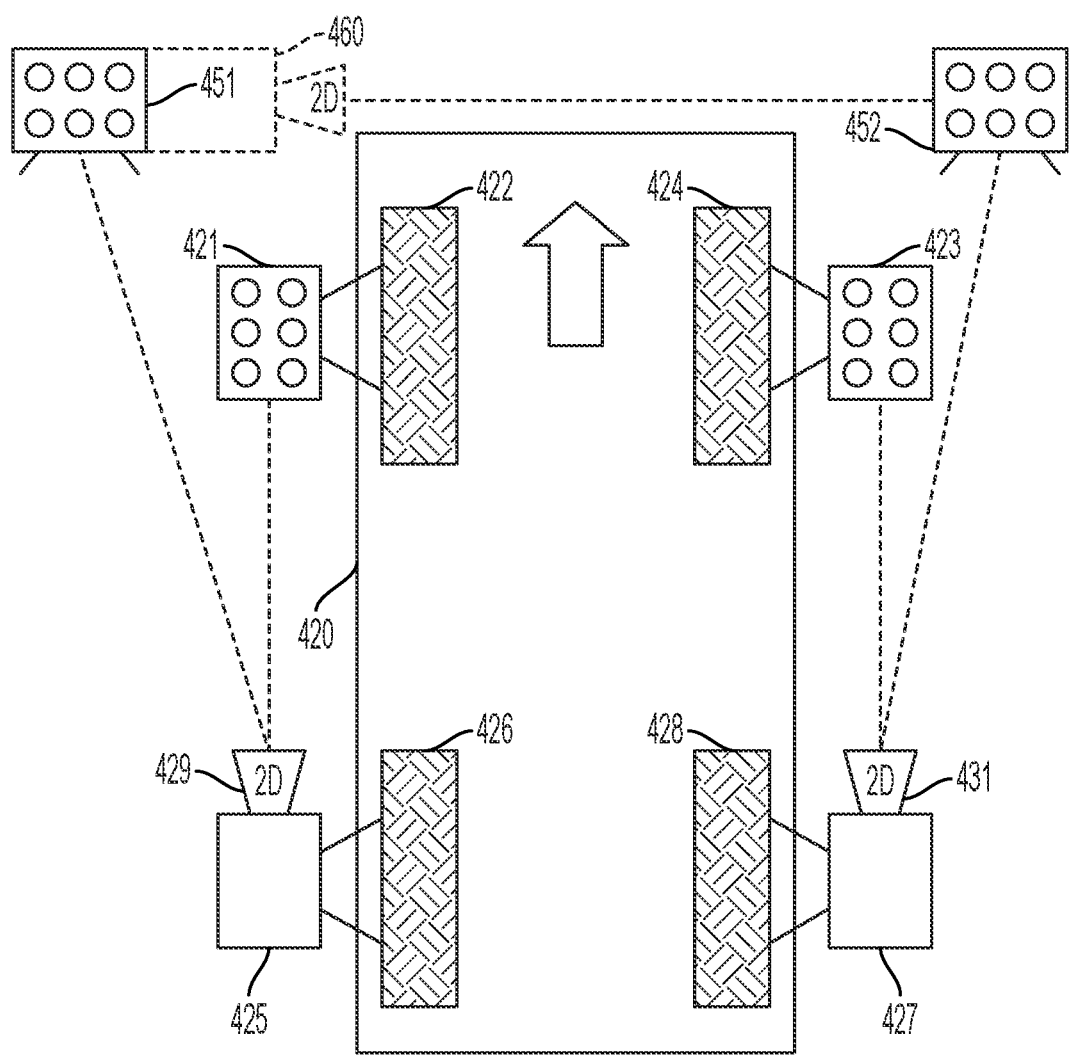
FIG. 4A is a schematic plan view of a 3D visual vehicle wheel aligner according to an embodiment of the present disclosure.

Wheel Alignment Systems and Methods Using Drive Direction Calculation and Having Active Sensors Mounted on a Vehicle A typical conventional vehicle aligner uses sensors, such as cameras, to measure positions and angles of each wheel of the vehicle. One embodiment of such a wheel aligner uses a passive head having an optical target on each of the wheels of one axle (e.g., on the front wheels) and active sensing heads including a camera on each wheel of the other axle (e.g., on the rear wheels) to measure alignment angles. The active heads also include sensors to spatially orient the sensors on each wheel. Such an aligner is illustrated in FIG. 4A. Targets 421, 423, and active heads 425, 427 mounted in association with the vehicle wheels 422, 424, 426, 428 are used to measure alignment angles of the left and right side wheels independently. A second set of targets 451 and 452, which are not attached to the vehicle 420, are used to spatially orient the left side sensors to the right side sensors. Passive target 451 is fixed to a 2D camera 460. Target 451 is visible to the camera 429 of active sensor head 425. Passive sensor target 452 is visible to the 2D camera 460 attached to target 451 as well as the camera 431 of active sensor head 427. In this embodiment the spatial orientation of left side sensor and target to right side sensor and target requires a complex calibrated target/sensor assembly 451/460 as well as a clear view of passive target 452. The area required for clear view of target 452 can be blocked by the vehicle being measured, by equipment, or by personnel.

The disclosed technique of vehicle alignment using a drive direction calculation improves over current and previous alignment systems by removing the need for a direct measurement to spatially relate the left side to the right side wheel measurements. Instead, the spatial relationship of the left side to the right side can be known by combining two directional vectors that are common between the left and right sides, as discussed herein above in the "Drive Direction Principles of Operation" section. Some directional vectors that are common between left and right sides include, but are not limited to, direction of vehicle movement (i.e., drive direction), direction of gravity, Earth's magnetic field, direction to a common radio signal, direction to a common light source, direction to a common passive sensor, or direction to the floor or lift surface.

In certain disclosed embodiments, a wheel alignment system includes a pair of passive heads and a pair of active sensing heads. The passive heads are adapted for mounting in association with a first pair of wheels of a vehicle that is to be measured by operation of the wheel alignment system. The active sensing heads are adapted for mounting in association with a second pair of wheels of the vehicle. Each of the passive heads includes a target; e.g. as may be observed by an image sensor. Each active sensing head includes an image sensor for producing image data, which is expected to include an image of a passive target when the various heads are mounted on or in association with the respective wheels of the vehicle. The newly disclosed system does not require an extra sensor module to determine the spatial relationship of the active sensing heads. The image sensor alone, or in conjunction with other sensors such as a gravity sensor, can be used to determine the direction of movement of the wheels on each side of the vehicle. Through well-known calibrations of the image sensor to the gravity sensor, the relationship between the vehicle direction and gravity direction can be known. If the vehicle is assumed to be a rigid body, we can assume that the direction of movement of the wheels on the left side of the vehicle is the same as the direction of movement of the wheels on the right side of the vehicle. We can also reasonably assume that the direction of gravity is the same for the left side of the vehicle and the right side of the vehicle. With these assumptions alone and no direct measurement between the left and right sides of the vehicle, we can relate the left side wheel measurements to the right side wheel measurements. The system also includes a processor. The processor processes image data relating to observation of the targets as well as relationship data from the sensor modules. The data processing enables computation of at least one measurement of the vehicle.

In accord with another aspect of the disclosure, a sensing head for use in a wheel alignment system includes a housing or mounting on a wheel of a vehicle that is to be measured by operation of the wheel alignment system and an image sensor mounted to the housing. The image sensor produces image data. In a measurement operation, the image data typically includes an image of a target in association with another wheel of the vehicle. The sensing head also includes at least one tilt sensor mounted to the housing for sensing a tilt angle of the active sensing head when the active sensing head is mounted on a wheel of the vehicle. A processor is responsive to the image data, the sensed tilt angle and a relationship to another head mounted on the vehicle. A communication interface coupled to the processor allows transmission of wheel alignment measurement data, from the active sensing head to a user device of the wheel alignment system.

A method of taking at least one measurement of a vehicle in accord with principles taught herein involves capturing an image of a target associated with a first wheel of the vehicle with an image sensor in a first head mounted in association with a second wheel of the vehicle, to produce first image data. An image of a target associated with a third wheel of the vehicle is captured with an image sensor in a second head mounted in association with a fourth wheel of the vehicle, to produce second image data. The method further entails deriving relationships of the first and second heads relative to at least one reference. The first and second image data and the reference relationship measurements are processed to compute at least one measurement of the vehicle.

Figure 4B:
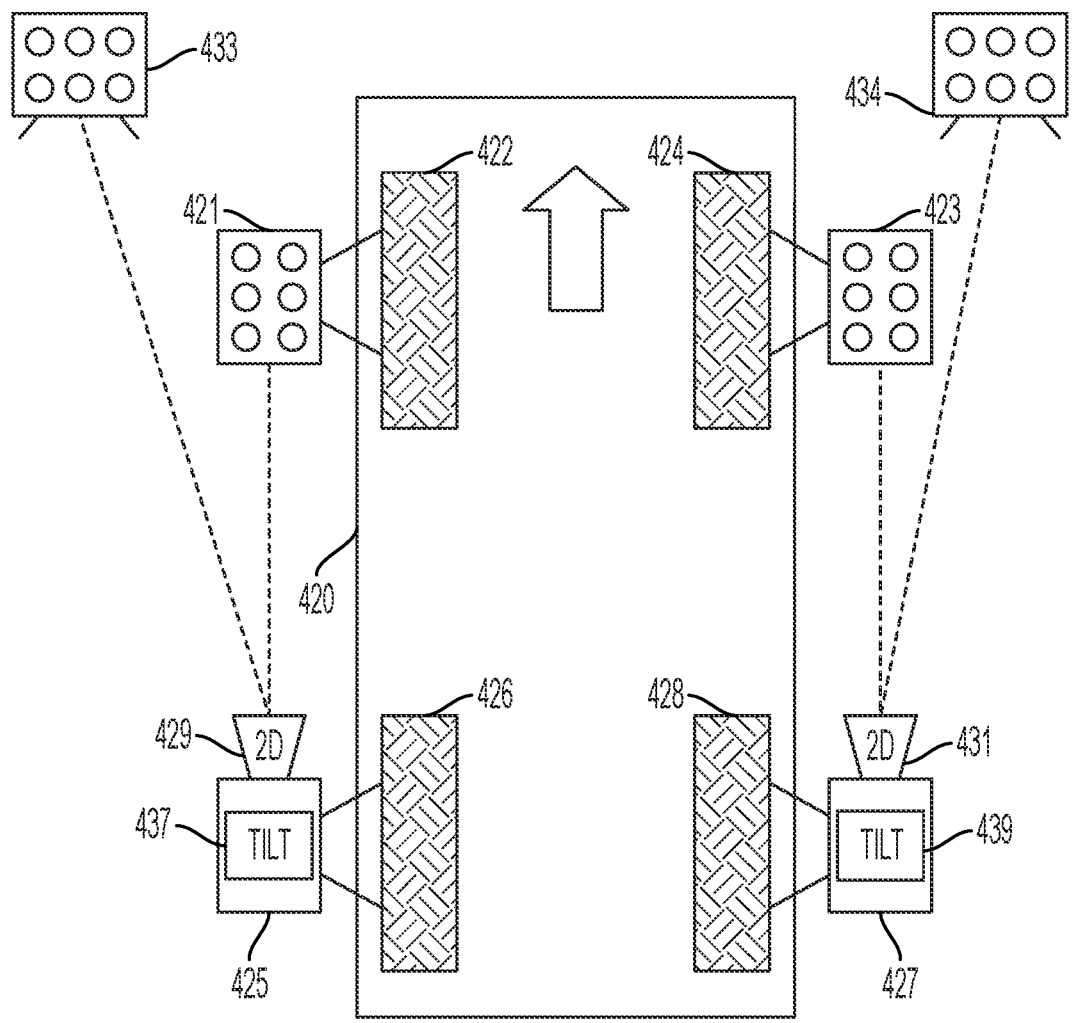
FIG. 4B is a schematic plan view of a 3D visual vehicle wheel aligner according to an embodiment of the present disclosure.

FIG. 4B diagrammatically illustrates an arrangement of targets and active sensing heads in relation to the wheels of a vehicle 420 under test; e.g., to measure one or more wheel alignment parameters, according to certain embodiments of the disclosed aligner. Except for the wheels 422, 424, 426, 428, elements of the vehicle 420 are omitted for ease of illustration.

The wheel alignment system includes a pair of passive heads 421 and 423 mounted on respective wheels 422 and 424 of the vehicle, which are front steering wheels in this example. The system also includes a pair of stationary passive targets 433 and 434 that are placed within the detection range of active sensing heads 425 and 427. The active sensing heads 425 and 427 are adapted for mounting in association with other respective wheels 426 and 428 of the vehicle, in this case the rear wheels. Each active sensing head includes an image sensor 429 or 431 for producing image data, which is expected to include images of the passive targets on one side of the vehicle 420 as shown. In this example, the image sensors 429 and 431 in the active sensing heads 425 and 427 are two dimensional (2D) imaging devices; e.g., cameras.

The targets 421, 423, 433, and 434 are passive in that they do not include any sensing elements. Each of the passive targets 421, 423, 433, and 434 is observed by one of the image sensors 429 or 431 in the active heads 425 and 427. A target 421, 423, 433, or 434 for image sensing by a sensor on another head may be active or passive. An active target, such as a light emitting diode (LED), is a source driven by power to emit energy (e.g., IR or visible light) that may be detected by a sensor. A passive target is an element that is not driven by power and does not emit energy for detection by a sensor. Assuming an image sensor in head 425 or 427, a passive target would be an object that reflects (or does not reflect) light or other energy in a manner detectable by the respective image sensor. In the example, although the targets could comprise one or more light emitting elements, the targets comprise light and dark regions that can be detected when illuminated by other sources and imaged by cameras or the like in the active sensing heads 425 and 427.

The active heads 425 and 427 also contain gravity sensors or the like to measure tilt, typically camber and pitch, of the head. In this first example, the head 425 includes one or more tilt sensors 437; and the head 427 includes one or more tilt 430 sensors 439.

The system also includes a derived spatial relationship between reference targets 433 and 434. The derived spatial relationship enables knowledge of the spatial relationship between the active and passive sensing devices when the sensing devices are mounted on wheels on opposite sides of the vehicle. For example, the image data of the reference targets 433, 434 is used to calculate plural poses of each of these targets as the vehicle is rolled, thereby reflecting changes in the position of the axis of rotation of the rear wheels 426, 428, as the vehicle is rolled, which in turn can be used to calculate the vehicle drive direction, and wheel alignment parameters. See the "Drive Direction Principles of Operation" section herein above. The spatial relationship between left and right side sensing devises is derived by knowing two or more coordinate directions that are common between the left and right sides of the vehicle. The embodiment shown in FIG. 4B uses vehicle direction and gravity as common coordinate directions. Alignment parameters for vehicle 420 are calculated using drive direction, according to the "Drive Direction Principles of Operation" section herein above.

It will be readily apparent to someone skilled in the art that the wheel alignment systems discussed herein may be implemented with various different types of common coordinate directions. Some other examples of common coordinate directions include but are not limited to Earth's magnetic field, direction to a common radio signal, direction to a common light source, direction to a common passive sensor, or direction to the floor or lift surface.

The disclosed system also includes one or more devices for processing image and sensor data. The processor(s) processes image data relating to observation of the targets, and tilt data from the active sensing heads. The data processing enables computation of at least one measurement of the vehicle. The exact position of the stationary passive targets 433 and 434 are not critical to the operation of the aligner, as long as they are visible to one or more sensing devices of the aligner, and do not move during the alignment process.

Other configurations of targets and sensors on and around the vehicle also work with this new process. For example, the passive targets 421 and 423 could be mounted to rear wheels 426 and 428 with the active sensors 425 and 427 mounted on the front wheels 422 and 424. There could also be configurations where active sensors 425 and 427 are mounted on the vehicle in such a way that targets could be seen on each of the vehicle wheels. In other embodiments, active sensors 425 and 427 are attached to each wheel and each has a view of stationary targets 433 and 434. In a further configuration, the gravity gauges are attached to the passive targets 421 and 423, and the active sensors 425 and 427 include only the cameras. There are many configurations of the various positions/locations of the sensors, more than are mentioned here.

Use of Drive Direction in CCD-Type Aligners

Figure 4C:
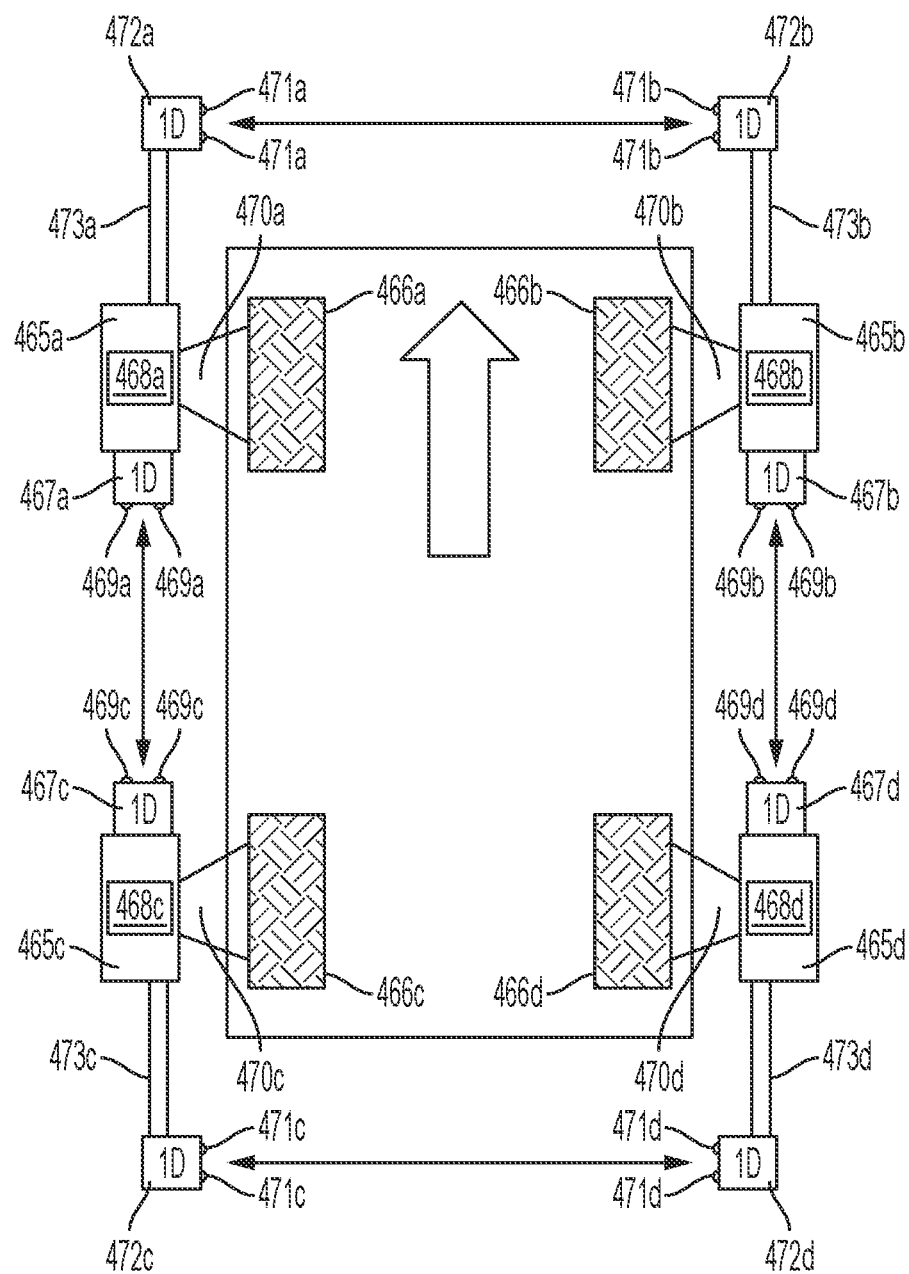
FIG. 4C is a schematic plan view of a prior art 2D vehicle wheel aligner.

CCD-type wheel aligners are well-known in the art, having been used extensively for several decades. The basic configuration of such aligners, as shown in FIG. 4C, is that imager/inclinometer "heads" 465a-d are mounted on each vehicle wheel 466a-d. Each head contains a 1D imager 467a-d, one or more inclinometers 468a-d, and illumination LEDs 469a-d. The heads are free to pivot about a shaft on a wheel clamp 470a-d, and are weighted and self-leveling. Camber angles are calculated from the inclinometers 468a-d in each head 465a-d, either with respect to gravity or with respect to another surface with an orientation which has been calibrated with respect to gravity. Rear wheel mounted heads 465c-d are forward-facing, and view the LEDs 469a-b on the front wheel heads 465a-b. The front wheel mounted heads 465a-b are rear-facing, and view the LEDs 469c-d on the rear wheel heads 465c-d.

For each side of the vehicle, front to rear toe angle ("track toe") is calculated from the relative left to right angle between the respective pair of front and rear heads 465a, 465c and 465b, 465d. To perform vehicle alignment measurements, however, we must know the relative left side to right side toe angles in addition to the front to rear toes. Therefore, in CCD aligners such as in FIG. 4C, the relative left to right side toe angle ("cross toe") is measured using LEDs 471a-d and a linear CCD array 472a-d that are mounted on a boom 473a-d of each of the heads 465a-d. Each boom 473a-d extends longitudinally away from the wheel 466a-d on which it is mounted, either behind and/or in front of the vehicle body.

For CCD aligners to be used, a runout compensation procedure must be performed. This can be accomplished using well-known techniques. In a typical configuration, it is performed by elevating the vehicle and rotating each wheel 466a-d in known angular increments to characterize the sinusoidal variation in toe and camber. By measuring the change in camber and toe angles with roll angle, the runout of each head 465a-d is determined with respect to the wheel on which it is mounted.

Figure 4D:
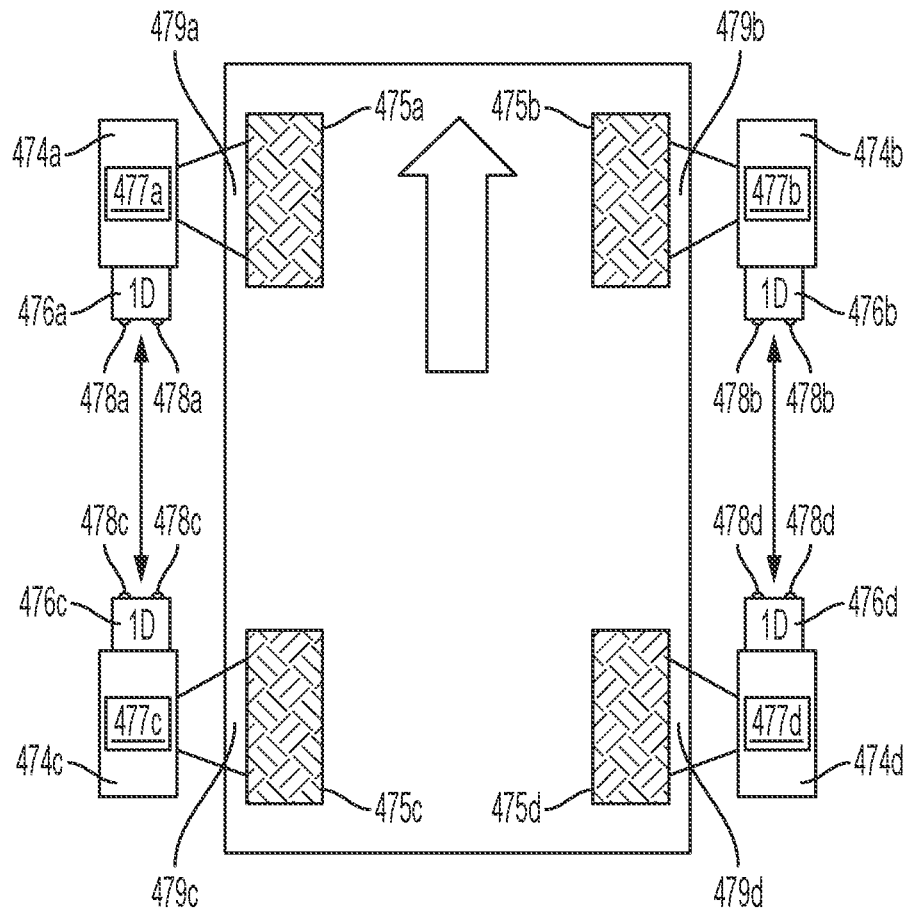
FIG. 4D is a schematic plan view of a 2D vehicle wheel aligner according to an embodiment of the present disclosure.

As shown in FIG. 4D, when drive direction methodology is incorporated into a CCD aligner according to the present disclosure, the longitudinally extended booms on the CCD heads are eliminated, providing multiple benefits. The heads are much more compact, resulting in a smaller and lighter head or "pod" that is more user friendly. There are fewer sensors, facilitating a lower cost system. Boom tubes 473a-d are included in conventional CCD aligners to facilitate cross toe measurements. However, in this embodiment, cross toe measurements are instead provided by adapting drive direction methodology to a CCD-type aligner.

The basic configuration of the disclosed aligners, as shown in FIG. 4D, is that imager/inclinometer heads 474a-d are mounted on each vehicle wheel 475a-d. Each head contains a 1D imager 476a-d, one or more inclinometers 477a-d, and illumination LEDs 478a-d. The heads are free to pivot about a shaft on a wheel clamp 479a-d, and are weighted and self-leveling. Rear wheel mounted heads 474c-d are forward-facing, and view the LEDs 478a-b on the front wheel heads 474a-b. The front wheel mounted heads 474a-b are rear-facing, and view the LEDs 478c-d on the rear wheel heads 474c-d.

As discussed herein above, the basic operating principle of 3D drive direction systems is to measure two or more common directions from both sides of the vehicle. Then, using a rotation optimization algorithm (singular value decomposition based methods, the triad method, among others), calculate the least squares rotation between the left and right sides of the vehicle using the two or more common directions from each sides as the input. CCD-type aligners, however, are slightly different from 3D aligners—at their core, they are 2D measurement devices. The same rotation optimization principle can be used, however, despite this reduction in dimensionality. This can be performed using (among other methods) a generalization of the Kabsch algorithm for finding the optimal transformation between two 2D coordinate systems. Using such an algorithm, we can use the measurements from inclinometers 477a-d and the 2D drive directions to determine the rotation between left and right sides of the vehicle (after performing runout compensation in the same manner as in the conventional CCD aligner of FIG. 4C) that is equivalent to the aforementioned "cross toe" measurement provided by a direct measurement with cross-viewing 1D CCD arrays 472a-d.

Extension of Drive Direction to Truck Aligners

Certain conventional aligners, typically designed for use on trucks, are in some respects similar to the CCD aligners discussed above. Alignment angles are calculated in a 2D manner, with sensor heads mounted on the vehicle wheels. However, there are core differences in the sensors used; in particular, the image sensors used in typical truck aligners are 2D cameras, and not the 1D linear arrays used in CCD-type aligners. With calibrated 2D cameras, the same 2D:3D pose estimation process used in 3D aligners can be performed.

Figure 4E:
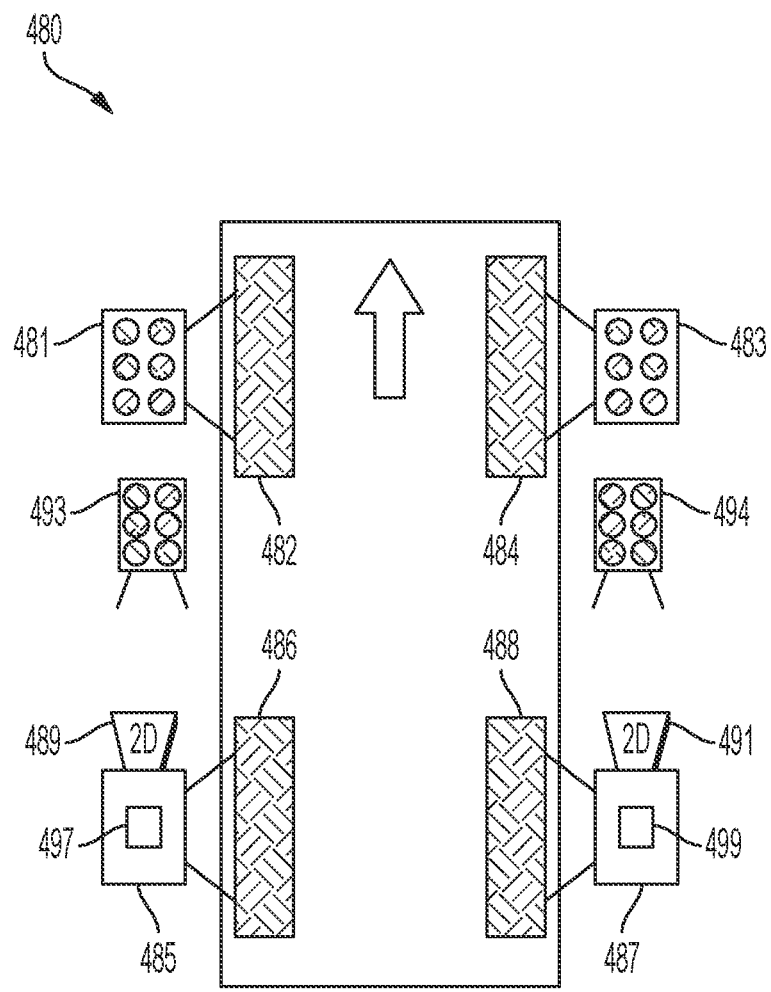
FIG. 4E is a schematic plan view of a 3D vehicle wheel aligner according to another embodiment of the present disclosure.

Such an aligner 480 is shown in FIG. 4E. Wheel alignment system 480 includes a pair of passive heads 481 and 483 rigidly mounted on respective wheels 482 and 484 of the truck, which are front steering wheels in this example. The system also includes a pair of stationary passive targets 493 and 494 of known geometry that are placed within the detection range of active sensing heads 485 and 487. The active sensing heads 485 and 487 are rigidly mounted on other respective wheels 486 and 488 of the truck, in this case the rear wheels. Each active sensing head includes an image sensor 489 or 491 for producing image data of the passive targets on one side of the vehicle as shown. In this example, the image sensors 489 and 491 in the active sensing heads 485 and 487 are two dimensional (2D) imaging devices; e.g., cameras. The active heads 485 and 487 also contain gravity sensors or the like to measure tilt, typically camber and pitch, of the head. In this first example, the head 485 includes one or more tilt sensors 497; and the head 487 includes one or more tilt sensors 499.

To apply drive direction calculations to an aligner such as aligner 480, the truck is rolled, producing a 3D translation direction that is the same on both sides of the truck. This drive direction gives us one direction in common, measured from both camera coordinate systems on both sides of the truck. Since the truck aligner 480 wheel-mounted sensor heads 485, 487 have inclinometers 497, 499, a second common direction (gravity) can be measured in the sensor heads 485, 487 on both sides of the truck, and drive direction for the truck can be calculated as discussed herein above.

If the wheel-mounted sensor heads of a particular truck aligner do not have inclinometers, the 3D rotation between left and right sides of the vehicle cannot be calculated without at least one additional common direction measured on both sides of the vehicle. There are various ways in which this could be accomplished. One way is to rigidly attach inclinometers to the sensor heads, such that the rotation from the inclinometer to the camera in the sensor head is known (i.e., as in sensor heads 485, 487). Another technique is to rigidly colocate an inclinometer to each of the aforementioned stationary targets of known geometry (such as targets 493, 494 of aligner 480). The inclinometer must be calibrated with respect to the target such that the 3D rotation between the target coordinate system and inclinometer coordinate system is known. In this way, by measuring the orientation of the stationary reference target, the direction of gravity in both sensor heads is also known. Yet another concept is to hang a plumb line (which aligns itself with gravity due to gravitational force) in view of both the left and right side wheel mounted cameras. In this way, a second unique common direction can be measured on both sides of the vehicle.

There are various other ways in which common directions could be measured on both sides of the vehicle, including the use of gyroscopes, magnetometers, and other sensors. As long as two or more common directions on both sides of the vehicle are measured, we can measure the relative orientation of left and right measurements and calculate "cross" toe angles without directly measuring the left to right rotation. This eliminates the need for rigid fixtures of known relative orientation that span both sides of the truck, or obtrusive sensors that directly measure across the left to right sides of the vehicle.

Wheel Alignment Systems and Methods Using Drive Direction Calculation and Having Active Sensors Mounted Off a Vehicle As discussed herein above, some conventional camera based aligners require the left and the right side cameras to be rigidly mounted to a beam and their relative location needs to be known. Other types of conventional camera based aligners use an additional camera to look between the measurement cameras (i.e., across the vehicle) at a target to relate the relative positions of the measurement cameras. All of these aligners require either expensive components, or have structures that can get in the way, or both. Thus, there is a desire for an aligner that does not require extra hardware to calibrate the relative camera to camera positions, and/or one that does not require a rigid beam between the two cameras to free up space for the shop and the technician.

Figure 5A:
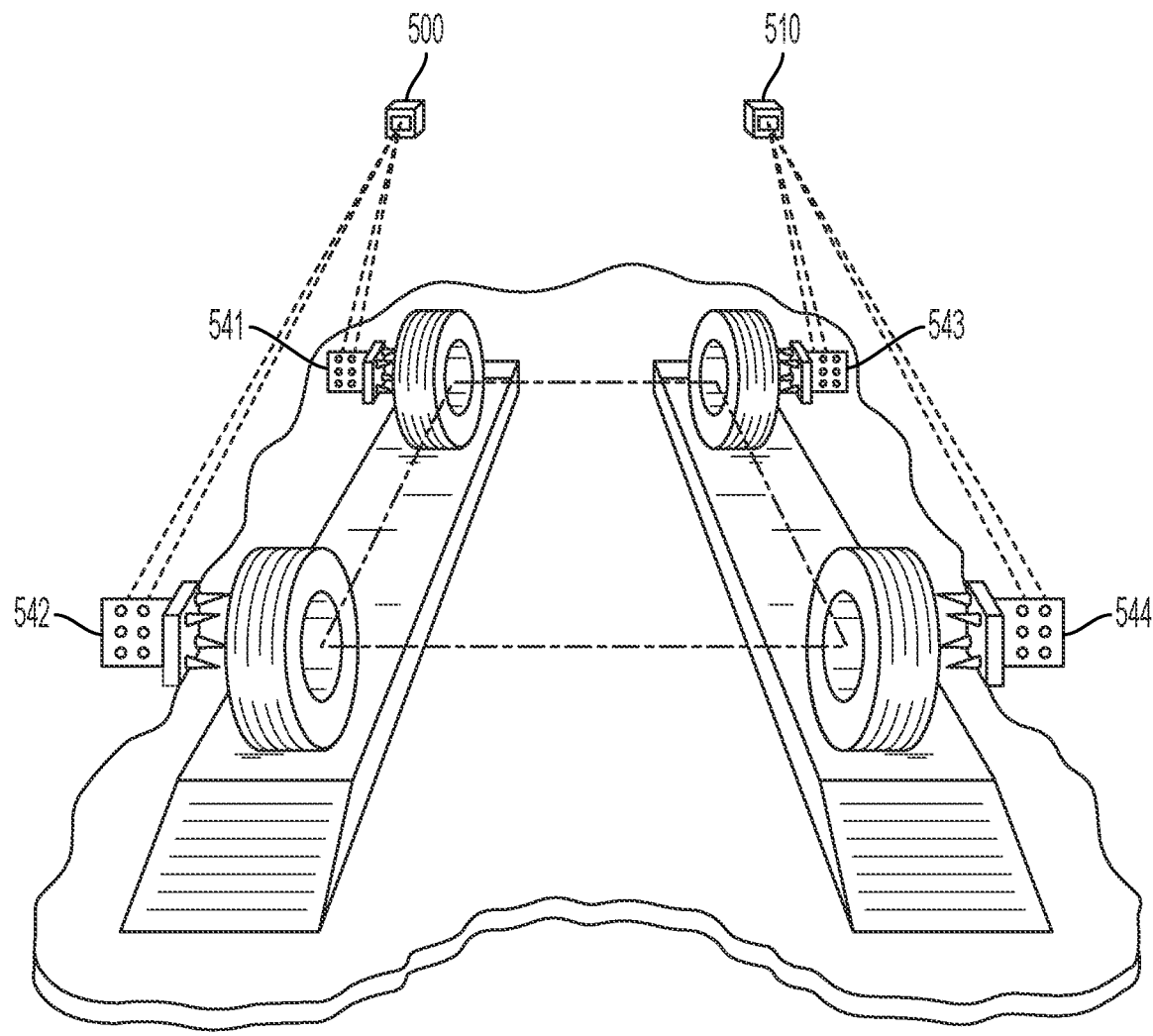
FIGS. 5A and 5B are schematic perspective views of 3D visual vehicle wheel aligners according to embodiments of the present disclosure.

In an embodiment of the disclosed aligner shown in FIG. 5A, two cameras 500, 510 with on board gravity gauges are placed in front of and beside the vehicle to be measured. Two targets (for a two-wheel alignment) or four targets 541, 542, 543, 544 are attached to each of the four vehicle wheels. The cameras 500, 510 measure the pose of the targets 541, 542, 543, 544 and the vehicle is rolled to another position (e.g., about 8") and the cameras re-measure the pose of the wheel targets. Of course, more than two poses of the targets can be measured. The axis of rotation and the drive direction of each wheel is measured from the target poses, and the gravity gauge readings are measured. Using the drive direction vectors and the gravity gauge measurements, the toe and camber are calculated for the vehicle under test, according to the "Drive Direction Principles of Operation" section herein above.

There are many different places the cameras can be positioned to be able to perform this alignment. For instance, in certain embodiments the cameras are placed behind the vehicle. In other embodiments the cameras are instead placed beside or even overhead of the vehicle. Alternatively, the cameras can be mounted on tripods off the floor, on shelves on the wall, or attached directly to the alignment rack or the supports thereof.

Figure 5B:
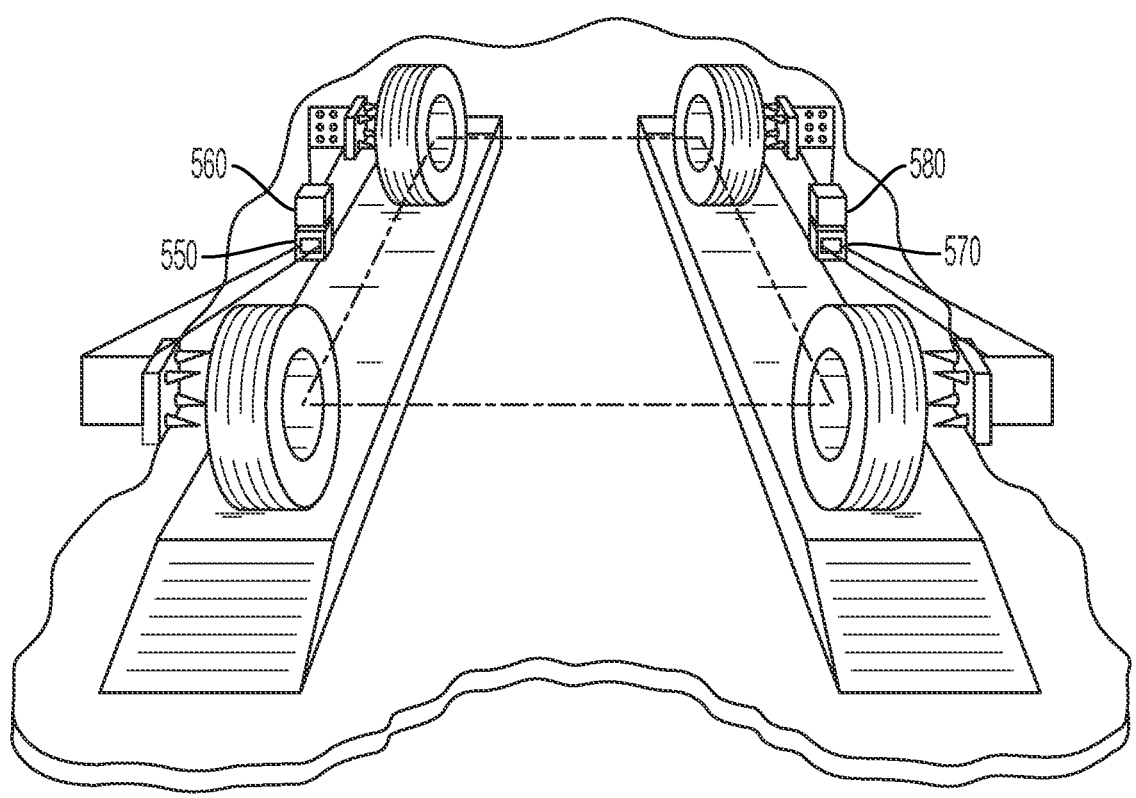

In other embodiments illustrated in FIG. 5B, more than two cameras can be used. For instance, four cameras 550, 560, 570, 580, one for each wheel, can be positioned between the front and rear wheels for a more compact arrangement. For larger vehicles such as trucks, a plurality of cameras can be arranged to view the target attached to a single wheel or combination of more than one depending on the area and size of the truck being aligned.

Performance Enhancements Using Drive Direction Calculation for Visual Wheel Aligners As discussed herein above, conventional camera based aligners require the relative position of the cameras to be known. If the relative positions of the cameras change, then the aligner will measure the vehicle's alignment incorrectly. Also, vehicles being in perfect alignment still can exhibit behaviors that would be considered a bad alignment; for instance, "tire pull" will cause the vehicle to drift and a steering input will be required to keep the car going straight. In this case, the customer would consider that the alignment was not done correctly. Thus, there is a need for a way to diagnose and re-calibrate an aligner if the relative positions of the cameras changes over time. Further, there is a need for an aligner to measure the difference between the measured thrust angle and the actual drive direction to help diagnose and or adjust the vehicle to compensate for it.

In this embodiment, during the positioning sequence when the vehicle is rolled and the cameras measure the pose(s) of the wheel targets to measure the regular alignment angles, a measurement of drive direction is also calculated, according to the "Drive Direction Principles of Operation" section herein above. Comparing the drive direction of each of the four wheels to each other will indicate if the calibration of the relative camera position is still good. Since the drive directions of all wheels should be the same, the amount which they differ from each other is an indication of the calibration of the relative camera position, or other camera calibrations. In many cases, a warning could be given to have the technician to re-calibrate the aligner. In other cases, a change to the calibration can be made to make all the drive directions parallel and thus bring the relative camera position back into calibration. The drive direction errors from wheel to wheel can be averaged over many vehicle measurements to ensure that a single rogue measurement will not change the accuracy of the aligner. Further, if an alignment measurement has a disagreement in the drive direction, it could be an indication of a bad measurement sequence, and a message to the operator could be communicated to re-do the measurement. This is helpful to identify a problem with the measurement sequence before the alignment is performed and the vehicle is adjusted incorrectly.

Figure 6:
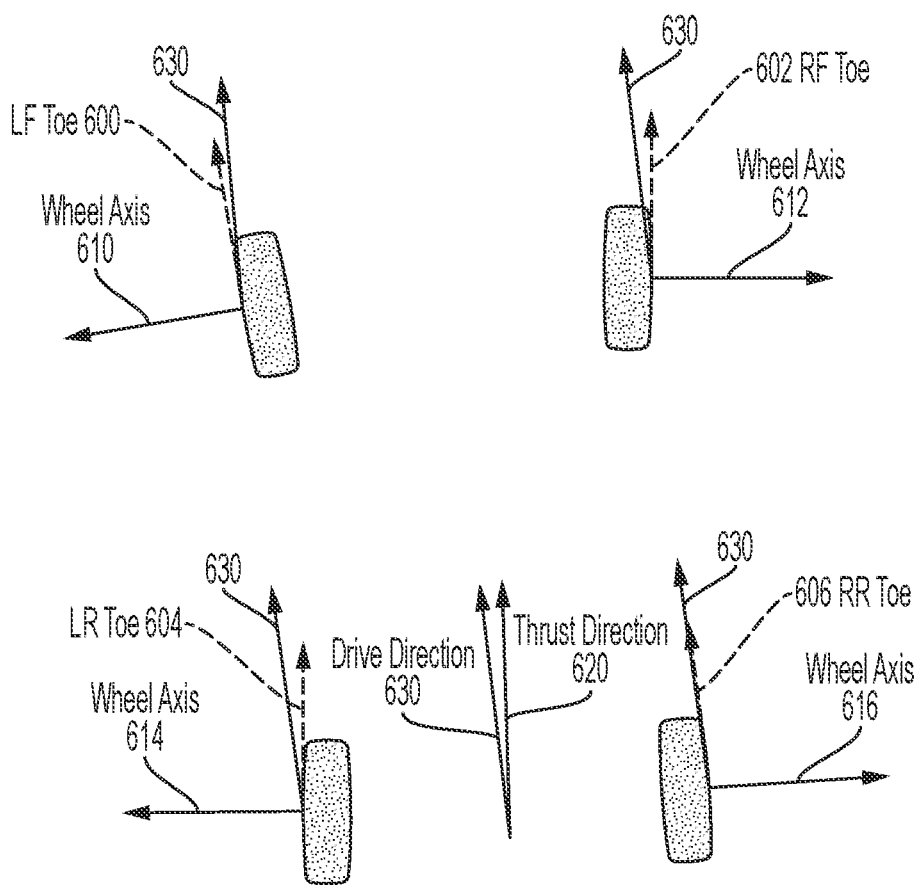
FIG. 6 is a schematic plan view illustrating various wheel alignment parameters of a vehicle.

It is generally accepted that the vehicle will travel along its thrust line (also referred to as thrust direction). To this end, in conventional aligners front toe is displayed on a user interface and thus aligned to the thrust angle of the vehicle. Referring now to FIG. 6, toe direction 600, 602, 604, 606, is defined as the direction the individual tire would travel, and as such it is 90 degrees to the wheel axis 610, 612, 614, 616. The thrust direction 620 is the average of the two rear toe directions. It is generally accepted that the vehicle will travel along the thrust direction. Drive direction 630 is the measured direction in which the vehicle actually travels.

Should the vehicle not travel along the thrust line 620 as defined and measured, then the vehicle will be adjusted correctly to the thrust line 620, but will not actually drive down the road that way and will appear to the operator that it was not aligned correctly. This can be a significant issue as the technician does the alignment correctly, but on a subsequent drive the vehicle behaves as if he did it incorrectly. By comparing the drive direction 630 to the thrust direction 620, we can get a measurement of this issue and how significant it would be in a test drive. If the difference is small (e.g., under 0.1 degree), then there is nothing to be concerned about. However, if there is a large difference (e.g., more than 0.1 degree), then there could be an issue with the drivability of the vehicle even after it is aligned to industry standards. In these cases, it is advantageous that the technician inspect the vehicle for the cause of the difference, and in other cases to align the front wheels to the drive direction or a combination of the thrust and drive directions.

Some of the causes of a deviation between thrust line and drive direction are, but not limited to, different tire pressures, different sized tires, tire rubber with larger rolling resistance on one or more wheels, interactions between toe and camber that affect the contact patch of each wheel.

Drive-Through Aligner Using Drive Direction Calculation

According to further embodiments, a vehicle to be aligned has targets mounted on its wheels, and is driven or rolled between a pair of camera pods each having a plurality of cameras that are positioned to view the targets on one side of the vehicle. The cameras each collect image data of the targets on their respective side of the vehicle, and the system combines the images from the plural cameras to determine a series of poses for each target, which are then used to calculate alignment parameters, such as toe and camber, for the vehicle. The system also calculates the drive direction of the vehicle as the vehicle is moving, and uses the drive direction calculation as a reference for the alignment parameters. The system displays the calculated alignment parameters to the user on a monitor or other display device in a conventional manner, such as with a conventional user interface.

A vehicle wheel alignment system according to the present disclosure has a pair of elongated beam-shaped camera pods, each having plurality of cameras and a calibration target mounted along a horizontal axis of the pod and facing in the same direction. The two pods are mounted with their cameras and calibration targets facing each other on opposite sides of a vehicle to be aligned; for example, on opposing sides of an alignment rack. Targets to be viewed by the cameras of the pods are mounted on the vehicle wheels, and the vehicle is driven or rolled between the two pods and past all of the pods' cameras without a pause.

Each camera of one of the pods is for viewing all the wheel targets disposed on one respective side of the vehicle, and for capturing image data of the targets as the wheels and targets are continuously rotated a number of degrees of rotation without a pause; that is, as the vehicle rolls past the pods. The image data is used to calculate a minimum number of poses of the targets viewed; for example, at least one pose for every five degrees of rotation as the wheels and targets are continuously rotated the number of degrees of rotation without a pause. After the vehicle rolls past the pods, the system processes the captured image data of each target from the plurality of cameras of each respective pod (i.e., the system combines the image data from the plurality of cameras of a pod) to produce a series of poses for each of the targets that cover close to a 360 degree rotation of the target. In one embodiment, three cameras of a pod capture poses covering a 330 degree rotation of each of the targets they viewed. In certain embodiments, each of the pods comprises a data processor for performing the steps of preprocessing the image data, and calculating an alignment parameter for the vehicle based on the preprocessed image data. The calculated alignment parameters are displayed to the user on a monitor or other display device in a conventional manner, such as with a conventional user interface.

A key technology enabling the disclosed aligner and the functionality described herein is the very fast measurement process explained in detail herein above in the "Drive Direction Principles of Operation" section.

Figure 7A:
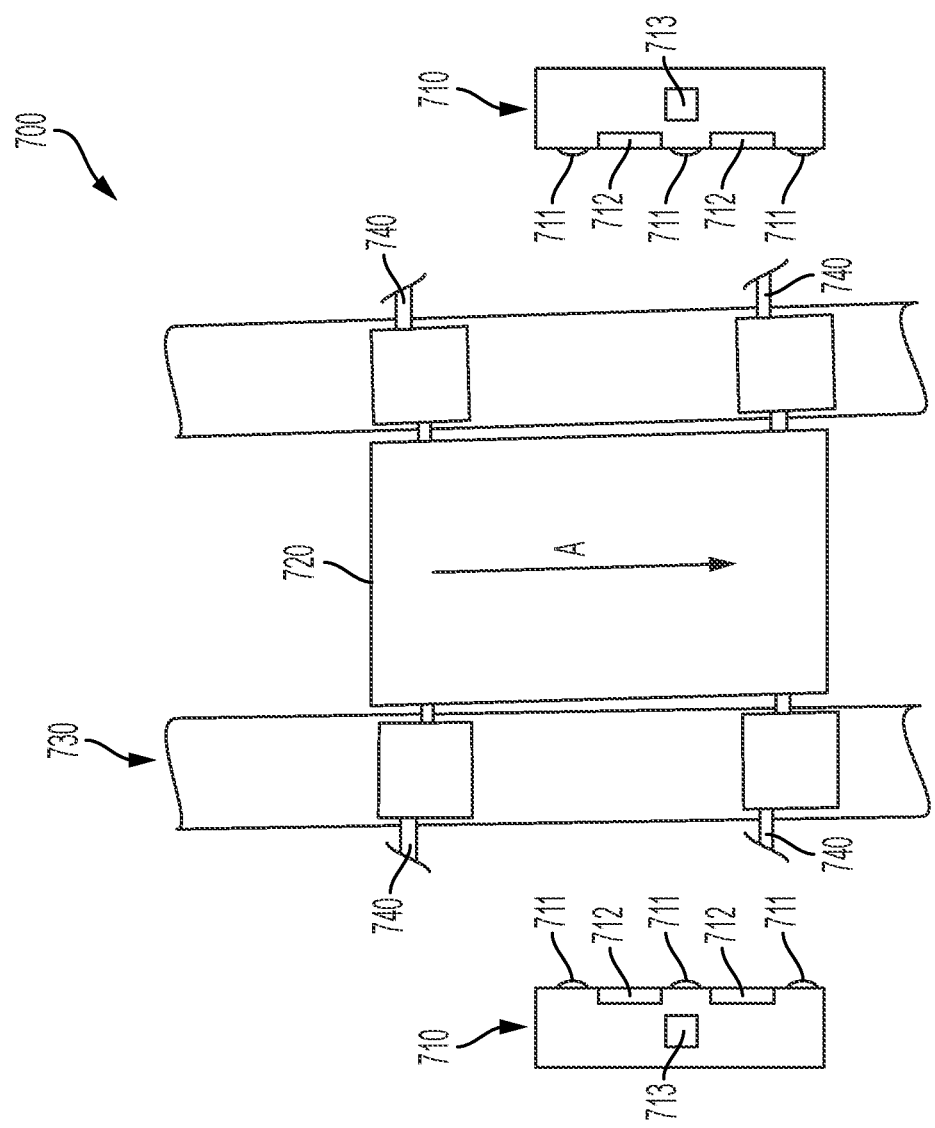
FIG. 7A is a schematic top plan view of an alignment system according to various embodiments of the present disclosure.

An exemplary embodiment of the disclosed aligner will now be described with reference to FIGS. 7A-D. As shown in FIGS. 7A-C, an aligner 700 comprises a pair of camera pods 710, each having three cameras 711 and two calibration targets 712. Each of the pods 710 further comprises a data processor 713 for performing the steps of preprocessing image data, and calculating an alignment parameter for the vehicle based on the preprocessed image data. Pods 710 are disposed with their cameras 711 and calibration targets 712 facing each other on opposite sides of a vehicle 720 to be aligned, such as a tractor of a tractor-trailer combination. In this embodiment, vehicle 720 is on a rack 730 between the pods 710. FIG. 7C illustrates one of the pods 710, which in this embodiment is mounted on a base 714 attached to the floor or other suitable surface.

Figure 7D:
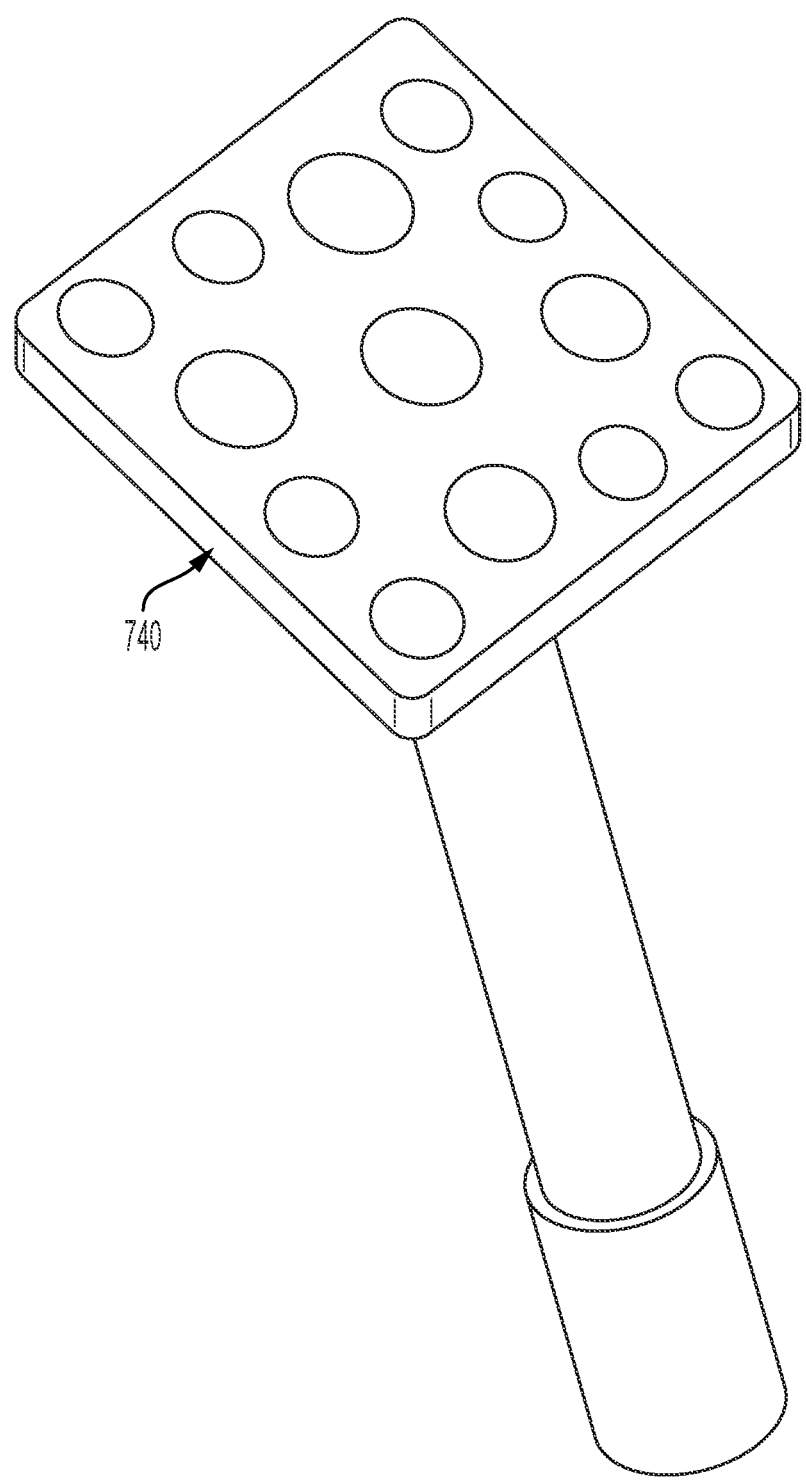
FIG. 7D is a perspective view of a target according to an embodiment of the present disclosure.

Referring again to FIGS. 7A-B, targets 740 to be viewed by the cameras 711 of the pods 710 are mounted on the wheels of vehicle 720. An embodiment of the targets 740 is shown in FIG. 7D, wherein each target 740 has a tubular support with a magnet at its distal end for attaching to a lug nut or lug bolt of vehicle 720. The tubular supports vary in length between targets to accommodate the shape and/or offset of the wheel to which a particular target 740 is to be attached. For example, the front wheel of a truck will typically require a target with a short support, while a rear wheel of a truck may require a relatively longer support. Each target 740 has a conventional target head with circular indicia, the target head being mounted to its tubular support such that it can be seen by all the cameras 711 of a respective pod 710 when it is mounted to a wheel of the vehicle 720.

Prior to performing an alignment, the calibration targets 712 and cameras 711 are used to position the pods 710 in a conventional manner. In an exemplary embodiment, the pose measurement of the calibration target 712 of one of the pods 710 is calculated from image data from the other pod's cameras 711. The geometry of all the cameras 711 and calibration targets 712 of both pods 710 is known, either from manufacturing tolerances or by calibrating the relative positions of all the calibration targets 712 and cameras 711 using well-known procedures of relative camera to camera position (RCCP), and relative camera to target position (RCTP). A measurement of the relative pose of the two beams with respect to each other is calculated using this information, and is displayed on a monitor. The system's user interface guides the technician to place the pods 710 in optimal positions by displaying the pose measurements and the ranges of acceptability. Distance between pods, parallelism, and offsets are a few of the controlled set-up criteria.

During the alignment procedure, vehicle 720 is driven or rolled between the two pods 710 and past all of the pods' cameras 711 without a pause, in the direction of arrow A, capturing image data of the targets 740. The image data is used to calculate a predetermined minimum number of poses of the targets 40 viewed; for example, at least one pose for every five degrees of rotation of the wheels of vehicle 720.

After the vehicle 720 is driven or rolled past the pods 710, the processors 713 process the captured image data of each target 740 from the plurality of cameras 711 of each respective pod 710 (i.e., the system combines the image data from the plurality of cameras 711 of a pod 710) to produce a series of poses for each of the targets 740 that cover close to a 360 degree rotation of the target. Data processors 713 perform the steps of preprocessing the image data, and calculating alignment parameters, such as toe and camber, for the vehicle based on the preprocessed image data. Due to the use of multiple cameras to determine target poses, the disclosed system's accuracy in measuring alignment parameters is significantly improved over prior systems. For example, while conventional systems are accurate to within 0.05 degree, the disclosed system is accurate to within 0.01 degree or better.

To achieve these high accuracies, a large roll angle for the vehicle wheels is required; e.g., more than 45 degrees of roll. However, for any given camera the roll angle that can be seen by the camera is limited by the camera's field of view (FOV). A camera with a large FOV requires a lens with high distortion and low pixel density, thereby compromising accuracy; but if standard lens cameras having a FOV in the range of 30 degrees are used, the roll angle that can be seen by each camera is limited to 20 or so degrees of rotation (depending on the diameter of the vehicle wheel).

To achieve the desired accuracy in the disclosed system, a roll angle of about 90 degrees is acceptable but even more is desirable. By disposing the cameras 711 of the disclosed system separated from each other in the direction that the vehicle 720 under test is rolled or driven, plural cameras 711 can each see a piece of the vehicle wheels' roll, covering 90 degrees or 180 degrees or even 330 degrees when the pieces are combined, depending on how far apart the cameras 711 are located, and how many cameras 711 are used in each pod 710. Of course, the RCCP must be known so all the cameras 711 measure the wheels' roll in a common coordinate system. Having more than two cameras is advantageous so there can be more coverage. Also, two independent measurements allow the system to check for and either warn of, or compensate for, errors.

In conventional camera-based alignment systems, where the vehicle to be aligned is effectively static, a vehicle coordinate system (VCS) is determined based on the front two wheel locations and the rear two wheel locations. A base plane is determined (i.e., the plane the vehicle is sitting on), and camber is measured thereto. The geometric center line (GCL) of the vehicle is measured based on the centers of the front wheels and the center point between the rear wheels, and rear toe angles are referenced to this GCL as the zero line. See, e.g., U.S. Pat. No. 5,724,743.

In contrast, in the disclosed system, when the vehicle 720, such as a truck, rolls past the cameras 711, the system only sees one axle at a time. To define each axle and determine a coordinate system for them, the wheel centers for an axle are determined in a conventional manner when the axle enters the range of the cameras 711, and then again when it exits camera range. A vehicle coordinate system (VCS) is built as in conventional alignment systems; however, a VCS is built for each axle separately. Note that it is a virtual coordinate system as there aren't two axles used in its determination: just one axle measured in two places. The virtual VCS is created by treating the wheel centers of an axle, upon entry, as a set of rear wheels, and treating the wheel centers of the axle upon exit as a set of front wheels. The virtual VCS is then built as in conventional alignment systems.

The virtual VCS is used to calculate the toe and camber for each axle. Additionally, since the vehicle 720 is a rigid body, each axle has the same drive direction, so the system can compare each axle's toe to each other axle's toe by equating each axle's drive direction. Therefore, the relative toe of two axles can be measured (i.e., the axle scrub), without the cameras 711 seeing both axles at the same time.

Further regarding the drive direction of a vehicle, the direction that the center of each wheel of vehicle 720 moves is measured during the time vehicle 720 moves past the cameras 711, which can be referred to as "the positioning sequence." As explained in detail herein above, since the vehicle is a rigid body, wheel centers are connected to each other (although they rotate independently). Thus, the drive directions of; for example, two wheels of the vehicle are the same. The location of the center of a wheel can be plotted at the beginning and at the end of the positioning sequence, or at many discrete points thru the positioning (also referred to as "run-out") of the wheels. This information can be used to get an overall drive direction from beginning to end of the positioning sequence, or smaller drive directions as the vehicle moves through the positioning sequence. The system can compare the overall drive directions or the smaller discrete ones.

There are many uses for the drive direction calculation in this embodiment. After the two sides of the aligner (both pods 710) are calibrated to each other, drive direction measurements from each side can be determined and compared to confirm that the aligner is still in calibration. If the drive directions are not the same, then the aligner is out of calibration. Additionally, in an embodiment where the system has two cameras, one on each side of the vehicle, but they are not rigidly attached to each other and not pre-calibrated, the drive direction of each side of the vehicle is measured. Since the drive directions should be the same, the location of each camera can be calibrated. This is a significant cost and complexity savings.

A further embodiment removes the need for the RCTP calibration, which is used to find where each beam is located in relation to the other beam. Each beam measures the drive direction of the vehicle, and when we couple that with one or more directions or vectors that are measured by both beams, we can find where one beam is located in relationship to the other beam. Once we know where the two beams are located relative to each other, we can compute the alignment angles in a similar manner as in previous embodiments.

As discussed herein above, the other one or more common directions or vectors can be from a variety of sources. The direction of gravity can be used, the plane between a beam's center camera and the other beams targets, etc. If the embodiment does not use the beam targets, they can be eliminated from the system. If it uses the direction of gravity, each camera pod 710 includes a conventional inclinometer or the like.

In another embodiment, the vehicle is rolled or driven in between the camera beams and stops while the cameras can still see the wheel targets. The aligner continuously checks to see if the wheels have stopped translating and/or rotating to determine when the vehicle has stopped. Once the vehicle has stopped, the user interface automatically displays the live updating alignment angles, enabling the user to adjust the vehicle alignment.

In a further embodiment, the vehicle is rolled or driven in between the camera beams and the aligner detects if the vehicle's alignment needs to be adjusted and tells the user to stop inside the camera beams. The aligner continuously checks to see if the wheels have stopped translating and/or rotating to determine when the vehicle has stopped. Once the vehicle has stopped the user interface displays the live updating alignment angles, enabling the user to adjust the vehicle alignment.

In another embodiment, the pose of the wheel is determined without a target attached to the wheel. There are several conventional ways this can be accomplished, such as by using stereoscopic cameras (i.e., two cameras with overlapping fields of view), structured light, lasers, etc.

Alignment of ADAS Targets Using Drive Direction Calculation

Figure 8A:
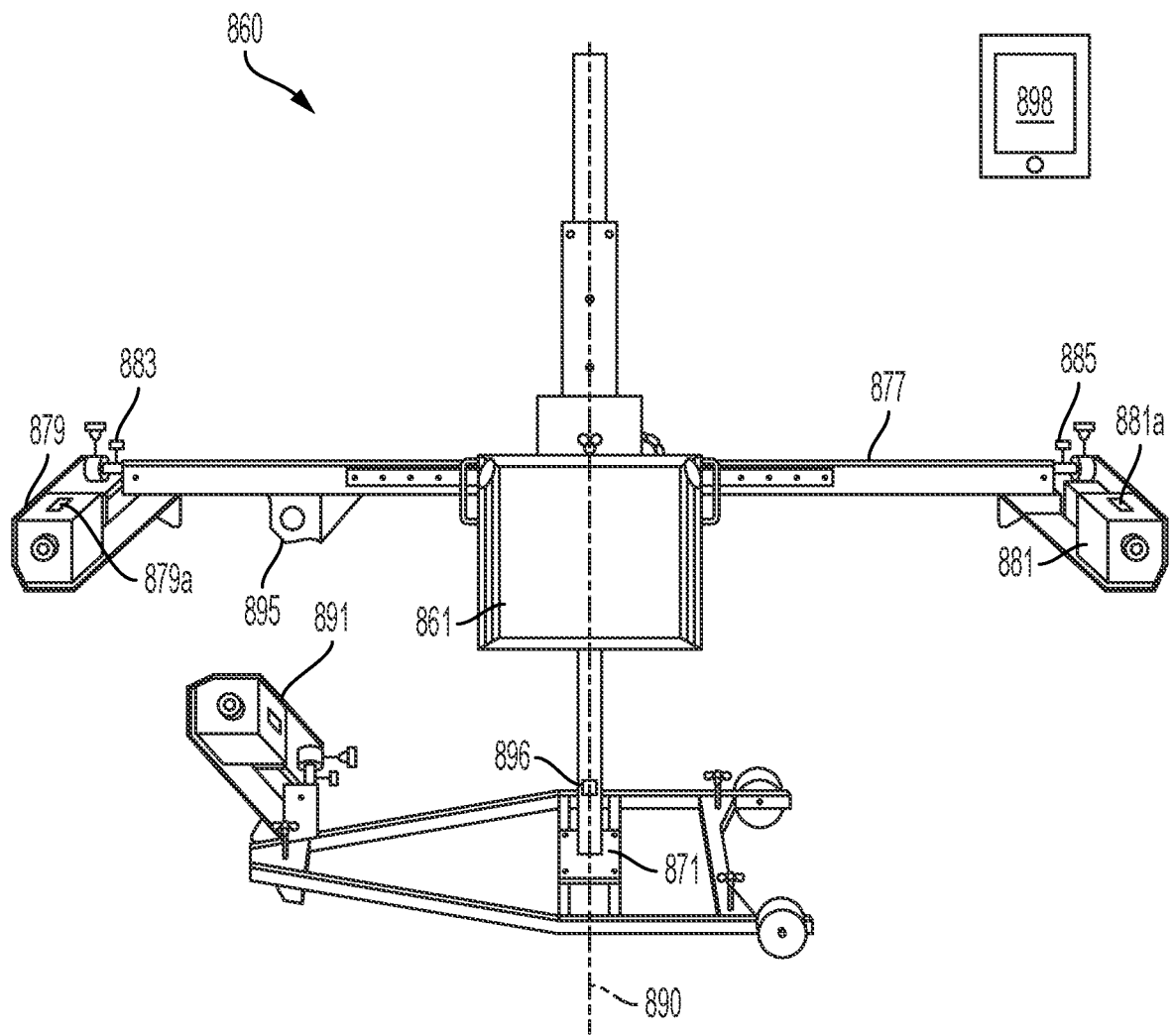
FIG. 8A is a front perspective view of an ADAS calibration element fixture according to an embodiment of the present disclosure.
Figure 8B:
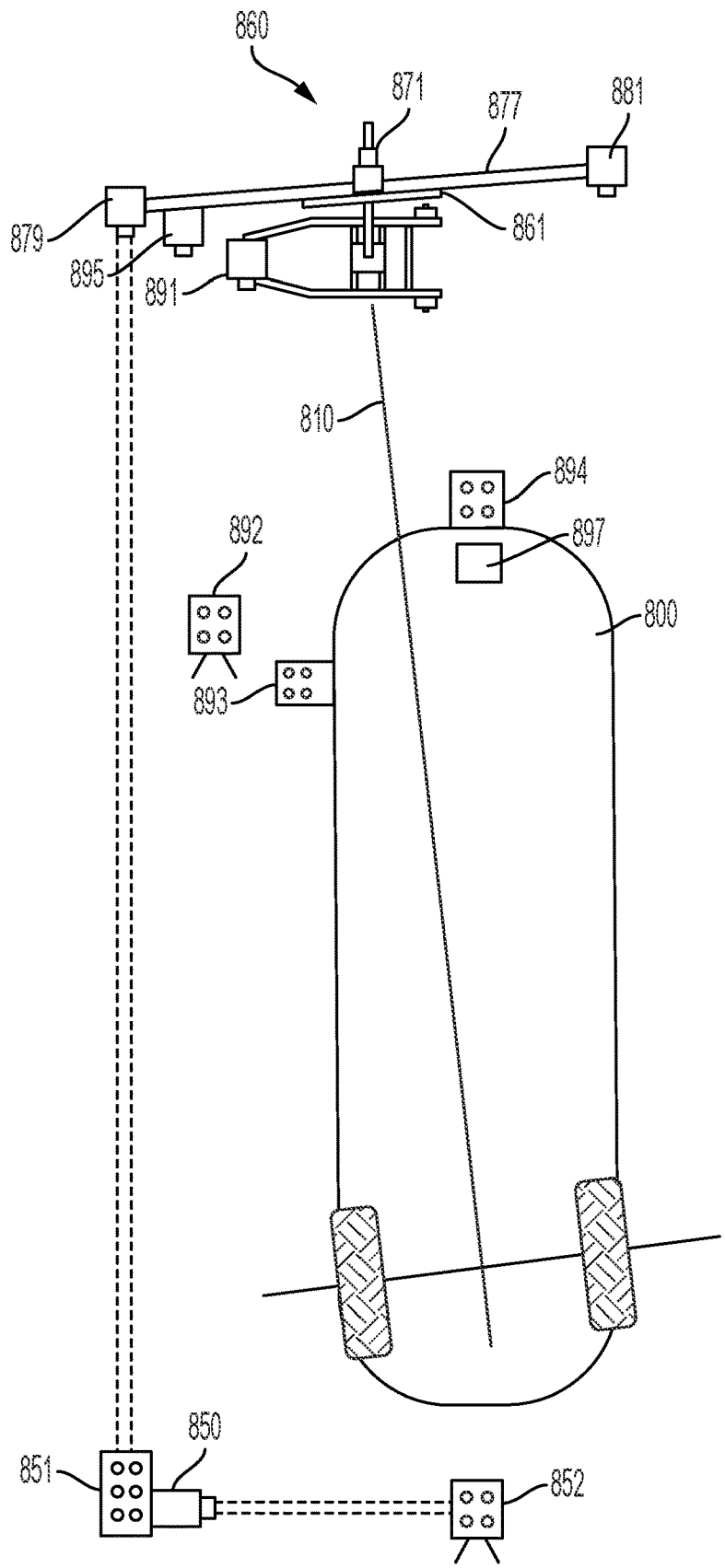
FIG. 8B is a plan view of the fixture of FIG. 8A in use to calibrate ADAS sensors of a vehicle.

Advanced driver assistance systems (ADAS) in vehicles aid the driver and provide an additional level of vehicle safety. This includes systems like adaptive cruise control, lane departure warning, collision avoidance, and rear collision warning. These systems use a combination of sensors like cameras, sonar, and radar that may require calibration to operate correctly. Calibration is performed by placing elements in a known relationship to the vehicle. Calibration elements are known sources or reflectors such as lasers, mirrors, targets, or heat sources. A carrier stand 871 as shown in FIG. 8A is provided to hold the calibration element(s) 861 in a known location relative to the base of the fixture 860. The carrier stand 860 is oriented to the vehicle 800 relative to the desired line of the vehicle like the thrust line 810 as shown in FIG. 8B. U.S. Pat. Nos. 7,121,011 and 6,823,601 have descriptions of types of ADAS, adaptive cruise control, and the structure, use, and operation of a carrier stand.

Conventional systems exist that perform vehicle/carrier stand orientation using simple manual measurement by drawing a grid on the floor or lining up elements using a laser line. Systems also exist that use a computerized wheel alignment system with elements placed on the carrier stands to orient and position the calibration elements in relation to the vehicle. Using a wheel alignment system has many advantages, primarily that the procedures are guided by the aligner user interface, making it faster and requiring less skill from the operator. Moreover, the wheel alignment system can measure and document that the procedure was performed correctly. These systems all depend on direct measurement of the required vehicle line by locating multiple points on the vehicle body or directly measuring the combined direction of the rear wheels. It is desirable to create a lower-cost, simpler system that does not require a full wheel alignment system, while still providing a guided operation to the user to direct the location and orientation of the carrier stand and measure and document the location of the calibration elements.

According to embodiments disclosed herein, one or more image sensors (such as cameras) are placed on a carrier stand and one or more targets are placed on the vehicle to measure the drive direction of the vehicle, as described in the "Drive Direction Principles of Operation" section herein above. Alternatively, one or more cameras on the vehicle and one or more on the carrier stand, including targets for calibration of the ADAS system, can be used to measure the drive direction of the vehicle. The drive direction is assumed to be parallel to the vehicle thrust line and can be used as the line for orientation of the carrier stand to the vehicle. In certain embodiments, drive direction is advantageously used for a direct measurement using a single camera, and the ADAS target is then aligned to that drive direction.

Additionally, the drive direction can be used to relate the orientation of multiple cameras, as described herein above, for measuring the vehicle alignment angles like toe and camber. These angles can be used to establish the thrust or centerline of the vehicle as in a conventional imaging wheel alignment system for the purpose of orienting the carrier stand. The wheel alignment angles can also be used to validate that the vehicle wheel alignment angles meet manufacture requirements before initiating an ADAS calibration.

Embodiments with Two Cameras Mounted to Fixture

Referring again to FIGS. 8A-C, in a first embodiment, two cameras 879, 881 are mounted either rigidly or with a pivot point 883, 885 that can be locked to either side of the carrier stand 871 which carries ADAS calibration element 861, such as a target. The relationship between the cameras 879, 881 does not have to be controlled or calibrated. A relationship between the line created by the intersection of the plane of calibration element 861 and the gravity plane must be calibrated or controlled for at least one camera.

The cameras 879, 881 are connected by a wired or wireless communication interface to a display device such as a computer or tablet 898 which is used to present a user interface.

Conventional targets, such as targets 80*a-d* shown in FIG. 1B, are attached to all the vehicle wheels using a mechanical device 82 such as a wheel clamp that attaches to the vehicle wheel or tire. The mechanical device 82 creates a known relationship between the target location and the center of the vehicle wheel or the center of the wheel is inferred from the movement of the target as the wheel rotates. These wheel targets are omitted in FIG. 8B for clarity.

The vehicle is rolled forward, backward, or both. The translation of the wheel targets is measured and the drive direction is established. This drive direction along with one additional known common direction not parallel to the drive direction is used to relate the orientation of the left and right camera. In this case, the additional direction used is the direction of gravity referred to as the gravity vector, as described in the "Drive Direction Principles of Operation" section herein above. Each of the cameras 879, 881 consequently includes a gravity sensor, such as a conventional inclinometer 879*a*, 881*a*.

As the orientation between the cameras 879, 881 and the carrier stand 871 is known, the stand can be oriented (i.e., rotated) to the drive direction about its centerline 890 as guided by the supported user interface, in a conventional manner. However, because we need to set the position relative to the vehicle 800 as well as the orientation of the ADAS calibration element 861, and the left-to-right orientation of the vehicle 800 with respect to cameras 879, 881 is not known, a point or line laser 896 (mounted on the carrier stand 871 normal to calibration element 861 and on the centerline 890 of the carrier stand) is used to align the stand's location and hence the calibration element 861 in relation to the center of the front of the vehicle 800. In other words, laser 896 is used to visually relate the fixture 860 to a point on the centerline of the vehicle 800 (shown as position 2 in FIG. 8C and explained in detail herein below), and the cameras 879, 881 are used to set the rotation of fixture 860 about its centerline 890. Pivot points 883, 885 are provided so that when the stand is moved to the correct location for target placement, the cameras can be re-oriented such that at least one target 80a-d remains in the view of at least one camera 879, 881.

Alternatively, an approximation can be made by using a pre-measured distance between the camera mounts on the fixture.

Figure 8C:
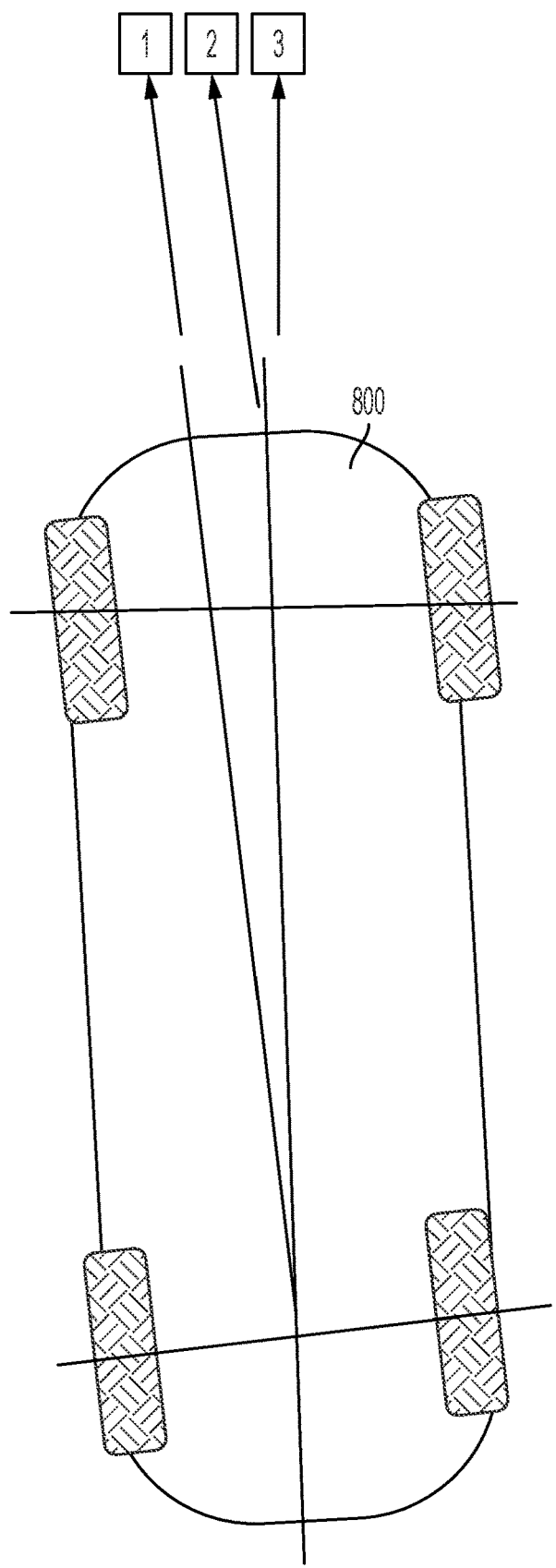
FIG. 8C illustrates relevant alignment parameters for positioning an ADAS calibration element.

Any error resulting from this solution will be small, since the angle between the drive direction of vehicle 800 and its geometric centerline should be small. This is illustrated in FIG. 8C, showing ADAS calibration element 861 at ideal position 1 on the thrust line, which is assumed to be the same as the vehicle's drive direction; and at position 2 using laser 896 set parallel to the drive direction oriented to the front of the vehicle 800. Position 2 is slightly compromised but reduces the error that would result from direct placement on the vehicle centerline position 3. Systems currently available place the ADAS element on the vehicle body centerline, so this embodiment is an improvement over prior art techniques.

In addition, since the relative orientation of the cameras 879, 881 is known, the wheel alignment values can be calculated, as described herein above, for the purpose of verification against the manufacturer specifications.

In an alternative variation of this embodiment, as shown in FIG. 8B, a target 894 is placed on the centerline of the vehicle in view of either camera 879 or 881. The direction of the vehicle centerline is known based on the wheel alignment measurement. The position of the centerline in the gravity plane is determined by the placed target. The user interface is then used to guide the operator to place the carrier stand on the vehicle centerline or vehicle thrust line based on manufacturer requirements. Alternatively, known structures on the front of the vehicle such as fascia features or emblems could be used by the camera instead of the target 894 to locate a point on the vehicle centerline.

In another variation of this embodiment, a mechanical device is used to measure the width of the car from the outer surface of the rear wheels. This width can entered into the user interface, and the center of the vehicle with respect to the wheel targets can be calculated and used to determine the centerline of the vehicle.

In an alternative variation of this embodiment, the distance between the cameras 879, 881 on the carrier stand 871 is measured or established mechanically. This provides enough information to calculate the width of the vehicle and establish the location of the vehicle thrust line.

A tape measure can be used to set the distance between the carrier stand 871 and the vehicle 800, where the required distance is from the vehicle body and the carrier stand.

In the case where the defined distance from the carrier stand 871 to the vehicle 800 is measured from the center of the front wheels, the cameras 879, 881 on the carrier stand 871 can be used to measure the distance between the vehicle 800 and the calibration element 861, and the user interface can guide the operator to set the carrier stand.

In other variations of this embodiment, a target 892 is placed on the surface on which the vehicle is sitting, in the field of view of one of the cameras 879, 881, and the relative height of the cameras and the crossbar 877 is then controlled or calibrated. The user interface then guides the operator to raise the crossbar 877 to the correct height to position the calibration element 861.

Embodiments with a Single Camera Mounted to Fixture

According to a second embodiment of this disclosed technique, a single camera 891 is mounted to the fixture 860, and one or more targets 893 is fixed to the vehicle anywhere in view of the camera 891. The camera 891 is mounted on a known location and orientation to the centerline 890 of the carrier stand 871 by calibration or mechanical design. A display device such as user interface 898 is provided as in previous embodiments. The vehicle 800 is rolled forward, backward, or both. As described herein above, the translation of the targets is measured and the drive direction is established. Since the camera 891 is in a known relationship to the carrier fixture 860, the user interface can guide the user to orient the fixture centerline to the drive direction. The carrier stand 871 is set in distance and centered on the car 800 as described in the previous embodiment.

In a variation of this embodiment, the target (i.e., a target 894) is mounted on the center of the front bumper of the vehicle 800. When the location of the target 894 is measured, the centerline of the vehicle 800 and the distance to the bumper are known. The user interface directs the operator to position the carrier stand 860 in orientation to the drive direction and in relative location to the center of the vehicle 800 and centerline from the front bumper.

In another variation of this embodiment, an additional target is placed on a side of the vehicle directly above the front wheel center in view of the camera 891; for example, target 893 can be a ride height target. Since the camera 891 can measure the distance to this target 893, the distance between the carrier stand 860 and the vehicle 800 with relationship to the wheel center can be controlled, and placement guided by the user interface.

In a further variation of this embodiment, a camera (i.e., a camera 895) is placed on the crossbar 877 in a known or calibrated location relative to the crossbar and the centerline 890 of the fixture 860. A target 892 is placed on the same surface as the vehicle, in the field of view of the camera 895. As described above, the height of target 892 from the floor is determined and the user interface guides the user in setting the height of the crossbar 877.

Those of skill in the art will understand that there are many possible locations for the target and camera depending, for example, on where measurements are needed. The above-described locations are thus exemplary and not exclusive.

Embodiments with a Camera Viewing the Fixture

In a third embodiment, a camera 897 is placed on the vehicle 800 (see FIG. 8B) such that it can see the carrier stand 871, and a target is placed on the carrier stand 871. The target can be placed on the carrier stand 871, on the crossbar 877, embedded in the calibration element 861, or in the case of forward camera calibration, the ADAS calibration element 861 is used as a target and can be viewed by camera 897. Operation and relative locations are determined as in the previous embodiment using a drive direction calculation, but with the locations of the camera and target interchanged. If camera 897 is mounted to the front bumper of the car 800, the distance between the fixture and front bumper can be controlled. If a target is placed on the floor in the view of camera 897 and the vehicle is on the floor or at a known height from the floor and the target on the carrier stand is on the crossbar, the height of the crossbar and calibration element can be controlled.

In this embodiment, if the camera 897 is mounted to the car 800 in an undetermined location, it can be related to critical points on the car such as the vehicle centerline, thrust line, wheel centers, or bumper through the measurement system using the information determined about the car during the vehicle roll.

In this third embodiment, if the camera 897 can see the targets used to calibrate the vehicle sensors, e.g., calibration element 861 and other target(s) on carrier stand 871, the location of these calibration targets in relation to each other and to the carrier stand 871 can be controlled, and guidance in the placement of these targets can be provided by the measurement system's user interface.

In all embodiments, the process of camera images and derivation of relative distance, wheel alignment, and driveline can be performed in the camera, in the display device, or on a remote connected device.

In the above-described embodiments, all relative locations of the stand and vehicle can be stored in the measurement system and retrieved to show that the procedure was performed correctly. In the first embodiment, the wheel alignment can also be stored.

The ADAS calibration elements, targets, or fixtures themselves can be used as targets and the measurement cameras used to locate them, measure the drive direction as previously described herein, and the fixture adjusted appropriately.

Referring again to FIG. 8B, in all embodiments, an additional camera 850 can be placed near the car 800, with a target 851 attached to it in a known or calibrated relationship to the camera's 850 optical axis. This target 851 would be in the view of one or more of the cameras on the target stand 871; for example, camera 879, and can be used to locate the additional camera 850. The additional camera 850 would be used to locate calibration objects such as an optical target 852, radar reflectors, and sound or heat sources (not shown), in relationship to the measured locations or angles of the vehicle 800. For example, the additional camera could be used to locate targets on the floor behind the vehicle that would not be visible to the cameras on the target stand.

In the above-described third embodiment having a camera fixed to the vehicle (e.g., camera 897) or a camera near the car (e.g., additional camera 850) as shown in FIG. 8B, once the camera is related to the car 800, as long as the car 800 does not move, the target stand 871 can be removed and replaced with a different calibration object (not shown) that includes an optical target for placement. The replacement optical target, which corresponds to an optical target on the original target stand 871, is viewed by the camera (e.g., camera 897), and is thereby positioned in relationship to measured locations on the vehicle 800. An exemplary application of this embodiment is calibration of a forward radar ADAS sensor, where the calibration object is a radar reflector which must be the only metallic object in front of the car. In the example of FIG. 8B, after a camera on or near the car such as camera 897 is related to the car using a metallic target stand such as target stand 871, the metallic stand 871 is removed and replaced with a non-metallic stand (not shown) carrying the calibration object; i.e., the radar reflector, and a non-metallic optical target pattern. The camera 897 is then used to position the radar reflector stand using the non-metallic optical target pattern.

After the ADAS calibration element 861 is placed in the correct location using one of the above disclosed techniques, a diagnostic device is connected to the OBDII port of the car, and is used to initiate the calibration process, which is performed by the ECU of the car. A wired or wireless connection can be used to exchange information between the diagnostic device and the target placement system. This information can include; for example, vehicle type, vehicle status, completion of calibration procedure, and measured location data defining the relative position of components on the vehicle or between the vehicle and the target stand.

The position of the steering wheel, and whether or not the steering column is under stress, can also impact the target calibration. In certain embodiments, a conventional steering level sensor is connected to the target positioning system using either a wired or wireless connection, to provide the orientation of the steering wheel to the target calibration system to ensure the steering wheel is level during calibration. A wireless or wired connection could be made between the target calibration system and the OBDII port of the car, to allow direct reading of the registers in the vehicle's ECU to validate that calibration is complete. Additionally, the output of the integrated steering level measurement or the steering position encoder can be accessed to validate steering wheel position. The torque sensor in the steering column can also be checked to ensure that force is not applied to the steering system during calibration.

At the end of the process, a common report can be provided to the customer indicating that the target was in the location prescribed by the OEM repair procedure during the time that the car was calibrating the sensor system. Additionally, the report can show that the wheels of the vehicle under calibration were aligned within the manufacturer's allowed tolerances, that the steering wheel was level, and that the calibration was completed in the vehicle ECU without error.

Relay Devices for Facilitation of ADAS Alignment

When measuring the drive direction of the vehicle for ADAS alignment, there is a possibility that the cameras used to measure the drive direction of the vehicle might not be able to also see the calibration rigs, targets or sensors used to calibrate various vehicle ADAS sensors. To solve this problem, in this embodiment a "relay" device having a target and a camera is placed within the view of a drive direction measurement camera and oriented such that the camera of the relay device sees a target attached to the calibration rigs, targets or sensors used to calibrate various vehicle ADAS sensors, and the target of the relay device can be seen by the drive direction camera.

Figure 10:
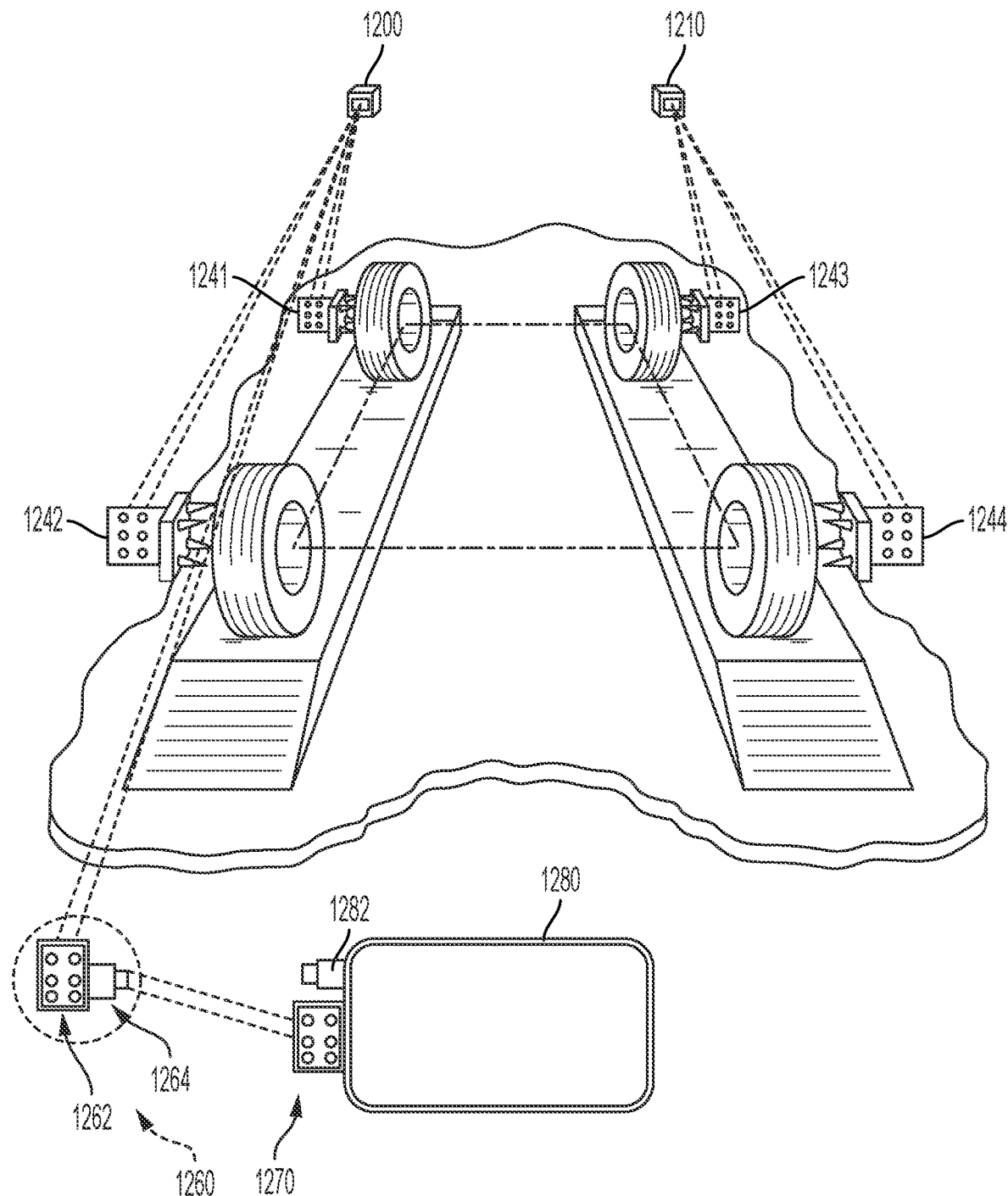
FIG. 10 is a perspective view of a 3D vehicle aligner used to calibrate an ADAS element according to an embodiment of the present disclosure.

Referring now to FIG. 10, a first drive direction camera 1200 views targets 1241 and 1242, and a second drive direction camera 1210 views targets 1243 and 1244, to measure drive direction as described herein above. If an ADAS calibration rig, target, or sensor 1280 is required to be placed behind the vehicle it will not be seen by the drive direction cameras 1200 or 1210. To measure where the ADAS calibration device 1280 is with respect to the vehicle, an alignment target 1270 is placed or attached in a known orientation to the ADAS calibration device 1280. A relay device 1260 is also provided having a camera 1264 and a target 1262 attached in a known orientation to the camera 1264. Relay device 1260 is placed such that its target 1262 can be viewed by camera 1200, and oriented so that the relay device camera 1264 can view the target 1270. Since the relative position of target 1270 to ADAS calibration device 1280 is known, the relative position of relay target 1262 to relay camera 1264 is known, the location of the target 1270 with respect to the relay camera 1264 is measured, and the position of the relay target 1262 with respect to camera 1200 is measured, the ADAS calibration device 1280 is thus measured in a common coordinate system with the wheel targets 1241 and 1242. The system's user interface can then direct the user how to position the ADAS calibration device 1280 appropriately.

In alternative embodiments, instead of a target 1270 attached to the ADAS calibration device 1280, a camera 1282 is mounted to the ADAS device 1280 and aligned to focus at the relay target 1262. The relay target 1262 is also viewed by camera 1200. In a further embodiment, the relay device has two targets, one for camera 1200 to view and one for a camera (such as camera 1282) attached to the ADAS calibration device 1280 to view. The two targets' relative positions are known by design or calibration, as is well known in the art.

In another embodiment, when there are more than one ADAS calibration devices which need to be viewed by a calibration camera(s), multiple relay devices are used. In a further embodiment, if the relay device 1260 cannot be seen by camera 1200 and see target 1270 at the same time, then multiple relay devices could be used in series; e.g., camera 1200 sees a first relay device #1, and relay device #1 sees a second relay device #2, and relay device #2 sees the target 1270 attached to the ADAS calibration device 1280. In a still further embodiment where the ADAS calibration device 1280 is a target that can be imaged by the relay camera 1264, the target 1270 is not needed, and the ADAS calibration device 1280 is measured directly from camera 1264.

Additional Embodiments of ADAS Fixture Positioning Devices and Methods

Another exemplary ADAS fixture positioning embodiment will now be described with reference to FIG. 8D. Carrier stand 801 has a base assembly 816, a tower assembly 817 movably attached to base assembly 816 via a slide table 818, and a horizontal support beam 811 slidably mounted on vertical support beam 813. Horizontal support beam 811 carries a target mount 812, to which one or more targets 820 (or other calibration targets), such as ADAS calibration element 861, is attached. Target mount 812 is slidably mounted on horizontal support beam 811. Horizontal support beam 811 also carries a pair of image sensors 827, such as cameras.

The mounting points for calibration targets or fixtures, such as a mounting point for mount 812, are instrumented so that the relationship between the mounting point and the camera system can be measured, or known via mechanical construction. The calibration object (e.g., target 820) mounted to the beam 811 has a known relationship to one or both cameras 827, and one or both cameras 827 measure their own spatial relationship to the vehicle 800. By measuring the geometry between the vehicle 800 and one or both cameras 827, and by knowing the geometry between the camera(s) 827 and the mounting points of mount(s) 812, the spatial relationship between the calibration object 820 and the vehicle 800 is known.

In certain embodiments, the spatial relationship between the two cameras 827 is determined from the "drive direction" principle of operation described herein, where two or more directions measured in common from each camera coordinate system are used to determine the geometry between the cameras 827. But the drive direction principle of operation is not required for operation of the disclosed ADAS fixture positioning device. For example, in other embodiments the relative pose between the two cameras 827 is determined in an offline calibration process, such as stereoscopically viewing a common reference target (not shown) of known geometry by both cameras. In such a way the geometry between the two cameras 827, and between the cameras 827 and the ADAS positioning fixture 801, is determined without application of the drive direction principles of operation. Such a mode of operation has disadvantages, however. Whenever the relative geometry between cameras 827 changes (e.g., rotating the cameras individually, folding the arms of the horizontal beam 811, swapping cameras, etc.), a new calibration must be performed to measure the relative pose of the two cameras 827.

Carrier stand 801 can be moved into position in front of the vehicle 800 and locked in position using floor locks 824 of base assembly 816. Leveling jacks 825 are provided in base assembly 816 to level the carrier stand to gravity if required. If further refinement of carrier stand position is required, the carrier stand tower assembly 813 is movable in relation to the base assembly 816 by disengaging locks 823 of base assembly 816 from locking tabs 822 rigidly attached to tower assembly 813. This will allow the tower assembly 813 to move freely in directions X-X, Y-Y, and R-R within the constraints of slide table 818. Once the correct position is attained, as directed and verified by the system processor and user interface, locks 823 are re-engaged to hold the tower assembly 817 in the correct position.

The height of horizontal support beam 811 (and thus of target 820) is adjustable in direction V-V, as directed by the processor and user interface, to the correct height. A locking mechanism (not shown) can then be engaged to hold support beam 811 at the correct height. One or more target holding fixtures 812 can be positioned along direction H-H by sliding along horizontal beam 811, as directed by the processor and verified by linear position sensors (not shown), which can comprise conventional capacitive or resistive elements, or a conventional optical encoder. The linear position sensors validate correct horizontal position of the target(s). Such sensors can also be used to guide the user in the placement of the target holder(s) 812, or in certain embodiments provide location so that actuators can be used to position the targets horizontally.

All locking mechanisms are activated manually by hand or foot in a conventional manner, or in some embodiments are activated using well-known hydraulic, pneumatic, magnetic, or electro-mechanical means. Likewise, movements of the carrier stand 801 as described above are performed manually by hand or foot, or in further embodiments are performed by hydraulic, pneumatic, magnetic, or electro-mechanical means. The carrier stand 801 can include handles 826 to aid the operator in manually moving the stand 801 as prescribed by the processor and user interface. The image sensors 827 can guide movements of the carrier stand 801 via the processor and user interface to achieve the correct position and orientation. Locking devices 823 can then be engaged to prevent further movement of the carrier stand 801. The image sensors 827 can also monitor the location of the carrier stand throughout the calibration process to ensure the correct position is held.

Figure 8E:
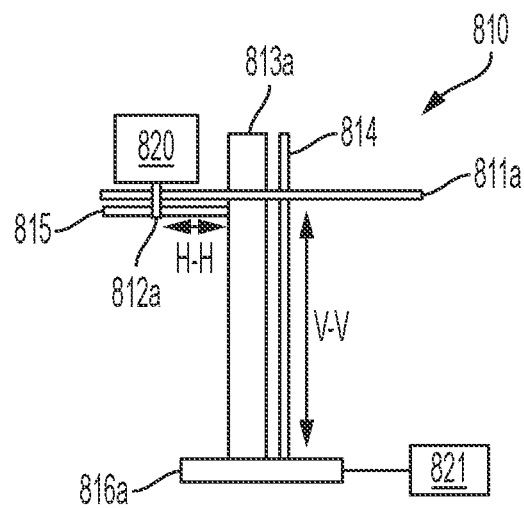
FIG. 8E-F are front and top views, respectively, of an ADAS calibration element fixture according to another embodiment of the present disclosure.
Figure 8F:
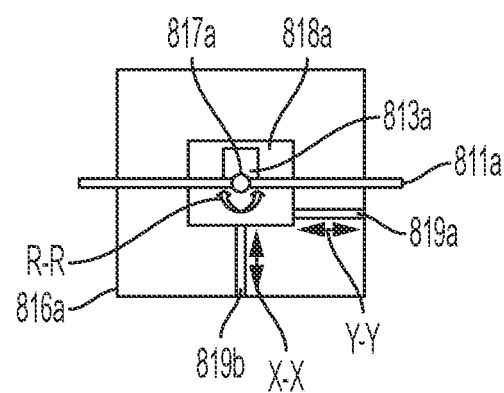

In further embodiments, known parameters of the carrier stand such as distance from the car, orientation to the car, and position of the calibration objects (e.g., calibration element 861) in relationship to each other and the carrier stand are adjusted automatically by the system's software using actuators in the carrier stand. As shown in FIGS. 8E-F, in an exemplary embodiment an automatically adjustable carrier stand 810, similar in many respects to previously described carrier stand 801, further comprises actuators to enable it to be automatically adjustable. Carrier stand 810 comprises a base 816a and a sub base 818a movably mounted on base 816a such that it can be moved laterally relative to base 816a in the directions of arrows X-X and Y-Y by lateral actuators 819a and 819b, respectively; and can also be moved rotationally relative to base 816*a* in the direction of arrows R-R by a rotational actuator 817.

A vertical support beam 813*a* is attached to sub base 818*a*, and a horizontal support beam 811*a* is carried by vertical support beam 813*a*. Horizontal support beam 811*a* is slidably mounted on vertical support beam 813*a* and is moved in the direction of arrows V-V by a vertical actuator 814. Horizontal support beam 811*a* carries a target mount 812*a*, to which a target 820, such as ADAS calibration element 861, is attached. Target mount 812*a* is slidably mounted on horizontal support beam 811*a* and is moved in the direction of arrows H-H by a horizontal actuator 815.

The actuators 814, 815, 817, and 819*a-b* are conventional actuators, such as one or more of the following well-known types as appropriate: rack and pinion; screw drive, worm gear; pneumatic or hydraulic cylinder; belt or chain drive; gearbox; and gear and pinion. The actuators are connected, either wirelessly or by cables, to a conventional controller 821 which in turn communicates with the measurement system in a conventional manner.

Track System for ADAS Fixture Positioning

Figure 12A:
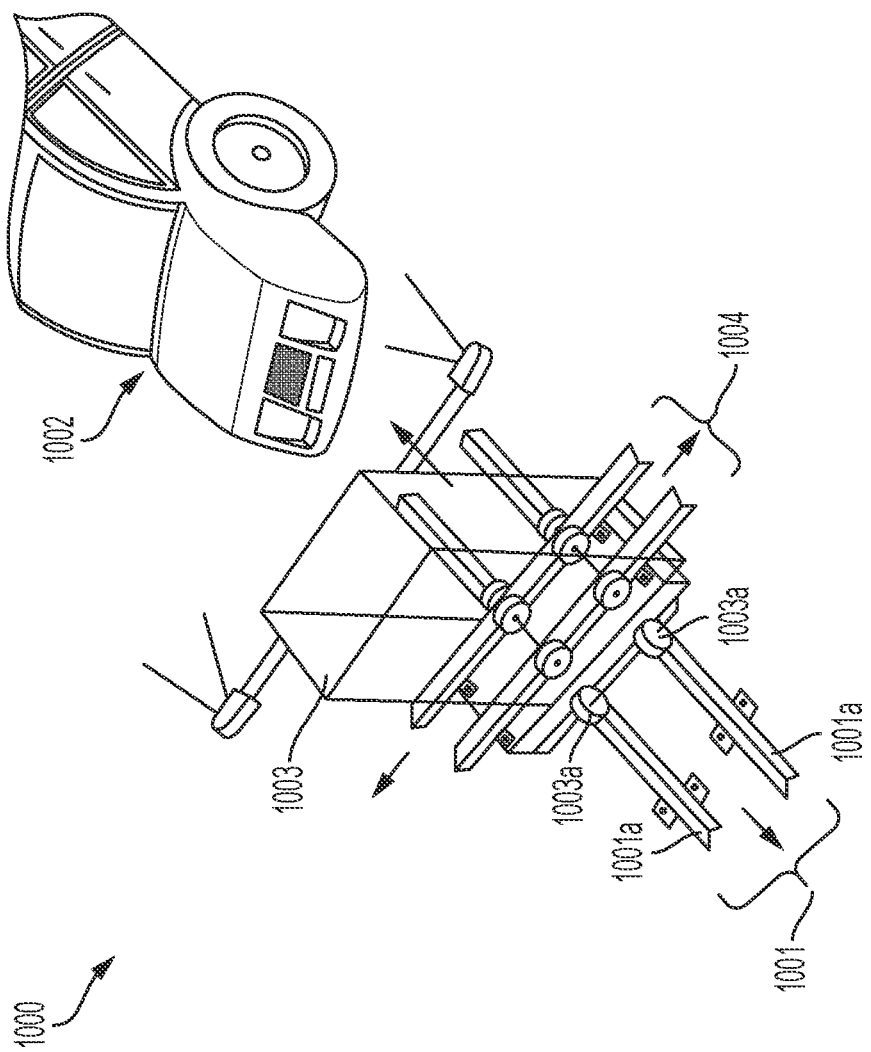
FIGS. 12A-B are schematic perspective views of systems for positioning an ADAS calibration element fixture according to an embodiment of the present disclosure.
Figure 12B:
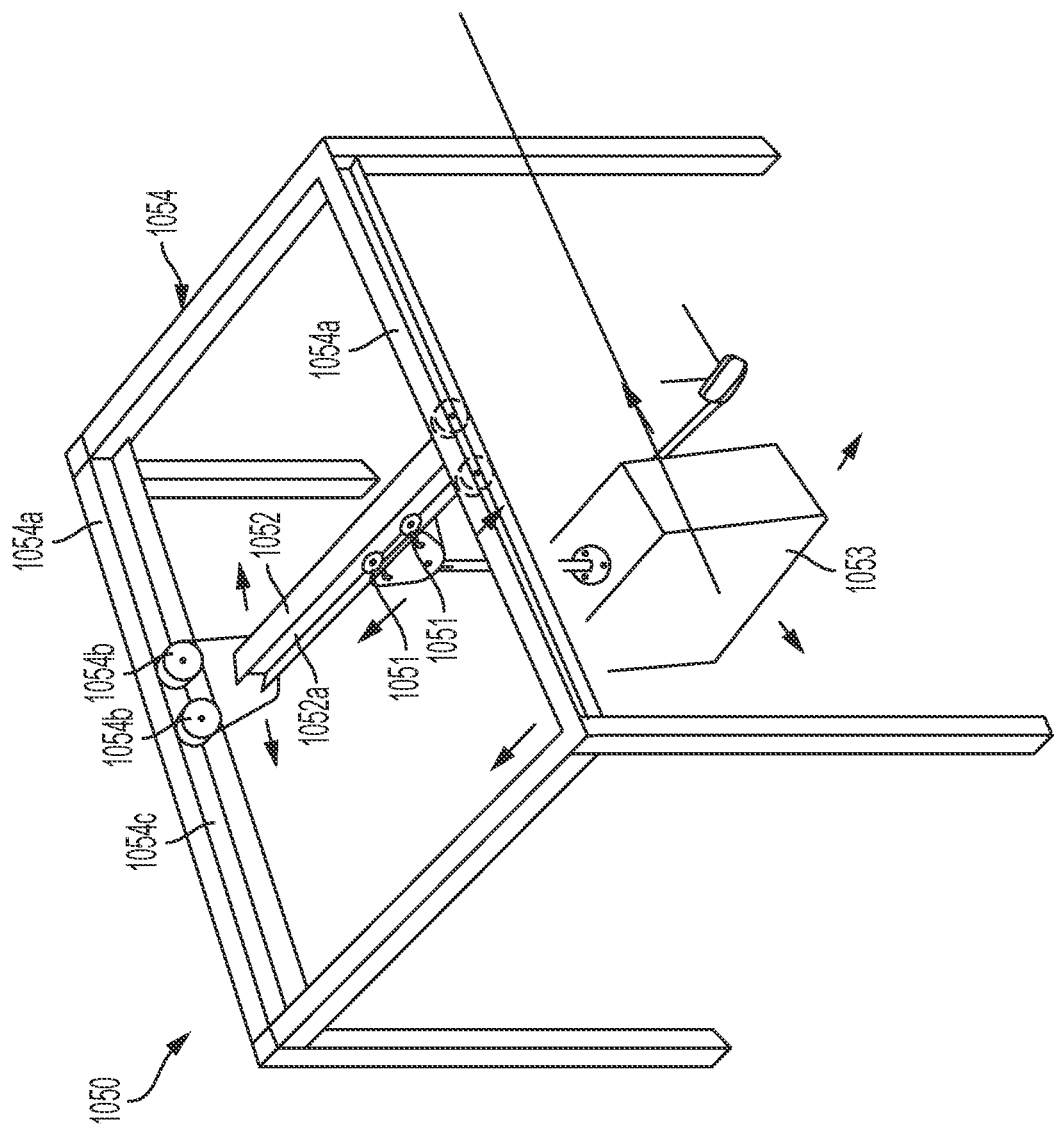

Referring now to FIGS. 12A-B, an alternative embodiment of an ADAS fixture positioning system to mechanically position a GTPS camera beam/target assembly in front of a vehicle provides a permanent track system dedicated for the GTPS camera beam/target to travel. This overcomes obstacles, irregularities, and an un-level surface that may exist in the shop floor that makes pushing and/or pulling the cabinet into position difficult. The other problem that is solved by this embodiment is inherent with a caster type wheel, as found on a standard mobile cabinet. In order to make fine movements; the cabinet must move in a small circle (equal to the caster built into the wheel assembly) in order to turn the caster to point the wheel in the new direction. This circular movement before the desired direction can be achieved can mean the cabinet is not moving in the desired direction. The track system of this embodiment overcomes that issue, since the guided track roller system does not use a caster type wheel (it does not need to spin around). Two track systems are presented here, the first is a floor mounted version 1000 shown in FIG. 12A, and the second an overhead system 1050 shown in FIG. 12B.

Referring now to FIG. 12A, a dedicated floor mounted track 1001 can be located in the drive direction of the vehicle 1002, so that it can allow base rollers 1003*a* of a cabinet 1003 to easily rotate forward or rearward on top of the track 1001 to achieve the needed distance from the vehicle 1002. The track 1001 is located in the center of the service bay. The track 1001 consists of two or more sections 1001*a*. The cabinet's base also has a track 1004 that is perpendicular to the service bay's track 1001, and allows the cabinet 1003 to move left or right with respect to the vehicle 1002. This adjustment, as shown in FIG. 12A, allows the two tracks 1001, 1004 to work together, allowing the cabinet 1003 to be easily moved in a forward and backward direction with respect to the vehicle 1002 and also in a left and right direction to the vehicle 1002. Each of these movements can be manually operated, after releasing a brake mechanism (not shown). This movement could easily be expanded to use an electric motor, linear actuator, pneumatic motor, pneumatic cylinder, and/or other semi-automatic methods. Each movement along the tracks 1001, 1004 can be made independently of each other or simultaneously.

In a second embodiment (FIG. 12B), the track system 1050 is implemented by having rollers 1051, 1054*b* and track 1052*a*, 1054*c* in an overhead position. The cabinet assembly 1053 is fastened at the top to an overhead structure 1054 of supporting beams 1054*a* and rollers 1054*b*. The rollers 1054*b* on each end of a beam 1052 are located in tracks 1054*c* that allow the beam 1052 to move forward and rearward. An additional group of rollers 1051 are then arranged on both sides of the supporting beam 1052 and are attached to the top of the cabinet 1053. This set of rollers 1051 allows movement in a right and left direction of the vehicle (not shown). This structure can be supported from the ceiling of the shop or by free-standing post structure 1054. These movements can be manually operated, after releasing a brake mechanism. These operations can also be automated by using electric motors or linear actuators. The benefit of this system is that the cabinet/target assembly can be adjusted very easily in front of the vehicle. An additional benefit is that the entire assembly (cabinet/beam/target) is suspended off the shop floor which reduces any hazards or obstructions on the floor. It also allows the cabinet/target assembly to be moved to one side, enabling drive through applications.

Finding a Floor Plane to Guide Positioning of an ADAS Target

Conventional techniques for calibrating on-vehicle ADAS sensors often include placing a target at a specified position relative to the vehicle while the vehicle is sitting on a surface such as a shop floor. In one common technique, a manufacturer specifies placing a target stand on the floor at a predetermined distance in front of the vehicle or behind the vehicle. Such prior art methodology usually assumes that the surface (i.e., the floor) on which the vehicle and the target are placed is level. However, if the floor's measurement surface is not level, the ADAS target may not be placed with sufficient accuracy to calibrate the ADAS sensor(s) to meet the manufacturer's specifications. In a typical example, the target stand needs to be placed several meters in front of the vehicle. If the floor slopes away from the vehicle (e.g., slopes upward or downward) in front of the vehicle, the target stand and therefore the target will be at an incorrect angle relative to the front of the vehicle.

To compensate for uneven floor surfaces, the present disclosure calculates a "floor plane" defined with respect to the vehicle coordinate system (VCS). The floor plane is then used to determine the unevenness of the floor (i.e., the roll and pitch of the floor) and thereby determine the proper placement of the ADAS target.

During the course of rolling the vehicle with targets attached to the wheels (e.g., as shown in FIG. 1B), we are able to determine the "Rolling Radius" of each individual wheel by using standard geometric and statistical approaches. We can then couple that knowledge with knowledge of where the wheel target is located, and how the target and target clamp relate to the center of the wheel, to calculate the center point of each wheel in a conventional manner. Then, we find the plane of the vehicle using the four wheel center points. From this plane we go down to the floor by how large the rolling radius is for each wheel. Using these four floor points we can determine the plane of the floor using standard geometric principles. Once we have the plane of the floor, we can determine the roll and pitch of the floor to know at what angle the ADAS target needs to be positioned.

"Rolling Radius" is computed by keeping track of the distance and angle that the wheel center moves while the vehicle is rolling. We are able to use the target pose with the target spindle transformation (TST aka TID) calibration (performed to determine the vector from the center of the target to the center of the wheel) to translate from the center of the wheel target to the center of the wheel. By these calculations, we can see how far the wheel center travels and how much it rotates at all points along the roll. Then, we use a linear least squares approach solver coupled with standard geometric principles to find each wheel's rolling radius.

The calculation of rolling radius and other relevant parameters is explained, for example, in U.S. Pat. No. 6,237,234 to Jackson et al., and in U.S. Pat. No. 9,982,998 to D'Agostino et al., both of which are hereby incorporated by reference in their entirety.

Figure 13A:
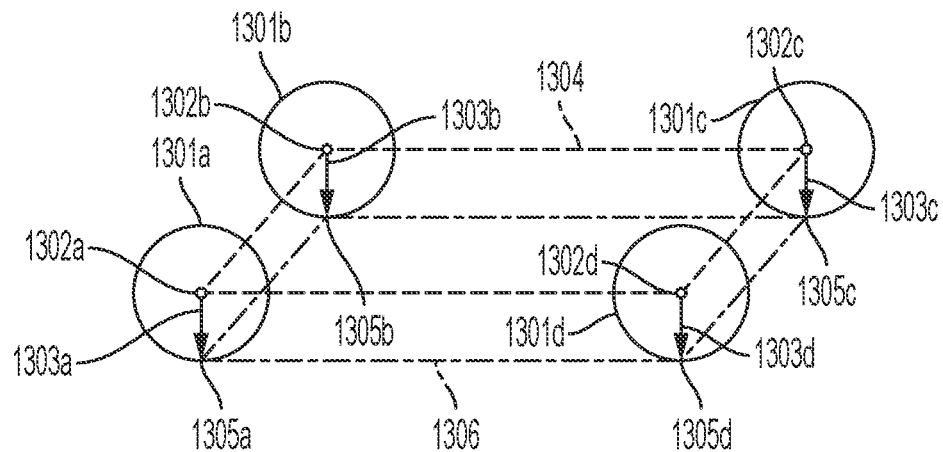
FIGS. 13A-B schematically illustrate a technique for finding a floor plane to guide positioning of an ADAS calibration element according to the present disclosure.
Figure 13B:
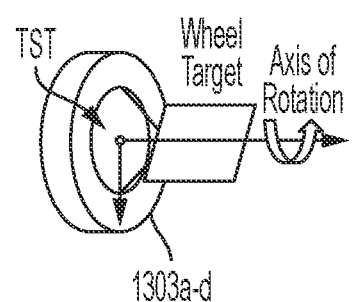

Referring now to FIGS. 13A-B, to determine the floor plane equation, the vehicle is rolled on its wheels 1301a-d in a conventional runout compensation procedure. The center point 1302a-d of each wheel and the rolling radius 1303a-d of each wheel is then calculated using well-known techniques. The plane of the vehicle 1304 (i.e., the VCS) is determined using the four wheel center points 1302a-d. In the VCS, four "floor points" 1305a-d are determined by projecting down along the VCS Z-axis from the center of each wheel 1302a-d towards the floor by the rolling radius 1303a-d of each respective wheel 1301a-d. The floor plane 1306 is defined by calculating the equation of the best fit plane comprising the four floor points 1305a-d.

The rolling radius 1303a-d of each individual wheel is determined during the course of rolling the vehicle in a conventional rolling runout compensation procedure, using well-known geometric and statistical techniques. Such techniques are described; for example, in U.S. Pat. No. 6,237,234, which is hereby incorporated by reference in its entirety. To summarize, rolling radius is computed by keeping track of the distance and angle that the wheel center moves while the vehicle is rolling. A conventional optical target is attached to each wheel, and the targets are imaged, as by cameras of a 3D visual aligner, as the vehicle is rolled a short distance to determine several poses of each target in a well-known manner. The target poses are used along with a target spindle transformation (TST) calculation to "move" from the center of the wheel target (known from the target images) to the center of the wheel. After finding the center of the wheel, it can be determined how far the wheel center travels and how much it rotates at all points along the roll. Then, a linear least squares approach is used, coupled with standard geometric principles, to find each wheel's rolling radius.

Figure 16:
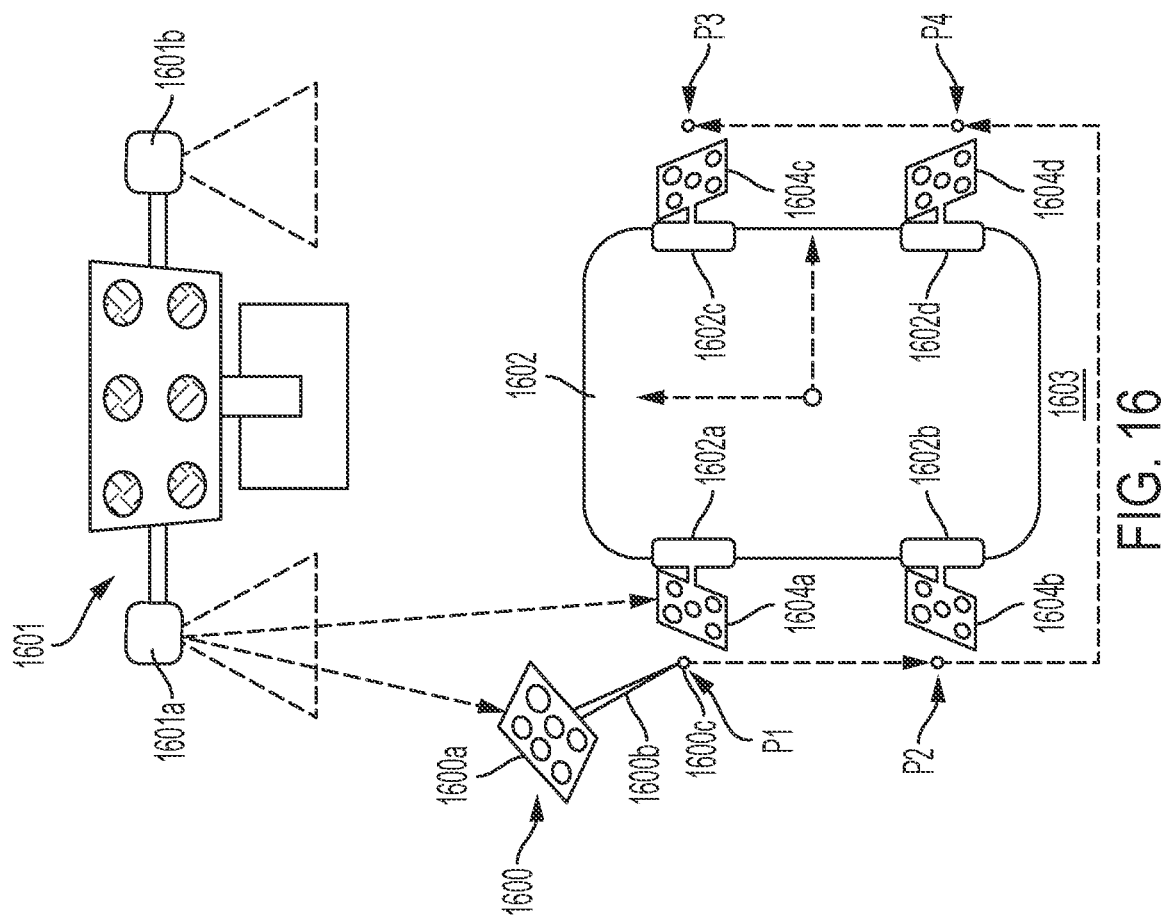
FIG. 16 is a schematic perspective view of a system for finding a floor plane to guide positioning of an ADAS calibration element according to an embodiment of the present disclosure.

FIG. 16 depicts an additional method by which the unlevelness of a floor plane is compensated for. This method utilizes a conventional "tip target" 1600 of known geometry having a target body 1600a and a point definer 1600b (or "tip") extending from target body 1600a. Point definer 1600b includes a point 1600c at a known angular orientation and location from the target body 1600a. Such tip targets are described in detail, for example, in U.S. Pat. No. 6,658,751, the entire disclosure of which is hereby incorporated by reference. The target body 1600a is imaged by each of the cameras 1601a, 1601b of an ADAS calibration system 1601. The three dimensional translation from the target body 1600a to the point 1600c at the end of the tip 1600b is known (either measured in an offline calibration process, or known via mechanical construction). By measuring the pose of the tip target 1600 in the camera coordinate system, the transformation from the tip target body 1600a to the tip point 1600c is applied to measure the contact point 1600c of the tip 1600b in the camera coordinate system. In this way, the three dimensional coordinates of arbitrary contact points that touch the end of the pointer tip 1600c are measured.

Using this methodology, the tip target 1600 is used to measure floor points P1-P4 on floor 1603 directly beside each vehicle wheel 1602a-d of vehicle 1602. The tip target 1600 is sequentially positioned next to each wheel 1602a-d as the tip 1600b touches the floor 1603 (the dark circles P1-P4 next to each wheel 1602a-d in FIG. 16). The camera 1601a or 1601b measures the pose of the tip target 1600, and the three dimensional translation from the tip target body 1600a to the point 1600c of the tip 1600b is applied to measure the contact point P1-P4 on the floor 1603. The tip target 1600 is positioned next to each wheel 1602a-d, and floor points P1-P4 corresponding to each wheel 1602a-d are measured in the respective camera coordinate system.

While measuring the floor points P1-P4, the pose of one or more wheel mounted targets 1604a-d in one or both camera coordinate systems are also measured, which are known relative to the vehicle coordinate system. By measuring the pose of the wheel mounted targets 1604a-d in the camera coordinate system, measurements from the camera coordinate system can be transformed to the vehicle coordinate system. Thus, by measuring floor points P1-P4 in the prescribed manner in each camera coordinate system, they can be transformed into the vehicle coordinate system. From these four floor points P1-P4 in the vehicle coordinate system, the best fit floor plane on which the vehicle 1602 is supported is calculated. The best fit plane can be calculated using a standard least squares technique known to those skilled in the art.

In other embodiments, instead of a tip target, a "floor target" for placing on a floor surface is used, and the floor plane is calculated as discussed above. A floor target can be a conventional wheel target having a clamp or "claws," similar to targets 300a-d shown in FIG. 3. To use a wheel target on its claws, the offset point of the center of the claw tips in the target coordinate system must be known, so the floor point can be calculated after the pose of the target is calculated. Thus, in this embodiment, the floor target has a surface plane (the claw tips) for contacting the floor surface to be measured, and a translation from the floor target to a point in the surface plane is known, so a point in the floor plane can be calculated. From multiple such points adjacent to the vehicle wheels, the floor plane is calculated as discussed herein above.

Measuring Drive Direction with a Single Camera and No Targets

Another way in which a single camera can be used to measure 3D geometry (and thus to measure drive direction) is to use deep learning based methods for monocular depth estimation. Using such methods, a deep neural network is trained with offline image and depth data to estimate depth from image sequences. After such a model is trained, 3D information can be obtained from a single image while using only a single camera. With such methods, textured feature points can be tracked across multiple frames while the vehicle moves, thus enabling the calculation of vehicle drive direction.

System Embodiments with Multiple Independent Components

Alternative embodiments of the disclosed systems are possible where the components of the system are not connected in a single fixture. In this "multiple component" embodiment, the camera(s) and the ADAS target(s) are able to move independently.

Embodiment with One Camera and One Wheel Target

Figure 11A:
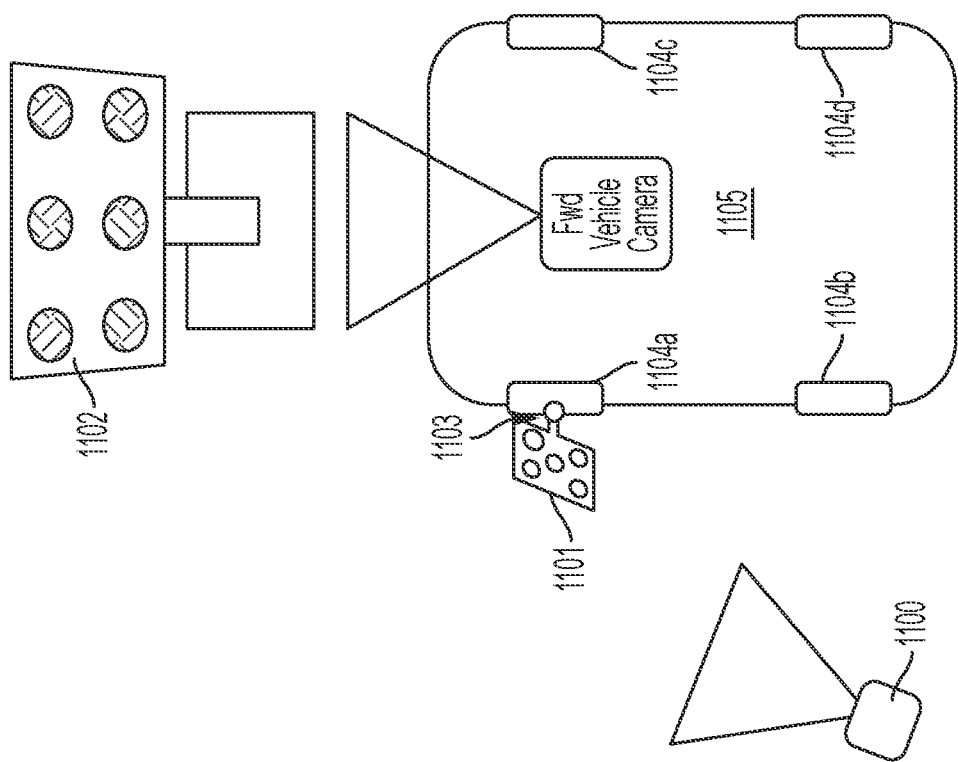
FIGS. 11A-G are schematic views of systems for positioning ADAS calibration elements according to embodiments of the present disclosure.

In the simplest form of this multiple component embodiment, depicted in FIG. 11A, there is a single movable camera pod 1100 which simultaneously views a wheel mounted target 1101 and the ADAS target 1102. Since the geometry of the wheel mounted target 1101 is known, and the geometry of the ADAS target 1102 is known, the 2D:3D pose estimation process can be carried out to measure the pose of both the wheel mounted target 1101 and the ADAS target 1102, given an image that contains both targets. Further, if the translation between the wheel mounted target 1101 and the center of the wheel rim 1103 is known, the 3D position of the wheel center 1103 relative to the ADAS target 1102 can be measured.

The wheel mounted target 1101 can be moved to each of the vehicle wheels 1104a-d. By measuring the pose of wheel mounted target 1101 and the ADAS target 1102 for each vehicle wheel 1104a-d, the relative poses of each wheel mounted target relative to the ADAS target 1102 can be measured, and the location of the wheel center of each of the wheels 1104a-d can be determined. If the ADAS target 1102 does not move during this process, the relative poses of all wheel mounted targets can be determined and the relative position of all wheel centers can be determined.

From the set of all wheel centers a "vehicle coordinate system" can be defined relative to the ADAS target 1102. The pose of the wheel mounted target relative to the vehicle coordinate system is then calculated. By measuring the pose of the wheel mounted target, the pose of the vehicle coordinate system is determined. By imaging a wheel mounted target 1101 and the ADAS target 1102 in the same image, the pose of the ADAS target 1102 relative to the wheel mounted target 1101 is determined, and (by the known wheel mounted target to vehicle coordinate system transformation) the pose of the ADAS target 1102 relative to the vehicle coordinate system is determined.

By following this measurement process, the ADAS target 1102 can be moved to any position and orientation, and as long as the wheel mounted target 1101 is imaged in the same frame as the ADAS target 1102, the pose of the ADAS target 1102 relative to the vehicle 1105 can be determined. Thus, the full six degrees of freedom pose of the ADAS target 1102 relative to the vehicle 1105 can be measured and steadily updated. In this way, moving the ADAS target 1102 to the desired pose relative to the vehicle 1105 can be accomplished in a simple and user-friendly process.

Embodiment with One Stereoscopic Camera and No Wheel Mounted Targets

Figure 11B:
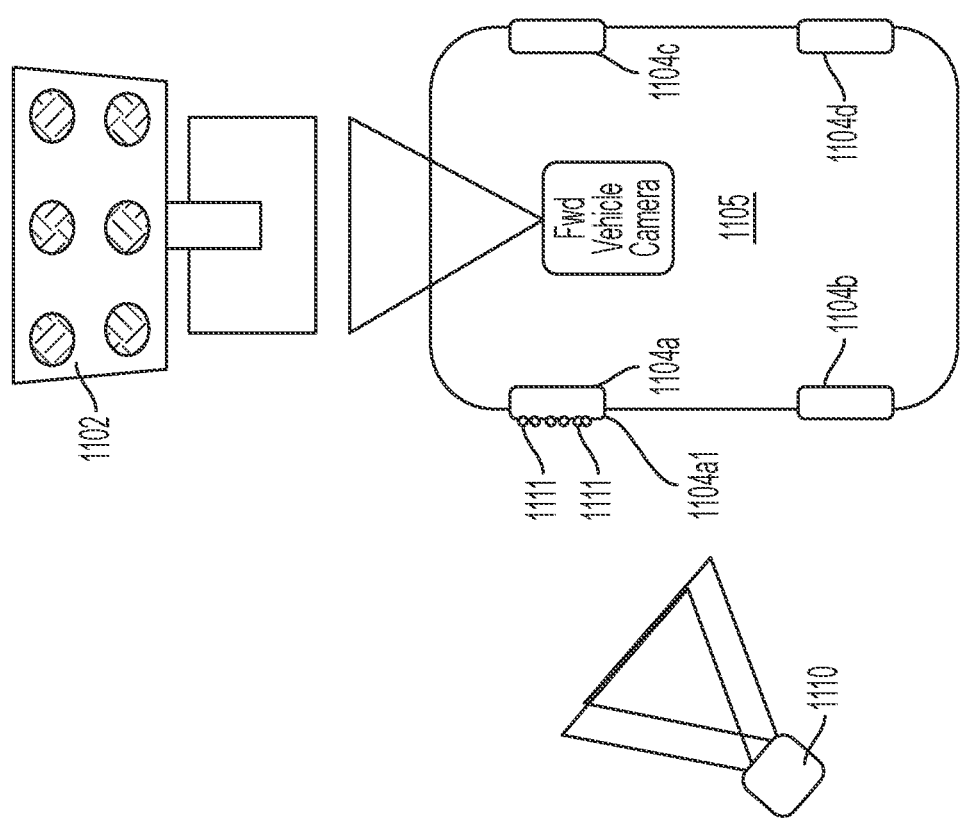

The measurement system and process depicted in 11A can be simplified in various ways. One such method, depicted in FIG. 11B, is to dispense with the wheel mounted target entirely and to image each wheel rim with stereoscopic cameras 1110. With stereoscopic cameras, we can measure textured landmark points 1111 on the wheel surface 1104a1 (also known as "keypoints") in each camera of the stereo array 1110. Keypoints 1111 in each image can be identified with a variety of computer vision algorithms, including SIFT, SURF, FAST, and ORB, among others. Using standard keypoint matching techniques such as BRIEF, Canny edge matching, or other options, the same keypoints can be imaged by multiple cameras in the stereo camera array 1110. If a keypoint 1111 is imaged in more than one camera and it is matched, the 3D coordinate of that keypoint 1111 can be determined using stereo triangulation techniques. By performing stereo matching of multiple keypoints 1111 per wheel 1104a-d, a "wheel mounted target" is effectively created dynamically using textured landmark points 1111 present on the wheel surface 1104a1.

Once we have created such a "wheel mounted target" using the textured landmark points 1111 that are present on the wheel surface 1104a1, we can perform the same basic procedure as for the system depicted in FIG. 11A. In a manner analogous to that described for a wheel mounted target, each wheel 1104a-d can be imaged by the stereo camera array 1110, textured keypoints 1111 can be identified and matched across cameras in the stereo array 1110, and the 3D geometry of the wheel 1104a-d relative to the ADAS target 1102 can be determined. In such a way a vehicle coordinate system can be defined based on the position of each wheel 1104a-d relative to the ADAS target 1102, and the pose of the ADAS target 1102 relative to the vehicle coordinate system can be measured live in a user friendly manner, as long as the keypoints 1111 from at least one of the wheels 1104a-d are visible in the same image in which the ADAS target 1102 is imaged.

Embodiments with One Camera and No Wheel Mounted Targets

Note that the stereoscopic camera pod and measurement system depicted in FIG. 11B can be extended and/or simplified in various ways. One such way is to employ modern deep learning based monocular depth estimation techniques to estimate 3D coordinates of points in images from a single camera. With such techniques, a deep neural network is trained offline in a supervised learning process to estimate the 3D position of points in images. Once trained, such a deep neural network can be used at run-time to measure the 3D coordinates of textured landmark points 1111 from a single image taken with a single camera. In such a way, a "wheel mounted target" can be created from the existing textured landmark points 1111 in a manner that is otherwise equivalent to the stereoscopic system depicted in FIG. 11B. The 3D geometry of each wheel relative to the ADAS target can be measured in a manner that is equivalent to the system depicted in FIG. 11B.

Another way in which the stereoscopic system depicted in FIG. 11B can be implemented is to use a single camera while making the vehicle 1105 exhibit motion. By imaging the vehicle wheels 1104a-d at two or more unique vehicle positions while the vehicle 1105 rolls along the floor, structure from motion techniques can be applied to measure the 3D coordinates of textured landmark points 1111 on the wheel surfaces.

Floor-Centric ADAS Target Measurements

As with other embodiments of ADAS calibration systems, it may be beneficial to measure the pose of the ADAS calibration fixtures with respect to the floor plane on which the vehicle sits (which is not necessarily the floor plane of the room in which the ADAS calibrations are being conducted). As discussed herein above, by measuring the pose of wheel mounted targets as the vehicle rolls, it is possible to measure the center points of the wheels and of the wheel diameters by calculating the rolling radius of the wheels. Once the wheel centers and wheel diameters are measured, it is possible to calculate the floor points under the center of all vehicle wheels. From the floor points, it is possible to calculate a best fit floor plane on which the vehicle sits. If the ADAS target is imaged by one or more cameras in the same frame as one of the wheel mounted targets, the dimensions of the ADAS target relative to the vehicle floor plane can be measured live.

Embodiment with One Camera and Multiple Wheel Mounted Targets

Figure 11C:
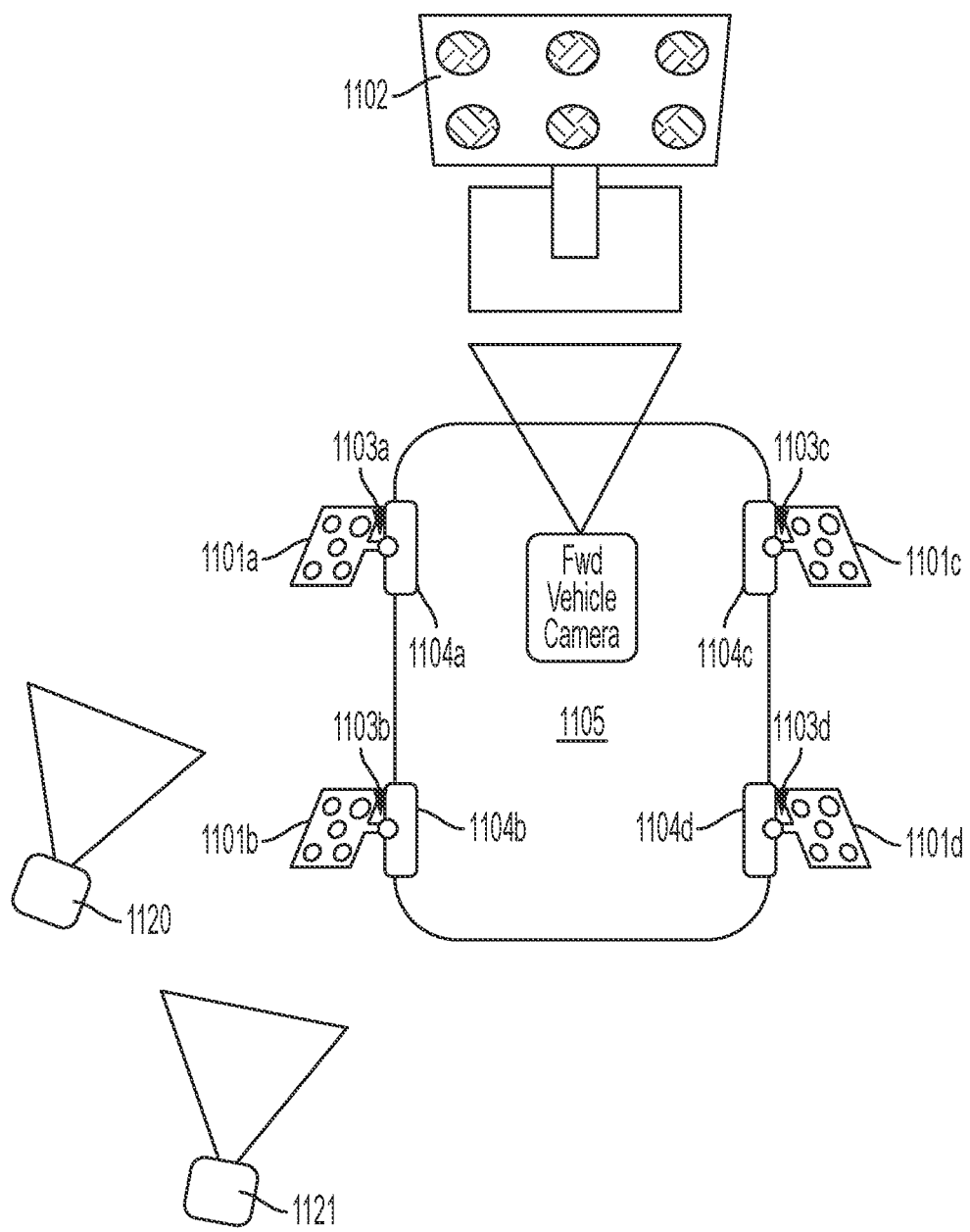

The system depicted in FIG. 11A can readily be extended to a scenario where multiple wheel mounted targets are used concurrently. Such a system is depicted in FIG. 11C. By not requiring multiple clamp reposition steps, such a system can facilitate a faster and more user friendly measurement process. Such a multiple wheel mounted target measurement system is much the same as the embodiment described in FIG. 11A. Front wheel mounted targets 1101a, 1101c are imaged in the same image as the ADAS target 1102, in the front wheel mounted target imaging position 1120 depicted in FIG. 11C. The relative pose between the ADAS target 1102 and the front wheel mounted targets 1101a, 1101c is measured by performing the aforementioned 2D:3D pose estimation process for both target types. The rear wheel mounted targets 1101b, 1101d are imaged in a similar manner. It may be advantageous, however, to image the rear wheel mounted targets 1101b, 1101d while not viewing the ADAS target 1102 in the same frame. In such a case, the rear wheel mounted target pose relative to the ADAS target 1102 is measured by imaging a front wheel mounted target (e.g., target 1101a) in the same frame as a rear wheel mounted target (e.g., target 1101b) on th same side of the vehicle 1105. This imaging position is depicted in the rear wheel mounted target imaging position 1121 depicted in FIG. 11C.

Through such a process, the pose of the rear wheel mounted target relative to the front wheel mounted target is calculated. Since we know the pose of a front wheel mounted target 1101a relative to the ADAS target 1102, and we know the pose of a rear wheel mounted target 1101b relative to the front wheel mounted target 1101a, we can calculate the pose of the rear wheel mounted target 1101b relative to the ADAS target 1102 without directly imaging the rear wheel mounted target 1101b in the same frame as the ADAS target 1102. This process can be carried out independently for the left and right sides of the vehicle 1105. By following such a process for both sides of the vehicle 1105, the ADAS target 1102 can be positioned following a procedure that is otherwise analogous to the system in FIG. 11A which only employs one wheel mounted target for all wheels. This process of measuring the rear wheel mounted target poses relative to the ADAS target can be carried out for vehicles with an arbitrary number of axles, and not just the two axles that are depicted in FIG. 11C.

Embodiment with Multiple Cameras and Multiple Wheel Mounted Targets

Figure 11D:
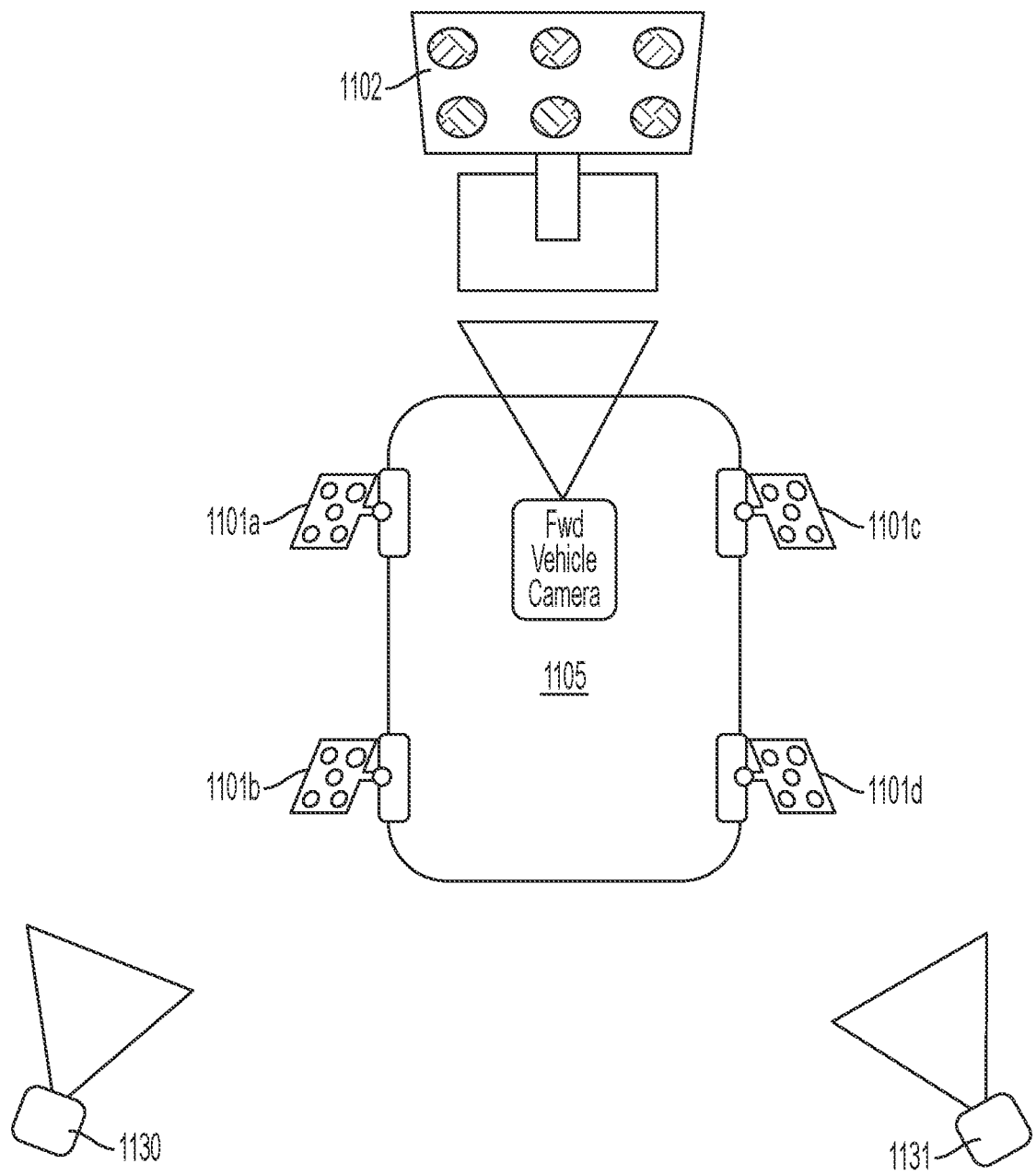

The system embodiment depicted in FIG. 11C can be extended further to enhance user friendliness and ease of measurement. One way to enable such an extension is to employ an additional camera, such that separate camera pods image wheel mounted targets on both the left and right sides of the vehicle. Such a system configuration is depicted in FIG. 11D. The configuration depicted in FIG. 11D is functionally the same as the system depicted in FIG. 11C, except that there is no need to reposition the cameras 1130, 1131 across the left and right sides of the vehicle 1105. After measuring the pose of the wheel mounted targets 1101a-d relative to the ADAS target 1102 by following the procedure described for FIG. 11C, the pose of the ADAS target 1102 relative to the vehicle 1105 is determined by viewing at least one wheel mounted target 1101a-d with at least one camera 1130, 1131.

Embodiment with Varying Numbers of Cameras and Wheel Targets and with Frame Targets Attached to ADAS Target(s)

Figure 11E:
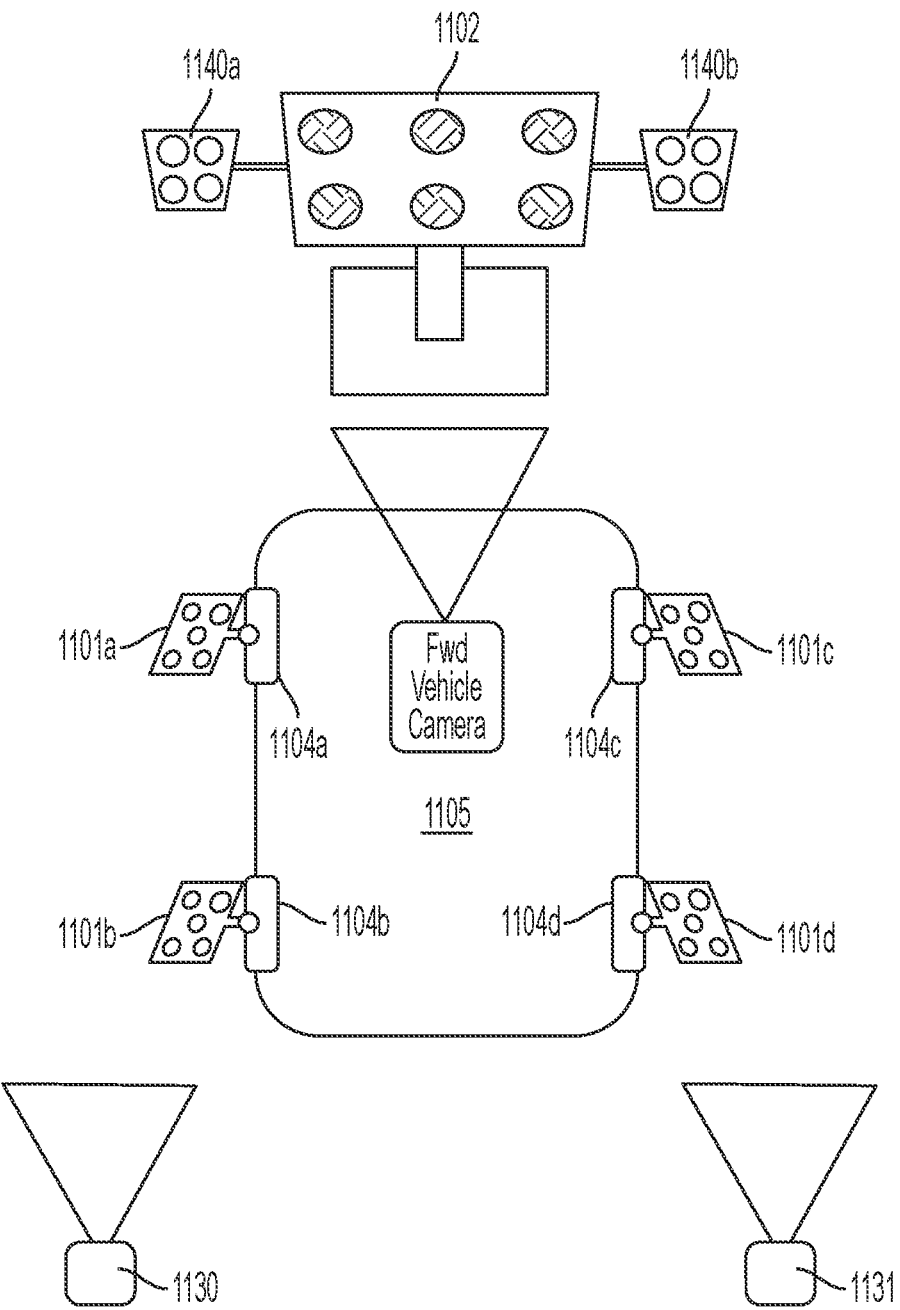

One extension to the embodiments described in FIGS. 11A-11D is to place one or more targets on the side(s) of the frame of the ADAS target. Such an embodiment is depicted in FIG. 11E, where frame targets 1140a, 1140b are depicted on both the left and right sides of the frame of the ADAS target 1102. If the poses of these frame target(s) 1140a, 1140b relative to the ADAS target 1102 are known, then measuring the frame target(s) 1140a, 1140b allows for one to measure the pose of the ADAS target 1102 without directly imaging the ADAS target 1102. Use of such frame targets 1140a, 1140b is advantageous in that they facilitate the measurement of the poses of the wheel mounted targets 1101a-d and the ADAS target 1102 without repositioning the camera pods 1130, 1131. In this way, the pose of the ADAS target 1102 relative to the vehicle 1105 is determined. Frame targets attached to an ADAS target can thus provide a rapid and user friendly method of measuring and adjusting the pose of the ADAS target.

Calculation of Alignment Angles with Various Embodiments

An additional advantage of the various embodiments described above is the ability to calculate wheel alignment angles without requiring any additional hardware. Knowing the wheel alignment sensor angles is important because downstream ADAS sensor calibration procedures require that vehicles be within proper alignment tolerances before ADAS sensor calibrations can be performed correctly.

Alignment Angles with Embodiments Comprised of Multiple Cameras and Multiple Wheel Mounted Targets An additional advantage of the embodiment in FIG. 11E is that wheel alignment angles can be calculated without requiring any additional hardware. If the vehicle 1105 is made to perform a runout compensation procedure while the camera pods 1130, 1131 and the ADAS target 1102 are stationary, the alignment angles of the individual wheels 1104a-d can be calculated. The pose of the left frame target 1140a to the ADAS target 1102 is known, and the pose of the right frame target 1140b relative to the ADAS target 1102 is known. Thus, the transformation between the left and right frame targets can be calculated. We such information, one can transform measurements of wheel mounted targets 1101c, 1101d from the right side of the vehicle 1105 to the left side (or vice versa). With runout compensation performed on each wheel mounted target 1101a-d, and with the spatial transformation between the left and right sides of the vehicle, the vehicle wheel alignment angles can be calculated given measurements of the wheel mounted targets 1101a-d.

Thus, an alignment check can be performed prior to commencing the ADAS target positioning sequence. Once an alignment check has been performed, the pose of the ADAS target 1102 can be measured live upon measurement of the left or right frame target 1140a, 1140b, from either the left or right camera pod 1130, 1131.

Alignment Angles with Embodiments Using Common Directions on Each Vehicle Side

Figure 11F:
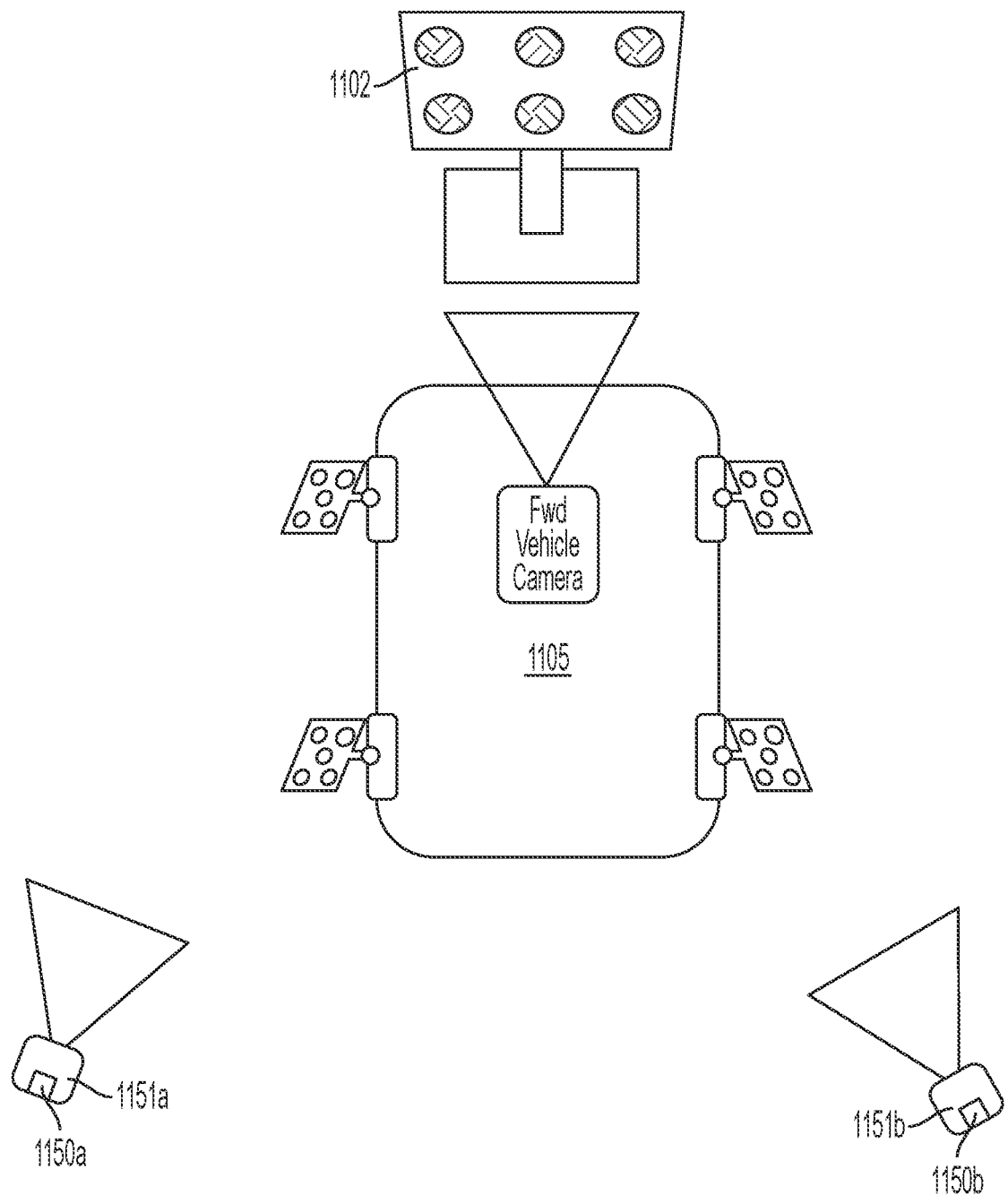

An extension to the system depicted in FIG. 11E is to remove the frame targets 1140a, 1140b from the side of the ADAS target 1102, and to rigidly attach inclinometers to each of the camera pods. Such an embodiment is depicted in FIG. 11F. If the rotation between inclinometers 1150a, 1150b and the cameras 1151a, 1151b to which they are rigidly attached is known, it is possible to express gravity measurements in each individual camera coordinate system. By measuring two or more common directions in each of the camera coordinate systems, we have a system that is functionally equivalent to the system described in FIG. 1A. As such, the pose of the ADAS target 1102 and the vehicle wheel alignment angles can be measured using the same process and underlying algorithms.

As with the system described in FIG. 1A, it is not necessary to use gravity and vehicle drive direction measurements on each side of the vehicle 1105 to calculate alignment angles without directly measuring the left to right side transformation. Any two or more common directions can in principle provide sufficient information to enable the calculation of alignment angles. Examples of such alternatives include gyroscopic measurements of a reference direction and magnetometer direction measurements of a locally constant magnetic field, among others.

Alignment Angles with Embodiments Comprised of Reduced Numbers of Cameras and Wheel Mounted Targets For cost and space reduction purposes, it may be desirable to measure alignment angles while reducing the number of cameras and other sensors. The measurement of alignment angles can be accomplished with the single camera embodiments described in FIGS. 11A-11C. Using a single camera and varying numbers of wheel mounted targets, it is possible to perform runout compensation (if needed) and to measure a common coordinate system which can be used as the basis for wheel alignment angles. The basic principle of such alignment measurements is to measure wheel axes of rotation in a common coordinate system. The ADAS target depicted in FIG. 11A and in subsequent figures is such a convenient reference coordinate system.

Referring now to exemplary FIG. 11C, by rolling the vehicle 1105 and observing the change in wheel mounted target pose as the vehicle rolls, runout can be compensated for on each individual wheel 1104a-d. So long as the transformation to the reference coordinate system (the ADAS target 1102 as described here) is known for each wheel mounted target 1101a-d, the axes of the wheels 1104a-d can be expressed in this common coordinate system. If the axes of the wheels 1104a-d are known and the position of the vehicle wheels 1104a-d are known in the ADAS target coordinate system, alignment angles can be calculated. Note that for alignment angles to be calculated in such a manner, it is necessary for the common reference coordinate system (the ADAS target 1102 here) to be static as the vehicle rolls for runout compensation measurement purposes.

If there are fewer wheel mounted targets than there are vehicle wheels in the system, it is possible to perform an alignment check but not a series of live measurement updates of the vehicle wheel alignment angles. In this scenario, as shown in exemplary FIG. 11A, runout compensation is performed with a single wheel mounted target 1101 by moving the target 1101 to each individual wheel 1104a-c and performing runout compensation separately for each wheel. After chocking vehicle wheels to ensure that the vehicle cannot move relative to the ADAS target 1102, the pose of each wheel 1104a-d relative to a static vehicle is measured. In such a way, the pose of the vehicle coordinate system relative to the wheel mounted target 1101 can be measured. When the ADAS target 1102 is imaged in the same camera image frame as the wheel mounted target 1101, one can calculate the pose of the vehicle coordinate system relative to the ADAS target 1102. With vehicle wheel axes also measured in the ADAS target coordinate system and the vehicle coordinate system also measured in that same ADAS target coordinate system, vehicle wheel alignment angles are calculated using just one camera and one wheel mounted target.

FIGS. 11A-11F, 14A-14B, and 15 depict the placement of a "front" ADAS target, which is used to calibrate the forward-facing driver assistance camera in a vehicle (Fwd vehicle camera). Many ADAS systems, however, require the placement of additional calibration fixtures so that sensors other than the forward-facing driver assistance camera can be calibrated. Some of these additional sensors include radar detectors, side-facing cameras, rear-facing cameras, and infrared cameras, among others. The list of sensors used in ADAS systems is steadily growing. The measurement principles described herein, however, allow for the measurement and positioning of all additional sensors relative to the vehicle, including sensors not yet used in commercially available ADAS systems.

Figure 11G:
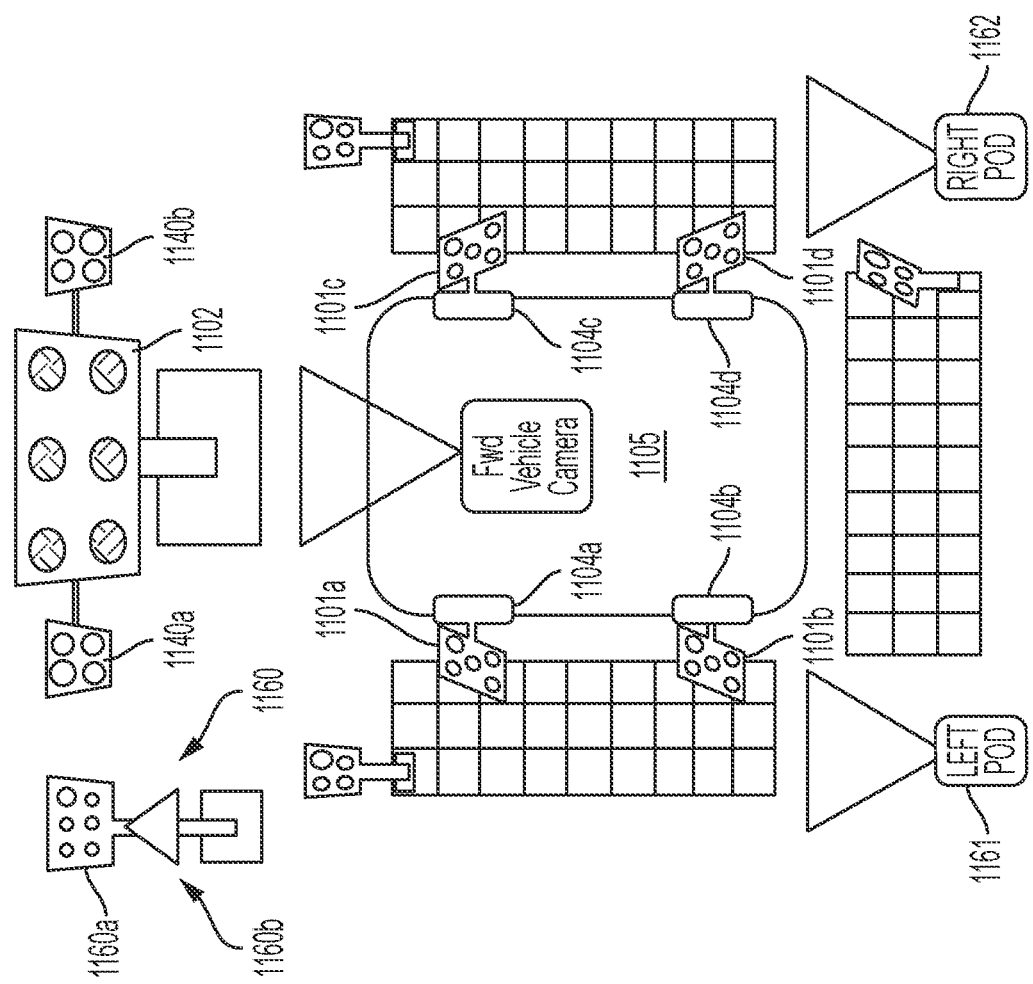

Calibration fixtures for calibrating some of these additional sensors are depicted in FIG. 11G. The additional ADAS sensors can be calibrated with the same general procedure that is described above for positioning the front ADAS target. The basic process to measure the position of these additional sensors is to measure the position of the vehicle 1105 relative to one or more wheels 1104a-d. A vehicle coordinate system is defined from measurements of the wheel poses, either from wheel mounted targets 1101a-d or from wheel targets defined from textured landmark points 1111 on the wheel surfaces as shown in FIG. 11B and explained herein above. For some calibration fixtures, such as the corner radar reflector 1160 depicted in FIG. 11G, it may be necessary and/or beneficial to secure an optical target 1160a with a known spatial relationship to the calibration apparatus. Once a vehicle coordinate system is known relative to one or more wheels 1104a-d, it is possible to measure the pose of the calibration apparatus 1160 relative to the vehicle 1105 by measuring the pose of the wheel(s) 1104a-d and the optical target 1160a rigidly attached to the calibration apparatus 1160 in the same image frame from one or more of the cameras 1161, 1162.

Figure 14A:
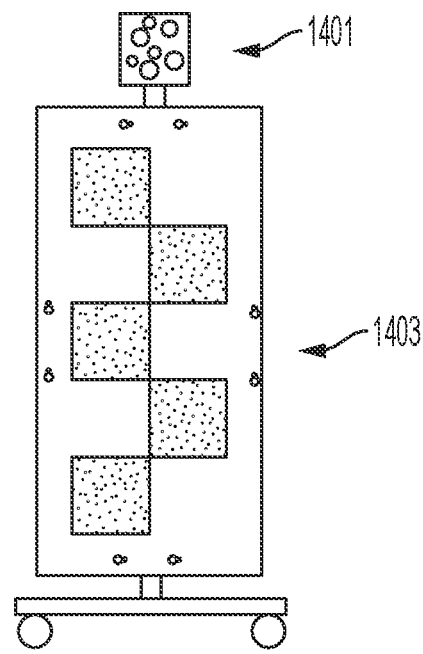
FIGS. 14A-B are front views of peripheral ADAS calibration fixtures according to the present disclosure.
Figure 14B:
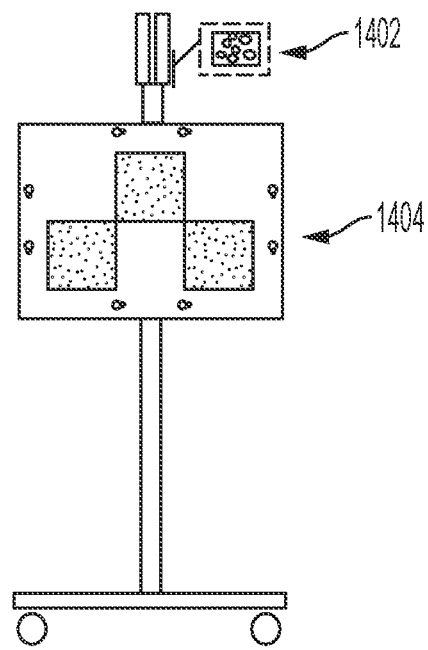

FIGS. 14A and 14B show additional representative depictions of such peripheral ADAS calibration fixtures and procedures. The fixtures of FIGS. 14A and 14B each possess a peripheral target 1401, 1402 (with geometry known to the calibration system) and a rigidly attached ADAS calibration fixture 1403, 1404 (with geometry known to the sensors on the vehicle undergoing calibration). The relative poses of two objects is known, either by mechanical construction or through a previously performed calibration process. The ADAS calibration fixture 1403, 1404 may be a planar target as depicted in FIGS. 14A and 14B, a three-dimensional cone 1160b as depicted in FIG. 11G, or various other physical constructions as required by the sensors undergoing calibration. The requirement is only that the pose of the ADAS calibration fixture can be known or measured with respect to its associated peripheral target.

FIG. 14A depicts a peripheral target 1401 with a planar surface that is parallel with the planar surface normal of its associated ADAS calibration fixture 1403. This arrangement facilitates positioning in procedures where ADAS calibration fixtures must face towards the calibration system cameras; for example, in scenarios where rear-facing vehicle cameras must be calibrated. FIG. 14B depicts a peripheral target 1402 with a planar surface normal that is perpendicular to the planar surface normal of its associated ADAS calibration fixture 1404. This arrangement facilitates positioning in procedures where ADAS calibration targets must face the side of vehicles under calibration.

Figure 15:
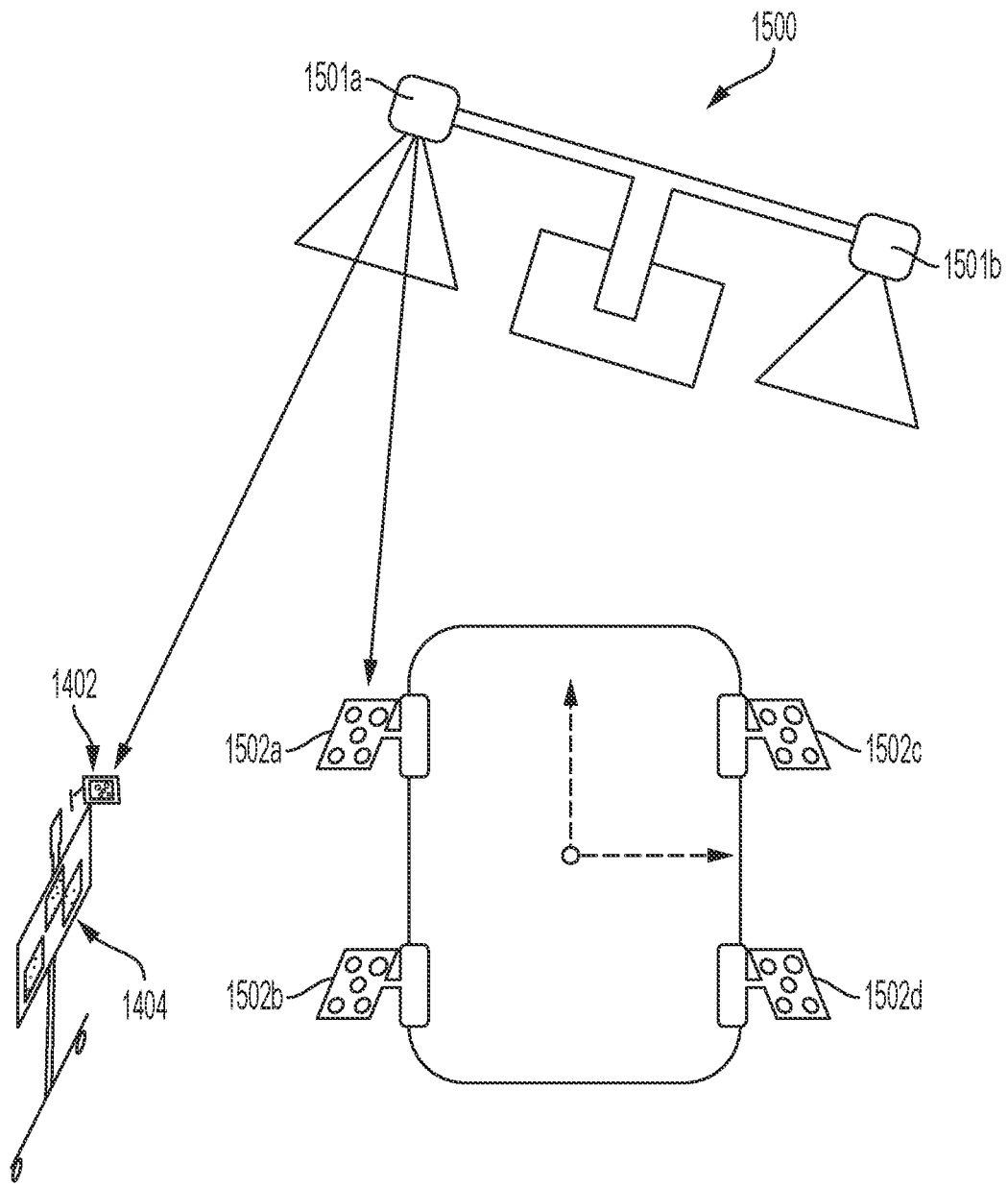
FIG. 15 is a schematic perspective view of a system for positioning peripheral ADAS calibration fixtures according to the present disclosure.

With such knowledge of the relative pose of the peripheral target and its associated ADAS calibration fixture, the pose of the ADAS calibration fixture can be measured in the calibration system camera coordinate system without the camera directly measuring the pose of the ADAS calibration target. This process is depicted in FIG. 15. In this representative depiction, the calibration system 1500 left camera 1501a measures the pose of one or more wheel mounted targets 1501a-d, each with a known pose in the vehicle coordinate system, while also measuring the pose of the peripheral target 1402.

The pose of the peripheral target 1402 in the left camera coordinate system is transformed into the wheel mounted target coordinate system, which is then transformed into the vehicle coordinate system. Thus, the pose of the peripheral target 1402 is known in the vehicle coordinate system. Using the aforementioned knowledge of the pose of the ADAS calibration fixture 1404 in the peripheral target coordinate system, we can calculate the pose of the ADAS calibration fixture 1404 in the vehicle coordinate system. Note that the peripheral target 1402 can be posed in an arbitrary way relative to the ADAS calibration target 1404, so long as its pose is known.

In other embodiments, the translation of a point on calibration fixture 1403, 1404 relative to peripheral target 1401, 1402 is known rather than the pose of the calibration fixture 1403, 1404. With such knowledge of the pose of the peripheral target and the translation of a calibration fixture point of its associated ADAS calibration fixture, the point on the ADAS calibration fixture can be measured in the calibration system camera coordinate system without the camera directly measuring the point on the ADAS calibration target as discussed herein above with reference to FIG. 15.

The present disclosure is not restricted to the scenarios depicted in the accompanying diagrams. For example, there may be more than one peripheral target associated with an ADAS.

Software Guided Positioning of the Calibration System Cameras

Positioning the ADAS calibration system such that it can measure all required targets (wheel mounted targets or peripheral targets) can present challenges, depending on available floor space. For this reason, it is beneficial to guide the user in the positioning of the ADAS calibration system cameras. The goal of software guided positioning is depicted in FIG. 15. In that particular scenario, the ADAS calibration system 1500 is posed in such a way that the left camera 1501a can concurrently view both a wheel mounted target 1502a and the peripheral target 1402. The ADAS calibration system described herein provides guidance to the end user for such positioning. The calibration system positioning guidance can be implemented in various ways.

One way to provide such camera positioning guidance to the end user is to provide predefined look-up table poses for various vehicle geometries. These look-up table poses describe where to pose the ADAS calibration system itself (and its attached cameras) relative to the vehicle coordinate system to concurrently view one or more wheel mounted targets and the necessary peripheral target(s). The look-up table contains the three-dimensional translation and the "yaw" rotation angle of the ADAS calibration system such that it can view at least one wheel mounted target and all required peripheral targets in their desired calibration poses. The ADAS calibration system software shows the user where to move the ADAS calibration system itself, and it provides live feedback to the user of the system pose with respect to the vehicle coordinate system that it measured previously. In this way, the user receives live updates of the system pose, as well as feedback of where and how to pose the system to achieve a valid viewpoint of all required targets.

An alternative to the look-up table approach is to calculate the optimal frame pose for a given imaging scenario. Given knowledge of the vehicle coordinate system, the required pose of the peripheral target, the calibration parameters of the ADAS calibration system cameras, target geometries, and the pose of one or more wheel mounted targets, it is possible to calculate an optimized pose of the ADAS calibration system. The end result for the user is similar to the look-up table approach, except with the advantage that the optimal frame pose method is more dynamic. The optimal frame pose method does not require the tabulation of new look-up tables for new vehicle makes and models, new target geometries, or new camera and lens optics.

Figure 17:
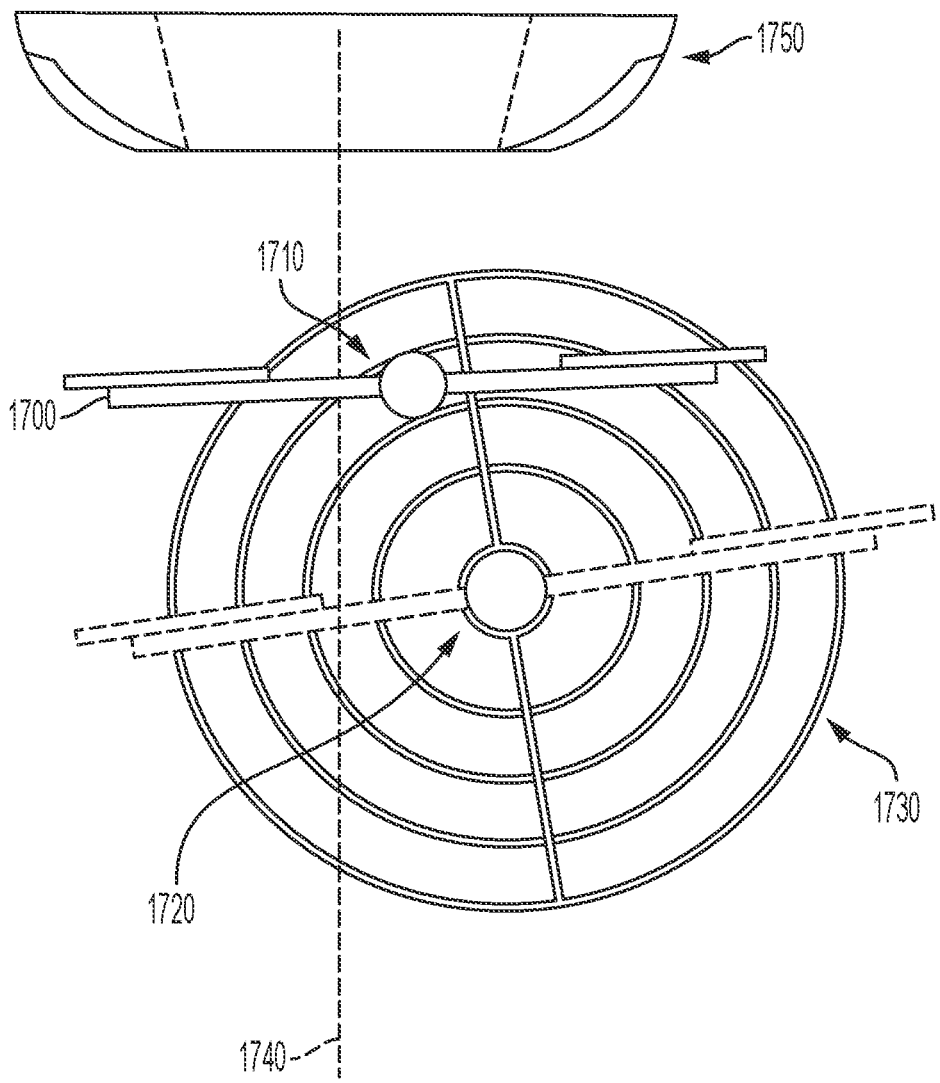
FIG. 17 is a representative depiction of a user interface of software for guiding a user to position elements of an ADAS calibration system according to an embodiment of the present disclosure.

The second component of a software guided positioning is the actual user interface display software itself. A representative depiction of a display of such guidance software is shown in FIG. 17, wherein ADAS calibration system 1700 is to be positioned relative to the center line 1740 of a vehicle 1750. The current ADAS calibration system pose 1710 in FIG. 17 shows the current measurement of ADAS calibration system 1700, as determined from the most recent measurement of wheel mounted targets (not shown). The desired ADAS calibration system pose 1720 is the pose to which the software instructs the user to move the ADAS calibration system 1700; that is, the center of the "bullseye" indicator 1730. The user moves the ADAS calibration system 1700 until the current ADAS calibration system pose is sufficiently close to the desired ADAS calibration system pose.

Measuring With Respect to Arbitrary Reference Points on the Vehicle

Figure 18A:
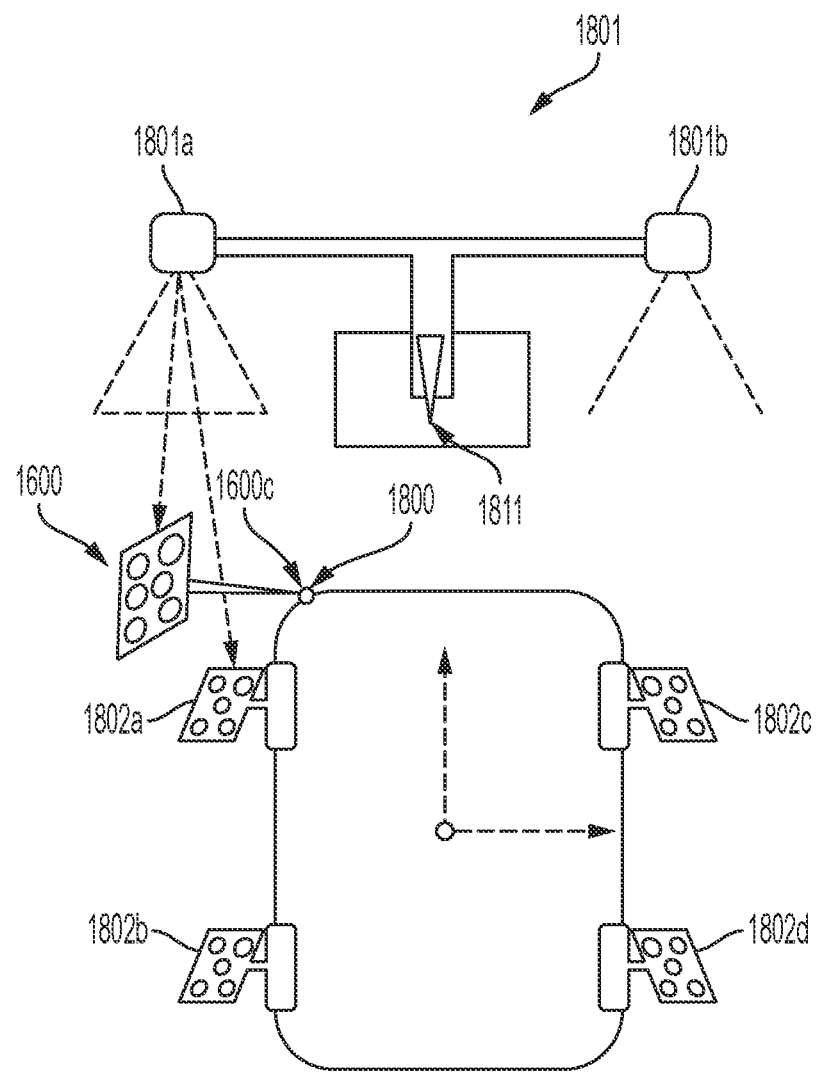
FIGS. 18A-B are schematic perspective views of systems for positioning ADAS calibration elements relative to vehicle reference points according to embodiments of the present disclosure.

Various vehicle calibration procedures require that the ADAS calibration fixtures be positioned with respect to arbitrary points on the vehicle, which points may not be known relative to the vehicle wheels (or wheel mounted targets). To correctly position the ADAS calibration fixture(s) in such scenarios, the position of such reference points must be measured and then the ADAS calibration fixtures posed with respect to those points. A representative process is depicted in FIG. 18A, where a representative vehicle reference point 1800 must be measured on the left-front bumper of the vehicle. The vehicle reference point 1800 is defined by automotive OEMs, and typically corresponds to readily identifiable and accessible features on vehicle surfaces. Some representative examples of vehicle reference points are the front face of radar sensor fixtures at the front bumper; tow hooks on the underside of the vehicle frame; and the center of the badge or logo at the middle of the front bumper, among various other possibilities.

To position the ADAS calibration system (or other ADAS calibration fixture) correctly with respect to these vehicle reference points, these reference points must be identified and then measured in a reference frame that is known to the ADAS calibration system. To measure the vehicle reference point 1800 depicted in FIG. 18A, a tip target 1600 such as described previously with reference to FIG. 16 is employed. As discussed herein above, the translation between the tip target coordinate system and the pointer tip 1600c itself is known. By measuring the pose of the tip target 1600 in the coordinate system of the left camera 1801a of an ADAS calibration system 1801, the position of the vehicle reference point 1800 in the left camera coordinate system is known. By measuring the pose of one or more wheel mounted targets 1802a-d, the pose of which is also known in the previously described vehicle coordinate system, the pose of the left camera 1801a in the vehicle coordinate system is known.

With knowledge of the pose of the vehicle reference point 1800 in the left camera coordinate system, and the pose of the left camera coordinate system in the vehicle coordinate system, we have sufficient knowledge to transform the vehicle reference point 1800 into the vehicle coordinate system. With knowledge of the vehicle reference point 1800 in the vehicle coordinate system, we can readily pose the ADAS calibration system 1801 (or secondary ADAS calibration fixtures as needed) with respect to the vehicle reference point 1800.

Figure 18B:
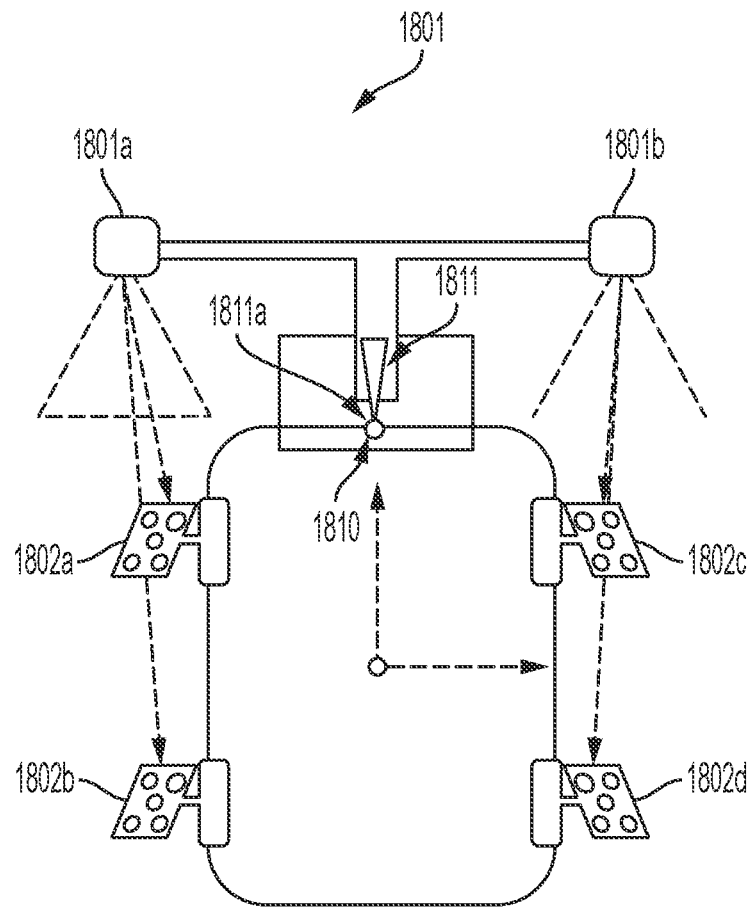

FIG. 18B shows another representative embodiment of determining the position of a vehicle reference point 1810, and of positioning ADAS calibration fixtures with respect to this vehicle reference point 1810. The vehicle reference point 1810 depicted in FIG. 18B is the center of the front vehicle bumper (i.e., a "vehicle bumper reference point"), which is a common reference point. The method for determining the vehicle bumper reference point 1810 is similar to the method of FIG. 18A, where a tip target of known geometry is used to measure the position of the depicted vehicle reference point.

For the vehicle bumper reference point 1810, however, a tip target is not used. Instead, a pointer device 1811 of known geometry is fixed to the front of the ADAS calibration system 1801. The translation from the reference of the ADAS calibration system 1801 to the tip of the pointer device 1811 is known, either mechanically or through a prior offline calibration process. From knowledge of the pointer device 1811 in the ADAS calibration system 1801, and knowledge of the ADAS calibration system 1801 in the left (or right) camera coordinate system, the position of a tip 1811a of the pointer device 1811 in the left (or right) camera coordinate system can be determined.

If the left camera 1801a (or right camera 1801b) also measures the pose of one or more wheel mounted targets 1802a-d, and the pose of the wheel mounted targets in the vehicle coordinate system is known, the pose of the left or right camera 1801a, 1801b in the vehicle coordinate system can also be determined. With knowledge of the vehicle bumper reference point 1810 in the left (or right) camera coordinate system, and knowledge of the left (or right) camera coordinate system in the vehicle coordinate system, the position of the vehicle bumper reference point 1810 in the vehicle coordinate system can also be determined. With such knowledge, the vehicle bumper reference point 1810 is correctly placed along the vehicle centerline or other reference axis. Thus, the position of the front bumper in the vehicle coordinate system along commonly used reference axes can be determined; the vehicle bumper reference point 1810 can then be used as a reference point against which ADAS calibration fixtures can be positioned, as needed.

It must be emphasized that the measurement of arbitrary vehicle reference points is not restricted to the two embodiments described in FIGS. 18A and 18B. The vehicle reference point 1800, 1810 need not be measured as the tip of a pointing device 1600, 1811. For example, a target of known geometry could be fixed to the reference point specified by the automotive OEM that defined the reference point. The reference point could instead be measured with respect to one or more vehicle wheels by purely mechanical means. The reference point could also be directly measured by employing techniques such as illuminating the reference point by a lidar sensor with a pose known to one or more cameras in the ADAS calibration system.

There is no restriction on the number of cameras used in the disclosed ADAS calibration systems, so long as at least one is used. The ADAS calibration system camera(s) need not be positioned at the front of the vehicle, as depicted in FIGS. 18A and 18B. There is no need for the wheel mounted targets to actually be mounted to the vehicle wheels, since what matters is that the poses of these reference targets are known in the vehicle coordinate system.

Note that the position of vehicle reference points should be constant for a given vehicle type (make/model/trim package/year). Thus, it is possible to measure the OEM-defined vehicle reference points in an entirely offline manner. Such reference points can be measured in an offline calibration process, subject to the constraint that the position of such reference points are expressed in terms of a vehicle reference that can be measured at the time at which ADAS calibrations are performed. For example, a vehicle reference point could be measured offline, and stored as a translation offset from a vehicle coordinate system (using the same coordinate conventions that are used at ADAS calibration time). In addition, for sufficiently accurate and detailed CAD models of individual vehicles, it is possible to measure the position of such vehicle reference points from CAD software, without performing any actual measurements. However the offline process is performed, the translation(s) of the reference point with respect to a reference coordinate system are stored in an offline database and/or look-up table, and can be retrieved at run-time in lieu of or in addition to live measurements of vehicle reference points. This may be beneficial for vehicle reference points that are inaccessible or otherwise difficult to measure directly; for example, points on the underside of a vehicle.

Detection of Undesired Vehicle Motion

As shown in the previously-described embodiments, the disclosed ADAS calibration system is able to perform a function vital to the integrity of vehicle ADAS calibration processes. A core assumption of the ADAS calibration process is that, once the sensor calibrations start, the vehicle does not move relative to the floor through the duration of the calibration process. For a variety of scenarios, this assumption may not be valid: a user may bump the vehicle, changing its pose relative to calibration fixture; a user may forget to chock the vehicle wheels, and the vehicle may subsequently roll during a later process; and the vehicle suspension may settle, significantly changing the vehicle height and pitch/roll with respect to the floor, among various other reasons. If not detected and/or compensated for, this unintended vehicle motion may induce significant errors in the poses of the ADAS calibration fixtures, resulting in failed and/or inaccurate ADAS sensor calibrations, possibly compromising the safety of the vehicle ADAS systems.

Most ADAS calibration systems assume that vehicles under calibration do not move relative to the floor once calibrations start. The ADAS calibration systems described in this disclosure provide the ability to actively monitor the vehicle for a change in its reference position. There are various ways in which this vehicle motion detection is performed. One embodiment of this capability is to monitor the relative poses of the wheel mounted targets, such as targets 1604a-d or targets 1802a-d. If the vehicle rolls in any direction, the relative pose between front and rear wheel target coordinate systems will change. If the relative pose of any of the wheel mounted poses changes significantly for a sustained time duration, it indicates that the vehicle has moved, and this knowledge is displayed to the user to perform runout compensation again and reestablish the vehicle coordinate system relative to the wheel mounted targets.

There are various other ways in which vehicle motion detection can be performed. The system camera(s) could observe a collection of textured landmark points on the vehicle frame and a reference object (i.e., textured points on the ground plane), and monitor for relative changes to determine if the vehicle has rolled. In other embodiments, an accelerometer or orientation sensor is secured to the vehicle (on the frame or the wheels), and this sensor is actively monitored for changes to determine unintended vehicle motion during the calibration process.

Drive-on Aid Using Drive Direction Calculation

The calculated drive direction can be used to guide an operator to drive a vehicle onto a conventional alignment rack or lift such that the vehicle is straight relative to the rack, and its front wheels are centered on the rack's turnplates. This embodiment requires an aligner, two conventional ride height targets (optionally four ride height targets), and targets for the rack's turnplates (or alternatively, turnplates comprising targets). This technique also requires that calibration of the turnplate targets to the center of the turnplate is performed before it is used.

Figure 9:
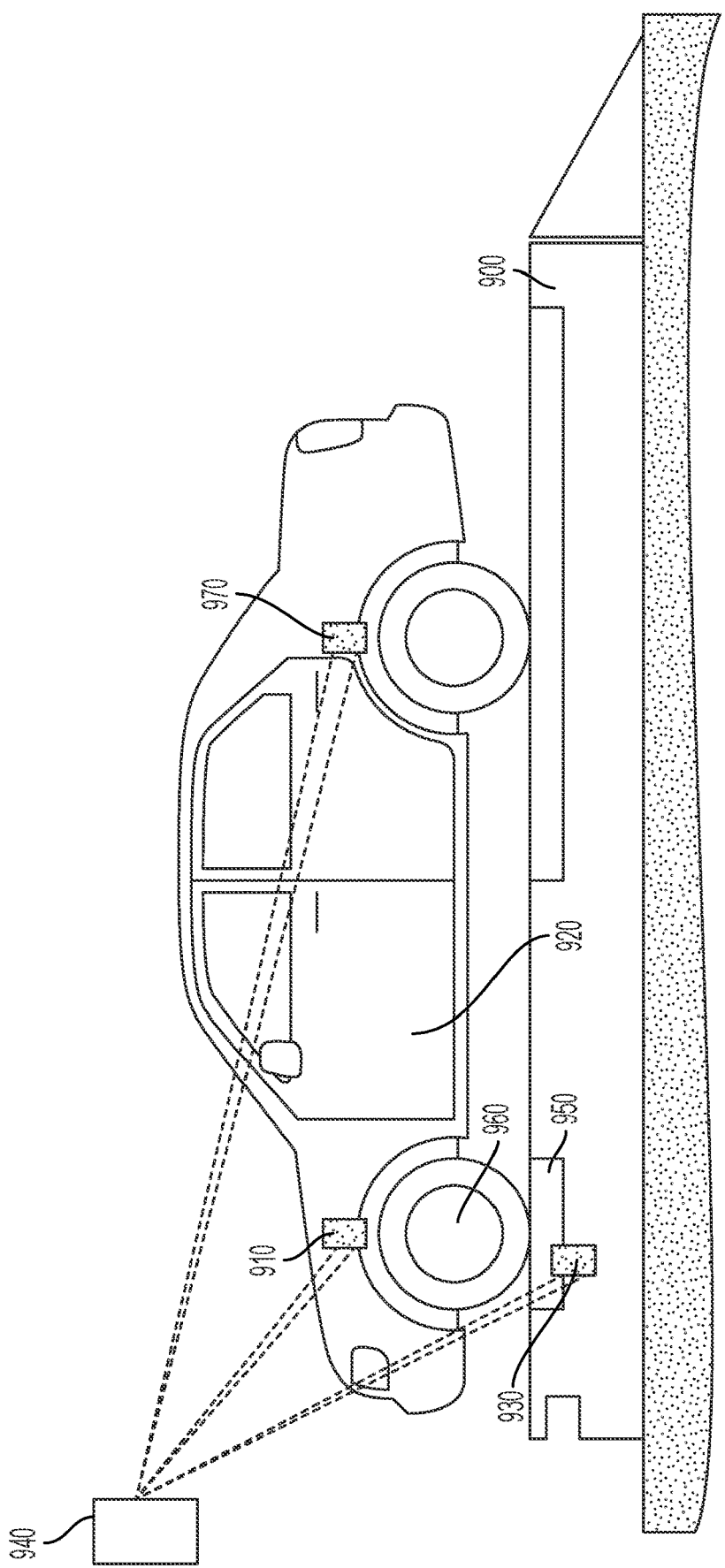
FIG. 9 is a schematic side view of a drive-on aid system according to an embodiment of the present disclosure.

Referring now to FIG. 9, the operator attaches a ride height target 910 at the apex of each front fender wheel of the vehicle 920 well prior to driving the vehicle 920 onto to the rack 900. The aligner ensures that the turnplate targets 930 and ride height targets 910 are visible to its cameras 940, and proceeds to a setup screen on its user interface. The width between the front ride height targets 910 is measured relative to the width between the turnplate targets 930, and the operator is instructed to adjust the distance between the turnplates 950 as necessary to match the track width of the vehicle 920, which is approximately determined from the distance between ride height targets 910. Additionally, the track width could be read from the vehicle specification database if present. Otherwise, the aligner could measure the distance between the turnplates 950 at the end of the drive-on process and save it in the specification database.

The aligner proceeds to a guidance screen of its user interface. The operator then begins to drive the vehicle 920 slowly onto the rack 900. As the vehicle 920 begins to move, the aligner processes the ride height target 910 movement into an instantaneous drive direction per the "Drive Direction Basic Principles" herein above, and calculates the trajectory of the vehicle 920 relative to the location of the turnplates 950. The aligner uses this trajectory to guide the operator so that the vehicle 920 is straight on the rack 900 and comes to rest with the front wheels 960 centered on the turnplates 950.

Optionally, rear ride height targets 970 are also attached and used to provide feedback as to how square the vehicle 920 is with the aligner and rack 900 as the vehicle 920 is driven onto the rack 900.

Communications Between ADAS Calibration System and Vehicle Undergoing Calibration To perform a calibration of a vehicle's ADAS sensors, it is not sufficient to correctly position the requisite ADAS calibration fixtures. Calibration procedures must be performed on the vehicle itself. Often this calibration process is performed by manually issuing commands to the vehicle through an intermediary communications device such as a diagnostic scan tool. However, the ADAS calibration process can be triggered on the vehicle directly, without use of an intermediary communications device. However achieved, this process requires user intervention to initiate the vehicle sensor calibration process once the ADAS calibration fixture(s) are posed correctly with respect to the vehicle undergoing calibration.

This need for user intervention has several undesirable consequences. Without communications between the vehicle and the ADAS calibration system, there is no way for the ADAS calibration system to know that the vehicle internal sensor calibration processes have completed successfully. In addition, the user may make a mistake in initiating the vehicle calibration process; e.g., the wrong make/model/trim package of the vehicle might be selected; the wrong sensors on the vehicle might be selected; the internal calibration process could fail, but the user might indicate to the ADAS calibration system that the sensor calibration has passed; among various other failure modes. These operator errors can result in invalid and/or inaccurate ADAS calibrations, potentially resulting in unsafe ADAS systems.

With an on-board processor and communications devices (WiFi, Bluetooth, or cabled communications), the ADAS calibration system described herein has the ability to communicate with the vehicle undergoing calibration, either directly or indirectly. For certain vehicle types, the ADAS calibration system can communicate directly with the vehicle undergoing calibration through peer-to-peer methods. Other vehicle types do not allow direct peer-to-peer communications, but can allow local peer-to-peer communications through intermediate devices such as diagnostic scan tools. Other vehicle types facilitate indirect communications between the ADAS calibration system and the vehicle undergoing calibration by data exchange through internet-based cloud infrastructure. This communication between the ADAS calibration system and the vehicle undergoing calibration without user intervention (whatever the specific implementation) eliminates the various operator error sources described above. The ADAS calibration system can ensure that the end-to-end ADAS Calibration fixture poses and vehicle sensor calibration processes function as intended.

Embodiments of the disclosed methods and systems may be readily implemented, fully or partially, in software using, for example, object or object-oriented software development environments that provide portable source code that can be used on a variety of computer platforms. Alternatively, embodiments of the disclosed method and system can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the disclosed method and system can be implemented in hardware and/or software using any known or later developed systems or structures, devices and/or software by those of ordinary skill in the applicable art from the functional description provided herein and with a general basic knowledge of the computer, marine barrier and gate, and/or presence-based automatic gate arts.

Moreover, embodiments of the disclosed methods and systems can be implemented in software executed on a programmed general-purpose computer, a special purpose computer, a microprocessor, or the like. Also, the method of this disclosure can be implemented as a program embedded on a personal computer such as a JAVA® or CGI script, as a resource residing on a server or graphics workstation, as a routine embedded in a dedicated processing system, or the like.

While this disclosure has been described in conjunction with a number of embodiments, it is evident that many alternatives, modifications and variations would be or are apparent to those of ordinary skill in the applicable arts.

Accordingly, applicants intend to embrace all such alternatives, modifications, equivalents and variations that are within the spirit and scope of this disclosure.

What is claimed is:

1. A system comprising:
a fixture;
a first image sensor mounted on the fixture in a known pose relative to the fixture, the first image sensor being for viewing a first target disposed on a vehicle and having a known pose relative to the vehicle, and for capturing image data of the first target;
a tip target having a target body, a tip extending from the target body, and a tip point at a distal end of the target body, the tip point having a known position relative to the target body; and
a data processor for performing the steps of:
calculating, using the image data, a pose of the first target;
calculating a pose of the first image sensor relative to the vehicle using the calculated pose of the first target;
when the tip point of the tip target is placed on a body of the vehicle at a predetermined ADAS reference point such that the first image sensor views the tip target body and the first target to capture image data of the tip target body and the first target, calculating a pose of the tip target body relative to the first image sensor using the image data;
calculating a position of the ADAS reference point relative to the first image sensor using the calculated pose of the tip target body and the calculated pose of the first target, and
guiding a user to position the ADAS calibration fixture at a predetermined pose relative to the ADAS reference point using the calculated spatial relationship of the ADAS reference point relative to the first image sensor;
wherein the ADAS reference point has a stationary position relative to the vehicle body when the vehicle is rolling.

2. The system of claim 1, wherein the processor is for generating instructions for guiding the user using a user interface.

3. The system of claim 2, wherein the first target is mounted to a wheel of the vehicle, or the first target comprises a plurality of predetermined points on a wheel of the vehicle, or the first target is mounted to the vehicle body.

4. The system of claim 3, wherein the data processor is for performing the steps of:
monitoring the calculated pose of the first target; and
alerting the user that the vehicle has moved when the calculated pose of the first target changes more than a predetermined amount for a predetermined time.

5. The system of claim 2, further comprising an accelerometer or orientation sensor mounted to the vehicle, wherein the data processor is for performing the steps of monitoring the accelerometer or orientation sensor; and
alerting the user that the vehicle has moved when a measurement of the accelerometer or orientation sensor changes more than a predetermined amount.

6. The system of claim 1, wherein the fixture is for carrying an ADAS calibration element at a known pose relative to the fixture, and the data processor is for guiding the user to position the ADAS calibration element at a predetermined pose relative to the vehicle.

7. The system of claim 6, wherein the fixture comprises a movable base and a height-adjustable crossbar for carrying the ADAS calibration element and the first image sensor.

8. The system of claim 1, further comprising a communications device for communicating with the data processor and with the vehicle;
wherein the data processor is for sending information to the vehicle regarding calibration of an ADAS sensor of the vehicle, and receiving information regarding the calibration of the ADAS sensor from the vehicle, via the communications device.

9. A system comprising:
a fixture;
a first image sensor mounted on the fixture in a known pose relative to the fixture, the first image sensor being for viewing a first target disposed on a vehicle and having a known pose relative to the vehicle, and for capturing image data of the first target;
a data processor for performing the steps of:
calculating, using the image data, a pose of the first target;
calculating a pose of the first image sensor relative to the vehicle using the calculated pose of the first target;
generating instructions for positioning the fixture at a predetermined pose relative to the vehicle using the calculated pose of the first image sensor relative to the vehicle; and
generating the instructions for guiding a user using a user interface; and
a peripheral target disposed on a floor surface in view of the first image sensor, and
an ADAS calibration fixture rigidly attached to the peripheral target in a known pose relative to the peripheral target;
wherein the first image sensor is for capturing image data of the peripheral target and of the first target; and
wherein the data processor is for calculating a pose of the peripheral target relative to the first image sensor using the captured image data of the peripheral target, calculating a pose of the peripheral target relative to the vehicle using the calculated pose of the first target and the calculated pose of the peripheral target, and for guiding the user to position the ADAS calibration fixture at a predetermined pose relative to the vehicle using the calculated pose of the peripheral target relative to the vehicle using the user interface.

10. A system comprising:
a fixture;
a first image sensor mounted on the fixture in a known pose relative to the fixture, the first image sensor being for viewing a first target disposed on a vehicle and having a known pose relative to the vehicle, and for capturing image data of the first target;
a data processor for performing the steps of:
calculating, using the image data, a pose of the first target;
calculating a pose of the first image sensor relative to the vehicle using the calculated pose of the first target; and
generating instructions for positioning the fixture at a predetermined pose relative to the vehicle using the calculated pose of the first image sensor relative to the vehicle;
a second image sensor mounted on the fixture in a known or calculated pose relative to the first image sensor, the second image sensor being for viewing a second target disposed on the vehicle and having a known pose relative to the vehicle, and for capturing image data of the second target, wherein the first image sensor is for viewing a first side of the vehicle and the second image sensor is for viewing a second side of the vehicle opposite the first side of the vehicle, and a tip target having a target body, a tip extending from the target body, and a tip point at a distal end of the target body, the tip point having a known position relative to the target body;

wherein the data processor is for performing the steps of:

when the tip point of the tip target is placed sequentially against a plurality of contact points on a floor surface, including contact points on the first and second sides of the vehicle, such that the first image sensor views the tip target body and the first target, and the second image sensor views the tip target body and the second target to respectively capture image data of the target body and the first and second targets, calculating a pose of the tip target body relative to the respective first or second image sensor, using the image data, at each of the plurality of points of the floor surface;

calculating a position of each of the contact points relative to the vehicle using the calculated poses of the tip target body and first and second targets, and calculating a floor plane on which the vehicle is supported using the calculated position of each of the contact points.

11. The system of claim 10, wherein each of the contact points on the floor surface is adjacent a wheel of the vehicle.

12. A system comprising:

a fixture spaced from a vehicle;

a first image sensor mounted on the fixture in a known pose relative to the fixture, the first image sensor being for viewing a first target disposed on the vehicle and having a known pose relative to the vehicle, and for capturing image data of the first target;

a data processor for performing the steps of:

calculating, using the image data, a pose of the first target;

calculating a pose of the first image sensor relative to the vehicle using the calculated pose of the first target;

generating instructions for positioning the fixture at a predetermined pose relative to the vehicle using the calculated pose of the first image sensor relative to the vehicle; and generating the instructions for guiding a user using a user interface;

a pointer device mounted to the fixture and extending towards the vehicle, the pointer device having a tip with a known position relative to the fixture;

wherein the data processor is for performing the steps of:

when the tip of the pointer device is placed at a predetermined ADAS reference point on the vehicle such that the first image sensor views the first target to capture image data of the first target, calculating a pose of the first target relative to the first image sensor using the image data;

calculating a position of the ADAS reference point relative to the first image sensor using the calculated pose of the first target, and guiding the user to position the ADAS calibration fixture at a predetermined location relative to the ADAS reference point using the calculated position of the ADAS reference point relative to the first image sensor using the user interface.

13. A system comprising:

a fixture;

a first image sensor mounted on the fixture in a known pose relative to the fixture, the first image sensor being for viewing a first target disposed on a vehicle and having a known pose relative to the vehicle, and for capturing image data of the first target;

a data processor for performing the steps of:

calculating, using the image data, a pose of the first target;

calculating a pose of the first image sensor relative to the vehicle using the calculated pose of the first target;

generating instructions for positioning the fixture at a predetermined pose relative to the vehicle using the calculated pose of the first image sensor relative to the vehicle; and generating the instructions for guiding a user using a user interface;

a remote peripheral target disposed on a surface on which the vehicle is sitting, and an ADAS calibration fixture rigidly attached to the remote peripheral target in a known pose relative to the remote peripheral target; and a relay device having a relay image sensor and a relay target attached to the relay image sensor in a known pose relative to the relay image sensor;

wherein the relay device is disposed such that the relay image sensor is for capturing image data of the remote peripheral target, and the first image sensor is for capturing image data of the relay target and of the first target; and wherein the data processor is for calculating a pose of the relay target relative to the first image sensor using the captured image data of the relay target, calculating a pose of the relay target relative to the vehicle using the calculated pose of the first target and the calculated pose of the relay target, calculating a pose of the remote peripheral target using the captured image data of the remote peripheral target, calculating a pose of the remote peripheral target relative to the relay image sensor, and guiding the user to position the ADAS calibration fixture at a predetermined pose relative to the vehicle using the calculated pose of the remote peripheral target relative to the vehicle using the user interface.

14. A system comprising:

a fixture;

a first image sensor mounted on the fixture in a known pose relative to the fixture, the first image sensor being for viewing a first target disposed on a vehicle and having a known pose relative to the vehicle, and for capturing image data of the first target;

a data processor for performing the steps of:

calculating, using the image data, a pose of the first target;

calculating a pose of the first image sensor relative to the vehicle using the calculated pose of the first target; and generating instructions for positioning the fixture at a predetermined pose relative to the vehicle using the calculated pose of the first image sensor relative to the vehicle;

a second image sensor mounted on the fixture in a known or calculated pose relative to the first image sensor, the second image sensor being for viewing a second target disposed on the vehicle and having a known pose relative to the vehicle, and for capturing image data of the second target, wherein the first image sensor is for viewing a first side of the vehicle and the second image sensor is for viewing a second side of the vehicle opposite the first side of the vehicle, and a floor target for placing on a floor surface, the floor target having a surface plane for contacting the floor surface, wherein a translation from the floor target to a point in the surface plane is known;

wherein the data processor is for performing the steps of:

when the floor target is placed sequentially at a plurality of locations on the floor surface, including locations on the first and second sides of the vehicle, such that the first image sensor views the floor target and the first target, and the second image sensor views the floor target and the second target to respectively capture image data of the floor target and the first and second targets, calculating a pose of the floor target relative to the respective first or second image sensor, using the image data, at each of the plurality of locations on the floor surface;

calculating a point at each of the locations on the floor surface relative to the vehicle using the calculated poses of the floor target and first and second targets, and calculating a floor plane on which the vehicle is supported using the calculated point at each of the locations on the floor surface.

15. The system of claim 14, wherein each of the locations on the floor surface is adjacent a wheel of the vehicle.

16. A system comprising:

a fixture;

a first image sensor mounted on the fixture in a known pose relative to the fixture, the first image sensor being for viewing a first target attached to a first wheel of the vehicle on a first side of the vehicle and having a known pose relative to the vehicle, and for capturing image data of the first target;

a data processor for performing the steps of:

calculating, using the image data, a pose of the first target;

calculating a pose of the first image sensor relative to the vehicle using the calculated pose of the first target; and generating instructions for positioning the fixture at a predetermined pose relative to the vehicle using the calculated pose of the first image sensor relative to the vehicle;

a second target attached to a second wheel of the vehicle on the first side of the vehicle;

wherein the first image sensor is for viewing the first side of the vehicle and the first and second targets;

the system further comprising a second image sensor mounted on the fixture in a known or calculated pose relative to the first image sensor, the second image sensor being for viewing third and fourth targets disposed on third and fourth vehicle wheels and having a known pose relative to the vehicle, and for capturing image data of the third and fourth targets;

wherein the second image sensor is for viewing a second side of the vehicle opposite the first side of the vehicle;

wherein the first and second image sensors are for capturing image data of the first, second, third, and fourth targets as the vehicle is rolled; and wherein the data processor is or performing the steps of:

calculating, using the image data, a plural number of poses of each of the targets as the vehicle is rolled;

calculating a rolling radius of each wheel using the calculated poses of the targets;

calculating a floor point for each wheel using the rolling radius and a known vertical direction for each respective wheel; and calculating a floor plane on which the vehicle is supported using the calculated floor points of the wheels.

* * * * *